(12) United States Patent
Kurebayashi et al.

(10) Patent No.: US 12,351,099 B2
(45) Date of Patent: Jul. 8, 2025

(54) VEHICLE DISPLAY SYSTEM, VEHICLE SYSTEM, AND VEHICLE

(71) Applicant: KOITO MANUFACTURING CO., LTD., Tokyo (JP)

(72) Inventors: Toshihiko Kurebayashi, Shizuoka (JP); Masaaki Nakabayashi, Shizuoka (JP); Naoki Takii, Shizuoka (JP); Misako Kamiya, Shizuoka (JP); Yoshiaki Fushimi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/615,569

(22) Filed: Mar. 25, 2024

(65) Prior Publication Data

US 2024/0227664 A1 Jul. 11, 2024

Related U.S. Application Data

(63) Continuation of application No. 17/274,063, filed as application No. PCT/JP2019/034815 on Sep. 4, 2019, now Pat. No. 12,005,832.

(30) Foreign Application Priority Data

| Sep. 5, 2018 | (JP) | 2018-166043 |
| Sep. 5, 2018 | (JP) | 2018-166044 |
| Sep. 5, 2018 | (JP) | 2018-166045 |

(51) Int. Cl.
*B60Q 1/08* (2006.01)
*B60K 35/00* (2024.01)
(Continued)

(52) U.S. Cl.
CPC ............... *B60Q 1/085* (2013.01); *B60Q 9/00* (2013.01); *G02B 27/0101* (2013.01);
(Continued)

(58) Field of Classification Search
CPC .... B60K 35/00–90; B60K 2360/00–96; G02B 27/00–648;
(Continued)

(56) References Cited

U.S. PATENT DOCUMENTS

| 2016/0179205 A1 | 6/2016 | Katz |
| 2017/0140651 A1 | 5/2017 | Lee et al. |

(Continued)

FOREIGN PATENT DOCUMENTS

| CN | 105593787 A | 5/2016 |
| CN | 106696701 A | 5/2017 |

OTHER PUBLICATIONS

Office Action issued in corresponding Chinese Patent Application No. 201980058218.3, issued on Mar. 27, 2024 (16 pages).

*Primary Examiner* — Christopher A Lamb, II

(74) *Attorney, Agent, or Firm* — Osha Bergman Watanabe & Burton LLP

(57) ABSTRACT

This display system which is provided in a vehicle comprises: a road surface drawing device that is configured so as to emit a light pattern (L1) toward a road surface outside the vehicle; an HUD that is located inside the vehicle and configured so as to display HUD information to an occupant of the vehicle such that the HUD information is overlaid on real space outside the vehicle; and a display control unit that is configured so as to control the road surface drawing device. The display control unit is configured so as to control the emission of the light pattern (L1) in accordance with an input operation by the occupant in an HUD display area (D1) where the HUD information can be displayed.

6 Claims, 31 Drawing Sheets

(51) Int. Cl.
    *B60K 35/23* (2024.01)
    *B60K 35/28* (2024.01)
    *B60Q 9/00* (2006.01)
    *G02B 27/01* (2006.01)
    *G06F 3/01* (2006.01)
    *G06F 3/041* (2006.01)
    *G09G 5/10* (2006.01)

(52) U.S. Cl.
    CPC .............. *G06F 3/013* (2013.01); *G06F 3/041* (2013.01); *G09G 5/10* (2013.01); *B60K 35/00* (2013.01); *B60K 35/23* (2024.01); *B60K 35/28* (2024.01); *B60K 2360/166* (2024.01); *B60Q 2300/146* (2013.01); *B60Q 2300/21* (2013.01); *B60Q 2300/23* (2013.01); *B60Q 2300/45* (2013.01); *B60Q 2400/50* (2013.01); *G02B 2027/0141* (2013.01); *G09G 2354/00* (2013.01); *G09G 2380/10* (2013.01)

(58) Field of Classification Search
    CPC .. G02B 2027/0105–0198; G09G 2380/00–16; G09G 2354/00; G09G 5/00–42; G06F 3/00–167; B60Q 9/00–008; B60Q 1/00–56; B60Q 2400/00–50; B60Q 2300/00–47
    See application file for complete search history.

(56) References Cited

U.S. PATENT DOCUMENTS

| | | | |
|---|---|---|---|
| 2018/0297470 A1* | 10/2018 | Kim | G08G 1/166 |
| 2019/0004611 A1 | 1/2019 | Katz | |
| 2019/0179587 A1* | 6/2019 | Hsiung | G02B 27/0101 |
| 2019/0392740 A1* | 12/2019 | Funabiki | G09G 5/10 |
| 2020/0317213 A1* | 10/2020 | Oba | B60K 35/29 |
| 2021/0157412 A1 | 5/2021 | Katz | |

* cited by examiner

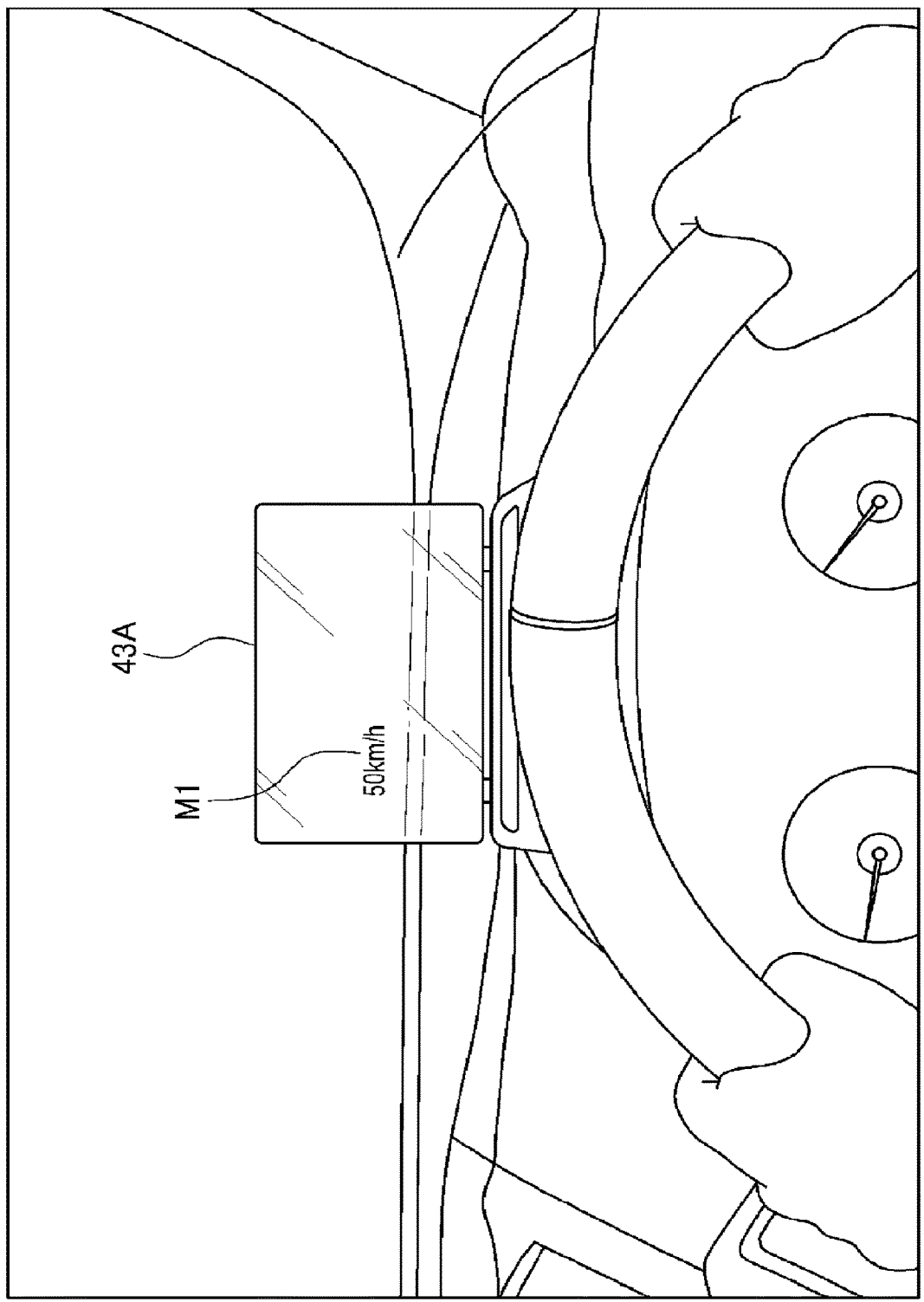

VEHICLE DISPLAY SYSTEM, VEHICLE SYSTEM, AND VEHICLE

TECHNICAL FIELD

The present disclosure relates to a vehicle display system, a vehicle system and a vehicle.

BACKGROUND ART

Currently, research on automatic driving technology of an automobile has been actively conducted in each country, and each country is considering the legislation so as to enable a vehicle (hereinbelow, a "vehicle" refers to an automobile) to travel in an automatic driving mode on public roads. Here, in the automatic driving mode, a vehicle system automatically controls traveling of a vehicle. Specifically, in the automatic driving mode, the vehicle system automatically performs at least one of a steering control (control on a traveling direction of the vehicle), a brake control and an accelerator control (control on braking and acceleration/deceleration of the vehicle), based on information (surrounding environment information) indicative of surrounding environments of the vehicle obtained from a camera and a sensor such as a radar (for example, a laser radar and a millimeter wave radar). On the other hand, in a manual driving mode to be described later, a driver controls the traveling of the vehicle, as in most of conventional vehicles. Specifically, in the manual driving mode, the traveling of the vehicle is controlled in conformity with a driver's operation (a steering operation, a braking operation, and an accelerator operation), and the vehicle system does not automatically perform the steering control, the brake control and the accelerator control. Note that, the driving mode of the vehicle is not a concept existing only in some vehicles but a concept existing in all vehicles including conventional vehicles having no automatic driving function. For example, the driving mode of the vehicle is classified in accordance with a vehicle control method or the like.

Thus, in the future, it is expected that vehicles traveling in the automatic driving mode (hereinbelow, appropriately referred to as "automatic driving vehicle") and vehicles traveling in the manual driving mode (hereinbelow, appropriately referred to as "manual driving vehicle") coexist on public roads.

As an example of the automatic driving technology, Patent Literature 1 discloses an automatic follow-up traveling system in which a following vehicle can automatically follow a preceding vehicle. In the automatic follow-up traveling system, each of the preceding vehicle and the following vehicle has an illumination system, character information for preventing the other vehicle from intruding between the preceding vehicle and the following vehicle is displayed on the illumination system of the preceding vehicle, and character information indicative of the automatic follow-up traveling mode is displayed on the illumination system of the following vehicle.

CITATION LIST

Patent Literature

Patent Literature 1: JPH09-277887A

SUMMARY OF INVENTION

Technical Problem

In the future automatic driving society, it is expected that visual communication between the automatic driving vehicle and the human will be more important. In particular, it is expected that visual communication between a vehicle and a target object such as a pedestrian existing outside the vehicle and visual communication between a vehicle and a passenger in the vehicle will be more important. In this respect, the visual communication between the vehicle and the target object can be implemented using a road surface drawing device configured to emit a light pattern on a road surface, and the visual communication between the vehicle and the passenger can be implemented using a head up display (HUD).

Usually, a display control unit (in-vehicle computer) of the vehicle display system automatically controls emission of the light pattern. However, in some cases, the passenger may want to manually control the emission of the light pattern according to the surrounding environments of the vehicle. For example, in a situation where the light pattern is not emitted on the road surface, the passenger may want to emit the light pattern toward a specific pedestrian around the vehicle. Thus, there is a room for further improvement on the vehicle display system from a standpoint of the manual control on the emission of the light pattern.

In addition, in a vehicle in which the road surface drawing device and the HUD are mounted, when an abnormality occurs in at least one of the road surface drawing device and the HUD, the visual communication between the vehicle and the passenger cannot be continuously performed. Thus, there is a room for study on a vehicle display system that can continuously perform the visual communication between the vehicle and the passenger even though an abnormality occurs in at least one of the road surface drawing device and the HUD.

Furthermore, in order to further increase reliability of the visual communication between the vehicle and the human, there is a desire to further increase operating speeds of the road surface drawing device and the HUD. Thus, there is a room for further improvement on the vehicle system from a standpoint of increasing the operating speeds of the road surface drawing device and the HUD.

A first object of the present disclosure is to provide a vehicle display system and a vehicle capable of improving usability when a passenger manually controls a light pattern.

A second object of the present disclosure is to provide a vehicle display system and a vehicle capable of continuously performing visual communication between a vehicle and a passenger even when an abnormality occurs in the vehicle display system.

A third object of the present disclosure is to provide a vehicle display system and a vehicle capable of increasing operating speeds of an HUD and a road surface drawing device.

Solution to Problem

A vehicle display system of an aspect of the present disclosure is provided to a vehicle, and includes:
 a first display device configured to emit a light pattern toward a road surface outside the vehicle;
 a second display device located inside the vehicle and configured to display predetermined information toward a passenger in the vehicle so that the predetermined information is superimposed on a real space outside the vehicle; and
 a display control unit configured to control the first display device.

The display control unit is configured to control emission of the light pattern according to a passenger's input operation on a display area where the predetermined information can be displayed.

According to the above configuration, the emission of the light pattern is controlled according to the passenger's input operation on the display area. In this way, the passenger can control the emission of the light pattern by an intuitive input operation. Therefore, it is possible to provide the vehicle display system capable of improving usability when the passenger manually controls the light pattern.

The display control unit may also be configured to control an emission position of the light pattern, based on a position of a view point of the passenger and an input position of the input operation.

According to the above configuration, the emission position of the light pattern is controlled based on the position of the view point of the passenger and the input position of the passenger's input operation. In this way, the passenger can decide the emission position of the light pattern by the intuitive input operation. Therefore, it is possible to provide the vehicle display system capable of improving usability when the passenger manually controls the light pattern.

The display control unit may also be configured to start the emission of the light pattern according to the input operation on the display area.

According to the above configuration, the emission of the light pattern starts according to the input operation on the display area. In this way, it is possible to emit the light pattern toward a target object (for example, a pedestrian and the like) outside the vehicle by the passenger's intuitive input operation.

The display control unit may also be configured:
to specify a start position of the light pattern on the road surface, based on a position of a view point of the passenger and a first input position of the input operation,
to specify an end position of the light pattern on the road surface, based on the position of the view point and a second input position of the input operation, and
to emit the light pattern onto the road surface, based on the start position and the end position.

According to the above configuration, the start position of the light pattern is specified based on the position of the view point of the passenger and the first input position of the input operation, and the end position of the light pattern is specified based on the view point of the passenger and the second input position of the input operation. In addition, the light pattern is emitted onto the road surface, based on the start position and the end position of the light pattern. In this way, it is possible to emit the light pattern toward the target object outside the vehicle by the passenger's intuitive input operation.

The display control unit may also be configured to change an emission position of the light pattern according to the input operation on the display area.

According to the above configuration, the emission position of the light pattern is changed according to the input operation on the display area. In this way, it is possible to change the emission position of the light pattern by the passenger's intuitive input operation.

The display control unit may also be configured:
to specify a first designation position on the road surface, based on a position of a view point of the passenger and a third input position of the input operation,
to specify a second designation position on the road surface, based on the position of the view point and a fourth input position of the input operation when the first designation position overlaps the light pattern emitted on the road surface, and
to change the emission position of the light pattern, based on the second designation position.

According to the above configuration, when the first designation position overlaps the emission position of the light pattern, the emission position of the light pattern is changed to the second designation position. In this way, it is possible to change the emission position of the light pattern by the passenger's intuitive input operation.

The display area may also have a touch panel configured to receive the input operation.

According to the above configuration, the emission of the light pattern is controlled according to the passenger's input operation on the touch panel. In this way, it is possible to control the emission of the light pattern by the passenger's intuitive input operation.

The vehicle display system may further include a tracking camera located inside the vehicle and configured to acquire image data indicating the passenger.

The display control unit may also be configured:
to specify a position of a view point of the passenger and a position of a passenger's hand, based on the image data,
to specify an input position of the input operation, based on the position of the hand, and
to control the emission position of the light pattern, based on the position of the view point and the input position of the input operation.

According to the above configuration, the position of the view point of the passenger and the position of the passenger's hand are specified based on the image data acquired by the tracking camera, and the input position of the passenger's input operation is then specified based on the position of the passenger's hand. In addition, the emission position of the light pattern is controlled based on the position of the view point of the passenger and the input position of the input operation. In this way, it is possible to control the emission position of the light pattern by a hand's operation in a space (where a touch panel is not used). Therefore, it is possible to provide the vehicle display system capable of improving usability when the passenger manually controls the light pattern.

A vehicle display system in accordance with an aspect of the present disclosure is a vehicle display system provided to a vehicle, and includes:
a first display device configured to emit a light pattern toward a road surface outside the vehicle;
a second display device located inside the vehicle and configured to display vehicle traveling information relating to traveling of the vehicle toward a passenger in the vehicle so that the vehicle traveling information is superimposed on a real space outside the vehicle; and
a display control unit configured to control the first display device and the second display device.

The display control unit causes the second display device to display information corresponding to the light pattern when it is determined that the first display device has an abnormality.

According to the above configuration, when it is determined that the first display device has an abnormality, the information corresponding to the light pattern is displayed on the second display device. In this way, it is possible to provide the vehicle display system that can perform visual communication between the vehicle and the passenger even when the first display device has an abnormality.

When it is determined that the first display device has an abnormality, if the first display device emits a plurality of the light patterns, the display control unit may cause the second display device to display information corresponding to each of the plurality of light patterns.

According to the above configuration, the information corresponding to all the light patterns is displayed on the second display device. In this way, even when the first display device has an abnormality, the passenger can continue to perceive the same information as before the abnormality occurs.

The display control unit may also be configured to cause the second display device to display abnormality information of the first display device.

According to the above configuration, the information indicating that the first display device has an abnormality is displayed on the second display device. In this way, the passenger can perceive that the first display device has an abnormality.

When it is determined that the second display device has an abnormality, the display control unit causes the first display device to emit a light pattern corresponding to the vehicle traveling information.

According to the above configuration, when it is determined that the second display device has an abnormality, the first display device is caused to emit the light pattern corresponding to the vehicle traveling information. In this way, it is possible to provide the vehicle display system that can perform visual communication between the vehicle and the passenger even when the second display device has an abnormality.

A vehicle display system in accordance with another aspect of the present disclosure is a vehicle display system provided to a vehicle, and includes:
  a first display device configured to emit a light pattern toward a road surface outside the vehicle;
  a second display device located inside the vehicle and configured to display vehicle traveling information relating to traveling of the vehicle toward a passenger in the vehicle so that the vehicle traveling information is superimposed on a real space outside the vehicle; and
  a display control unit configured to control the first display device and the second display device.

The display control unit causes the first display device to emit a light pattern corresponding to the vehicle traveling information when it is determined that the second display device has an abnormality.

According to the above configuration, when it is determined that the second display device has an abnormality, the first display device is caused to emit the light pattern corresponding to the vehicle traveling information. In this way, it is possible to provide the vehicle display system that can perform visual communication between the vehicle and the passenger even when the second display device has an abnormality.

When it is determined that the second display device has an abnormality, if the second display device displays a plurality of the vehicle traveling information, the display control unit may cause the first display device to emit a light pattern corresponding to at least one vehicle traveling information of the plurality of vehicle traveling information.

According to the above configuration, the first display device is caused to emit the light pattern corresponding to at least one information of the plurality of vehicle traveling information. For example, the first display device is caused to emit a light pattern corresponding to the vehicle traveling information, which consists of figure information or simple character information that can be easily read out from the light pattern, of the plurality of vehicle traveling information. In this way, even when the second display device has an abnormality, the passenger can continuously and correctly perceive substantially the same information as before the abnormality occurs.

A vehicle including the vehicle display system may also be provided.

According to the above configuration, it is possible to provide the vehicle display system that can perform visual communication between the vehicle and the passenger even when the vehicle display system has an abnormality.

A vehicle system in accordance with an aspect of the present disclosure is provided to a vehicle, and includes a vehicle control unit configured to control traveling of the vehicle, and a vehicle display system.

The vehicle display system includes:
  a head up display (HUD) located inside the vehicle and configured to display predetermined information toward a passenger in the vehicle so that the predetermined information is superimposed on a real space outside the vehicle;
  a road surface drawing device configured to emit a light pattern toward a road surface outside the vehicle; and
  a display control unit configured to decide whether to operate the road surface drawing device and the HUD, and to control operations of the road surface drawing device and the HUD.

According to the above configuration, the display control unit other than the vehicle control unit decides whether to operate the road surface drawing device and the HUD, and controls operations of the road surface drawing device and the HUD. In this way, it is possible to reduce a calculation load of the vehicle control unit and to increase operating speeds of the road surface drawing device and the HUD.

The display control unit may also include:
  a first electronic control unit including a first processor and a first memory and configured to control an operation of the HUD, and
  a second electronic control unit including a second processor and a second memory.

When the HUD is not operating, the second electronic control unit may control an operation of the road surface drawing device.

When the HUD is operating, the first electronic control unit may control the operations of the HUD and the road surface drawing device.

According to the above configuration, when the HUD is not operating, the second electronic control unit controls the operation of the road surface drawing device, and when the HUD is operating, the first electronic control unit controls the operations of the HUD and the road surface drawing device. In this way, when both the HUD and the road surface drawing device are operating, it is possible to operate at least one of the HUD and the road surface drawing device efficiently and at high speed. In particular, when the HUD and the road surface drawing device are operating in cooperation with each other (in other words, when an operating content of the other is decided according to an operating content of one of the HUD and the road surface drawing device), the first electronic control unit generates not only a control signal for controlling the operation of the HUD but also a control signal for controlling the operation of the road surface drawing device. For this reason, it is possible to operate the road surface drawing device efficiently and at high speed after considering the operating content of the HUD. Alternatively, it is possible to operate the HUD efficiently and at high speed after considering the operating content of the road surface drawing device.

The vehicle display system may further include an illumination device configured to emit a low beam and/or a high beam toward an outside of the vehicle.

When the HUD is not operating, the second electronic control unit may control operations of the road surface drawing device and the illumination device.

When the HUD is operating, the first electronic control unit may control the operations of the HUD and the road surface drawing device, and the second electronic control unit may control the operation of the illumination device.

According to the above configuration, when the HUD is not operating, the second electronic control unit control the operations of the road surface drawing device and the illumination device, and when the HUD is operating, the first electronic control unit controls the operations of both the HUD and the road surface drawing device. In this way, when both the HUD and the road surface drawing device are operating, it is possible to operate at least one of the HUD and the road surface drawing device efficiently and at high speed.

The vehicle display system may further include an illumination device configured to emit a low beam and/or a high beam toward an outside of the vehicle.

When the HUD is not operating, the second electronic control unit may control operations of the road surface drawing device and the illumination device.

When the HUD is operating, the first electronic control unit may control the operations of the HUD, the road surface drawing device and the illumination device.

According to the above configuration, when the HUD is not operating, the second electronic control unit controls the operations of the road surface drawing device and the illumination device, and when the HUD is operating, the first electronic control unit controls all operations of the HUD, the road surface drawing device and the illumination device. In this way, when all of the HUD, the road surface drawing device and the illumination device are operating, it is possible to operate at least one of the HUD, the road surface drawing device and the illumination device efficiently and at high speed. In particular, when the HUD, the road surface drawing device and the illumination device are operating in cooperation with each other, the first electronic control unit generates not only a control signal for controlling the operation of the HUD but also a control signal for controlling the operation of the road surface drawing device and a control signal for controlling the operation of the illumination device. For this reason, it is possible to operate the road surface drawing device and the illumination device efficiently and at high speeds after considering the operating content of the HUD. Alternatively, it is possible to operate the HUD efficiently and at high speed after considering the operating contents of the road surface drawing device and the illumination device.

A vehicle including the vehicle system is also provided.

According to the above configuration, it is possible to provide the vehicle capable of increasing operating speeds of the HUD and the road surface drawing device.

Advantageous Effects of Invention

According to the present disclosure, it is possible to provide the vehicle display system and the vehicle capable of improving usability when the passenger manually controls the light pattern.

In addition, it is possible to provide the vehicle display system and the vehicle including the vehicle display system capable of continuing to perform visual communication between the vehicle and the passenger even when the vehicle display system has an abnormality.

Further, it is possible to provide the vehicle display system and the vehicle capable of increasing the operating speeds of the HUD and the road surface drawing device.

BRIEF DESCRIPTION OF DRAWINGS

FIG. 18B illustrates an example of an HUD display in accordance with the second embodiment.

DESCRIPTION OF EMBODIMENTS

First Embodiment

Figure 1:
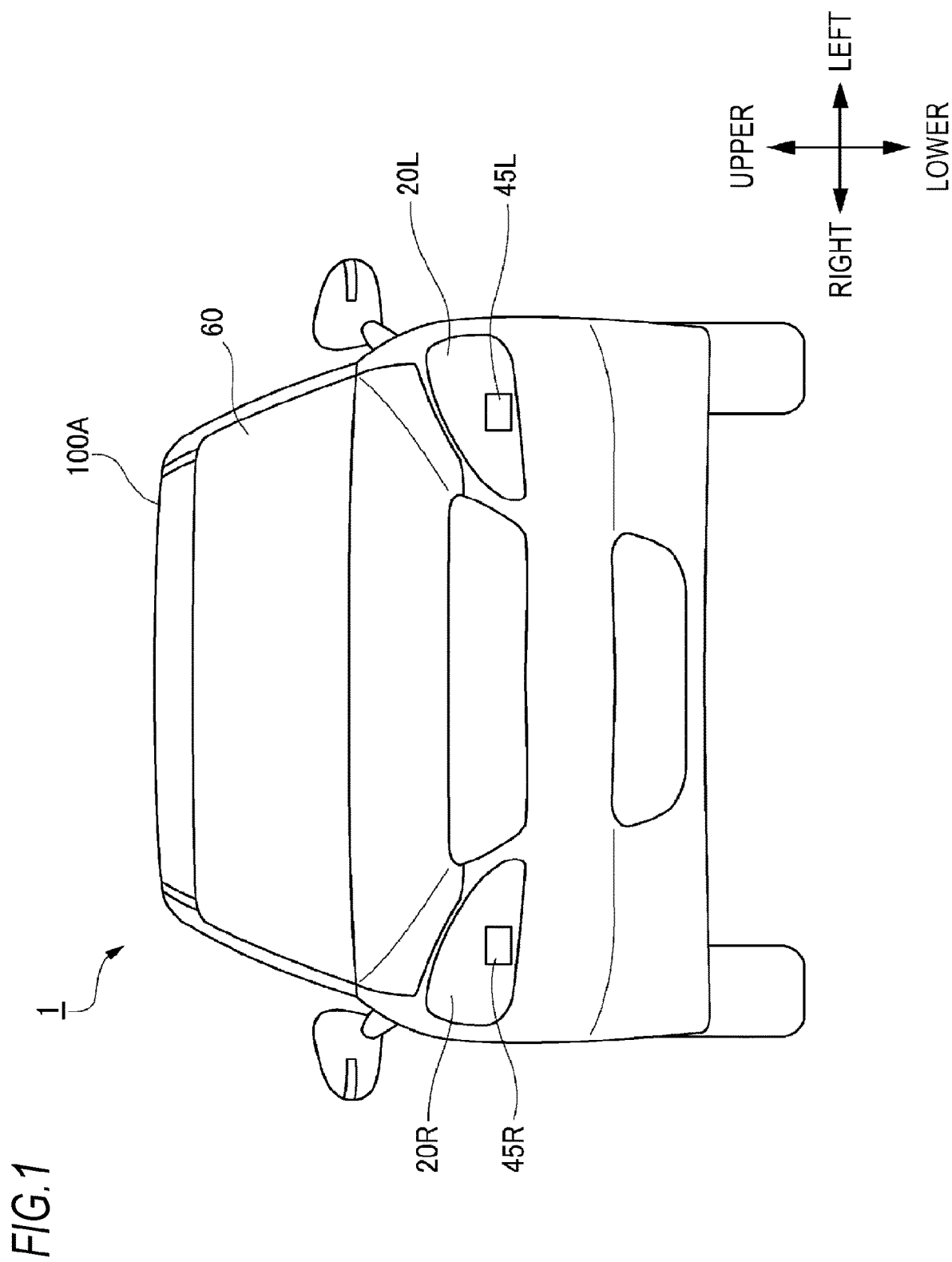
FIG. 1 is a front view of a vehicle on which a vehicle system in accordance with a first embodiment of the present invention is mounted.

Hereinbelow, a first embodiment of the present invention (hereinbelow, referred to as the present embodiment) will be described with reference to the drawings. For the sake of convenience of description, dimensions of the respective members shown in the drawings may be different from actual dimensions of the respective members.

Also, in the description of the present embodiment, for the sake of convenience of description, "the right and left direction", "the upper and lower direction" and "the front and rear direction" will be appropriately mentioned. The directions are relative directions set with respect to a vehicle 1 shown in FIG. 1. Here, "the right and left direction" is a direction including "the rightward direction" and "the leftward direction". "The upper and lower direction" is a direction including "the upward direction" and "the downward direction". "The front and rear direction" is a direction including "the forward direction" and "the rearward direction". The front and rear direction is not shown in FIG. 1 but is a direction orthogonal to the right and left direction and the upper and lower direction.

Figure 2:
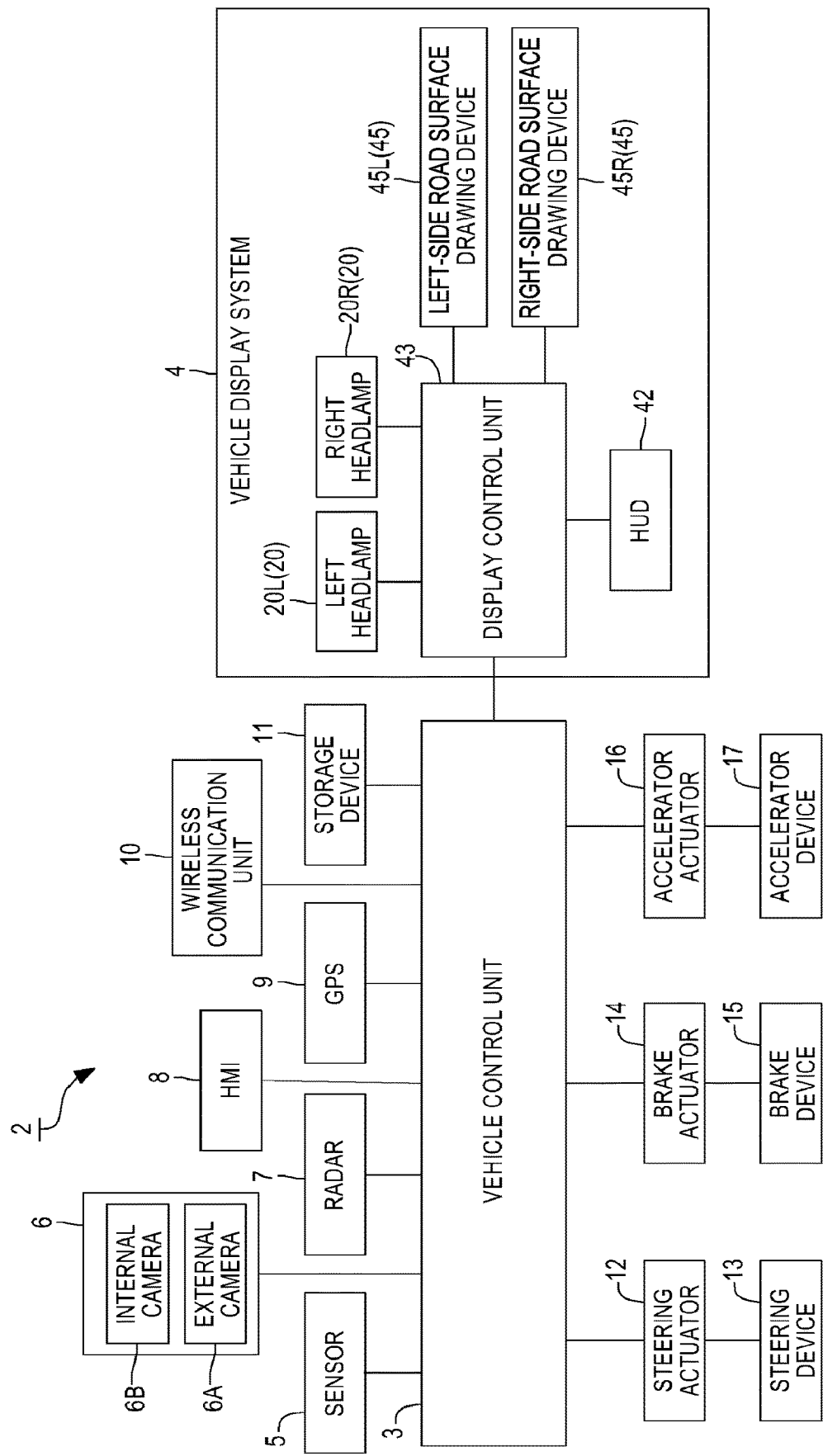
FIG. 2 is a block diagram of the vehicle system of the first embodiment.

First, a vehicle system 2 of the present embodiment is described with reference to FIGS. 1 and 2. FIG. 1 is a front view of a vehicle 1 on which the vehicle system 2 is mounted. FIG. 2 is a block diagram of the vehicle system 2. The vehicle 1 is a vehicle (automobile) capable of traveling in an automatic driving mode.

As shown in FIG. 2, the vehicle system 2 includes a vehicle control unit 3, a vehicle display system 4 (hereinbelow, simply referred to as "display system 4"), a sensor 5, a camera 6, and a radar 7. The vehicle system 2 also includes an HMI (Human Machine Interface) 8, a GPS (Global Positioning System) 9, a wireless communication unit 10, a storage device 11, a steering actuator 12, a steering device 13, a brake actuator 14, a brake device 15, an accelerator actuator 16, and an accelerator device 17.

The vehicle control unit 3 is configured to control traveling of the vehicle 1. The vehicle control unit 3 is configured by, for example, at least one an electronic control unit (ECU; Electronic Control Unit). The electronic control unit includes a computer system (for example, SoC (System on a Chip) and the like) having one or more processors and one or more memories, and an electronic circuit having an active element such as a transistor and a passive element. The processor includes, for example, at least one of a CPU (Central Processing Unit), an MPU (Micro Processing Unit), a GPU (Graphics Processing Unit) and a TPU (Tensor Processing Unit). The CPU may be configured by a plurality of CPU cores. The GPU may be configured by a plurality of GPU cores. The memory includes a ROM (Read Only Memory) and a RAM (Random Access Memory). In the ROM, a vehicle control program may be stored. For example, the vehicle control program may include an artificial intelligence (AI) program for automatic driving. The AI program is a program established by a supervised or unsupervised machine learning (particularly, deep learning) using a multi-layered neural network. In the RAM, the vehicle control program, vehicle control data and/or surrounding environment information indicative of surrounding environments of the vehicle may be temporarily stored. The processor may be configured to develop, on the RAM, a program designated from the diverse vehicle control programs stored in the ROM and to execute a variety of processes in cooperation with the RAM. The computer system may also be configured by a non-Neumann type computer such as an ASIC (Application Specific Integrated Circuit), an FPGA (Field-Programmable Gate Array) and the like. The computer system may also be configured by a combination of a Neumann type computer and a non-Neumann type computer.

The display system 4 includes a left-side headlamp 20L, a right-side headlamp 20R, a left-side road surface drawing device 45L, and a right-side road surface drawing device 45R. The display system 4 also includes an HUD (Head-Up Display) 42 and a display control unit 43.

As shown in FIG. 1, the left-side headlamp 20L is arranged on a left front surface of the vehicle 1, and includes a low beam lamp configured to emit a low beam toward the front of the vehicle 1 and a high beam lamp configured to emit a high beam toward the front of the vehicle 1. The right-side headlamp 20R is arranged on a right front surface of the vehicle 1, and includes a low beam lamp configured to emit a low beam toward the front of the vehicle 1 and a high beam lamp configured to emit a high beam toward the front of the vehicle 1. The low beam lamp and the high beam lamp each include one or more light-emitting elements such as an LED (Light Emitting Diode) and an LD (Laser Diode), and an optical member such as a lens and a reflector. In the below, for the sake of convenience of descriptions, the left-side headlamp 20L and the right-side headlamp 20R may also be collectively referred to as the headlamp 20.

The left-side road surface drawing device 45L (an example of the first display device) is arranged in a lamp chamber of the left-side headlamp 20L. The left-side road surface drawing device 45L is configured to emit a light pattern toward a road surface outside the vehicle 1. The left-side road surface drawing device 45L includes, for example, a light source unit, a drive mirror, an optic system such as a lens and a mirror, a light source drive circuit, and a mirror drive circuit. The light source unit is a laser light source or an LED light source. For example, the laser light source is an RGB laser light source configured to emit red laser light, green laser light and blue laser light. The drive mirror is, for example, a MEMS (Micro Electro Mechanical Systems) mirror, a DMD (Digital Mirror Device), a galvano mirror, a polygon mirror and the like. The light source drive circuit is configured to drive and control the light source unit. The light source drive circuit is configured to generate a control signal for controlling an operation of the light source unit, based on a signal relating to a predetermined light pattern transmitted from the display control unit 43, and to transmit the generated control signal to the light source unit. The mirror drive circuit is configured to drive and control the drive mirror. The mirror drive circuit is configured to generate a control signal for controlling an operation of the drive mirror, based on a signal relating to a predetermined light pattern transmitted from the display control unit 43, and to transmit the generated control signal to the drive mirror. In a case where the light source unit is an RGB laser light source, the left-side road surface drawing device 45L can draw a light pattern of diverse colors onto the road surface by scanning laser light. For example, the light pattern may be a light pattern of an arrow shape indicative of a traveling direction of the vehicle 1.

The right-side road surface drawing device 45R (an example of the first display device) is arranged in a lamp chamber of the right-side headlamp 20R. The right-side road surface drawing device 45R is configured to emit a light pattern toward the road surface outside the vehicle 1. Similarly to the left-side road surface drawing device 45L, the right-side road surface drawing device 45R includes a light source unit, a drive mirror, an optic system such as a lens, a light source drive circuit, and a mirror drive circuit.

A drawing method of the left-side road surface drawing device 45L and the right-side road surface drawing device 45R may be a raster scan method, a DLP (Digital Light Processing) method or an LCOS (Liquid Crystal on Silicon). In a case where the DLP method or LCOS method is adopted, the light source unit may be an LED light source. In addition, as the drawing method of the left-side road surface drawing device 45L and the right-side road surface drawing device 45R, a projection method may also be used. In a case where the projection method is adopted, the light source unit may be a plurality of LED light sources aligned in a matrix shape. In the present embodiment, the left-side road surface drawing device 45L and the right-side road surface drawing device 45R may be arranged on a vehicle body roof 100A. In this respect, one road surface drawing device may be arranged on the vehicle body roof 100A. In the below, for the sake of convenience of descriptions, the left-side road surface drawing device 45L and the right-side road surface drawing device 45R may be collectively referred to as the road surface drawing device 45. Also, in descriptions below, the road surface drawing device 45 is the left-side road surface drawing device 45L, the right-side road surface drawing device 45R or a combination of the left-side road surface drawing device 45L and the right-side road surface drawing device 45R.

Figure 3:
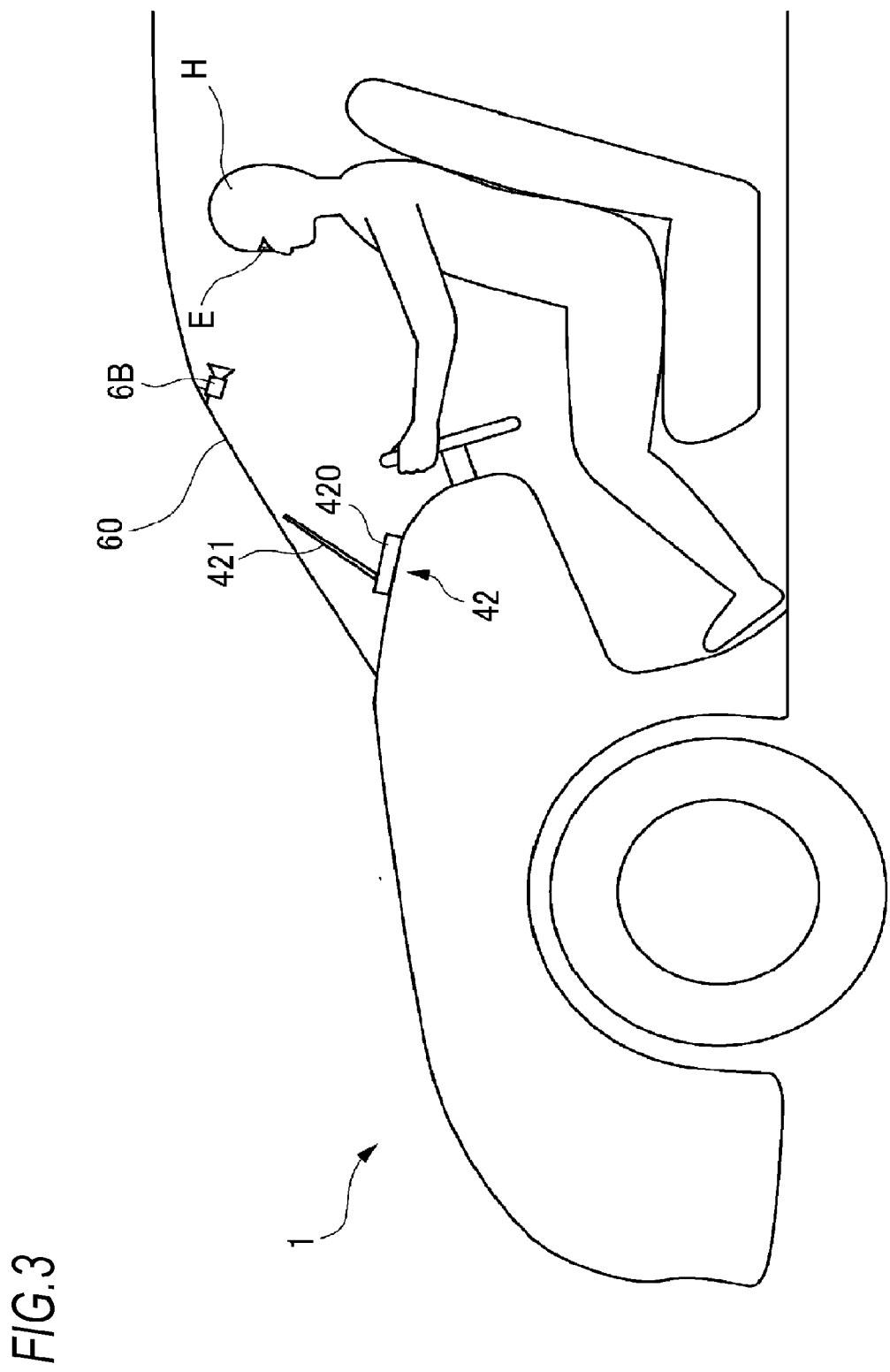
FIG. 3 depicts a passenger in the vehicle, an HUD (Head-Up Display) arranged on a dashboard, and an internal camera configured to track a view point of the passenger.

The HUD 42 (an example of the second display device) is located inside the vehicle 1. Specifically, the HUD 42 is installed at a predetermined place in an interior of the vehicle 1. For example, as shown in FIG. 3, the HUD 42 may be arranged on a dashboard of the vehicle 1. The HUD 42 is configured to function as a visual interface between the vehicle 1 and a passenger H. The HUD 42 is configured to display predetermined information (hereinbelow, referred to as HUD information) toward the passenger H so that the predetermined information is superimposed on a real space outside the vehicle 1 (particularly, the surrounding environment in front of the vehicle 1). In this way, the HUD 42 is configured to function as an AR (Augmented Reality) display. The HUD information that is displayed by the HUD 42 is, for example, vehicle traveling information relating to traveling of the vehicle 1 and/or surrounding environment information (particularly, information about a target object outside the vehicle 1) relating to the surrounding environments of the vehicle 1.

As shown in FIG. 3, the HUD 42 includes an HUD body part 420, and a transparent screen 421. The HUD body part 420 includes a light source unit, a drive mirror, an optic system, a light source drive circuit, and a mirror drive circuit. The light source unit is, for example, a laser light source or an LED light source. The laser light source is an RGB laser light source configured to emit red laser light, green laser light and blue laser light. The drive mirror is, for example, a MEMS mirror, a DMD, a galvano mirror, a polygon mirror and the like. The optic system includes at least one of a prism, a lens, a diffusion plate and a magnifying lens. The light source drive circuit is configured to drive and control the light source unit. The light source drive circuit is configured to generate a control signal for controlling an operation of the light source unit, based on image data transmitted from the display control unit 43, and to transmit the generated control signal to the light source unit. The mirror drive circuit is configured to drive and control the drive mirror. The mirror drive circuit is configured to generate a control signal for controlling an operation of the drive mirror, based on image data transmitted from the display control unit 43, and to transmit the generated control signal to the drive mirror.

The transparent screen 421 is a transparent combiner (a transparent plate-shaped member). The transparent screen 421 has an HUD display area D1 where the HUD information can be displayed (refer to FIGS. 6 and 7, etc.). The light (image) emitted from the HUD body part 420 is irradiated to the HUD display area D1 of the transparent screen 421. Then, the HUD display area D1 reflects the light emitted from the HUD body part 420 toward the view point E of the passenger H. As a result, the passenger H recognizes the light (image) emitted from the HUD body part 420, as a virtual image formed at a predetermined position ahead of the transparent screen 421. In this way, the HUD information (image) displayed by the HUD 42 is superimposed on the real space in front of the vehicle 1, so that the passenger E can recognize as if the HUD information floats on the road.

The transparent screen 421 also includes a touch panel configured to receive an input operation of the passenger H. In particular, the touch panel is provided in the HUD display area D1 of the transparent screen 421. When the passenger H touches the HUD display area D1 with a finger, a predetermined operation signal corresponding to the input operation of the passenger H is generated from the transparent screen 421 (particularly, the touch panel) and is then transmitted to the display control unit 43. In this way, the display control unit 43 is configured to execute predetermined processing according to the input operation of the passenger H on the touch panel.

Note that, in the present embodiment, the transparent screen 421 may also be configured by a part of a front window 60. Also in this case, the part of the front window 60 has the HUD display area D1. The passenger H recognizes the light (image) emitted from the HUD body part 420, as a virtual image formed at a predetermined position ahead of the front window 60.

The position (virtual image formation position) at which the virtual image is formed may be varied by adjusting a position of the optic system of the HUD 42 (particularly, a focal distance of a projection optic system). In this respect, the display control unit 43 can control the HUD 42 so that a position of a target object substantially coincides with the virtual image formation position, based on position information of the target object in front of the vehicle 1. The drawing method of the HUD 42 may be a raster scan method, a DLP method or an LCOS method. In a case where the DLP method or the LCOS method is adopted, the light source unit of the HUD 42 may be an LED light source.

The display control unit 43 is configured to control operations of the road surface drawing device 45 (specifically, the left-side road surface drawing device 45L and the right-side road surface drawing device 45R), the headlamp 20 (specifically, the left-side headlamp 20L and the right-side headlamp 20R) and the HUD 42. In this respect, the display control unit 43 is configured to control operations of the road surface drawing device 45 (specifically, the left-side road surface drawing device 45L and the right-side road surface drawing device 45R) so that the light pattern is irradiated to a predetermined position on the road surface. In particular, the display control unit 43 is configured to control emission of a light pattern, according to the input operation of the passenger H on the HUD display area D1 (touch panel). The display control unit 43 is also configured to control the operation of the HUD 42 so that the HUD information is displayed in the HUD display area D1.

The display control unit 43 is configured by an electronic control unit (ECU). The electronic control unit includes a computer system (for example, SoC and the like) having one or more processors and one or more memories, and an electronic circuit having an active element such as a transistor and a passive element. The processor includes at least one of a CPU, an MPU, a GPU and a TPU. The memory includes a ROM and a RAM. The computer system may also be configured by a non-Neumann type computer such as an ASIC, an FPGA and the like.

In the present embodiment, the vehicle control unit 3 and the display control unit 43 are separately provided. However, the vehicle control unit 3 and the display control unit 43 may also be integrally configured. In this respect, the display control unit 43 and the vehicle control unit 3 may be configured by a single electronic control unit. The display control unit 43 may also be configured by two electronic control units of an electronic control unit configured to control operations of the headlamp 20 and the road surface drawing device 45 and an electronic control unit configured to control an operation of the HUD 42.

The sensor 5 includes at least one of an acceleration sensor, a speed sensor and a gyro sensor. The sensor 5 is configured to detect a traveling condition of the vehicle 1 and to output traveling condition information to the vehicle control unit 3. The sensor 5 may further include a seating sensor configured to detect whether a driver is sitting on a driver seat, a face direction sensor configured to detect a direction of a driver's face, an external weather sensor configured to detect an external weather condition, a passenger detection sensor configured to detect whether there is a passenger in a vehicle, and the like.

The camera 6 is, for example, a camera including an imaging element such as a CCD (Charge-Coupled Device) and a CMOS (complementary MOS). The camera 6 includes one or more external cameras 6A and an internal camera 6B. The external cameras 6A are each configured to acquire image data indicative of the surrounding environments of the vehicle 1 and to transmit the image data to the vehicle control unit 3. The vehicle control unit 3 is configured to acquire the surrounding environment information, based on the transmitted image data. Here, the surrounding environment information may include information about target objects (pedestrians, other vehicles, marks and the like) existing outside the vehicle 1. For example, the surrounding environment information may include information about an attribute of the target object existing outside the vehicle 1, and information about a distance and a position of the target object relative to the vehicle 1. The external camera 6A may be configured as a monocular camera or a stereo camera.

The internal camera 6B is arranged inside the vehicle 1 and is configured to acquire image data indicative of the passenger H. The internal camera 6B may be arranged at a predetermined position on a ceiling of the vehicle 1 (refer to FIG. 3) or may be arranged on the dashboard. The internal camera 6B is configured to function as a tracking camera for tracking the view point E of the passenger H. Here, the view point E of the passenger H may be either a view point of a left eye or a view point of a right eye of the passenger H. Alternatively, the view point E may be defined as a center point of a line segment connecting the view point of the left eye and the view point of the right eye. The display control unit 43 may also be configured to specify a position of the view point E of the passenger H, based on the image data acquired by the internal camera 6B. The position of the view point E of the passenger H may be updated with a predetermined cycle based on the image data or may be decided only once at the time of start of the vehicle 1.

The radar 7 includes at least one of a millimeter wave radar, a microwave radar and a laser radar (for example, LiDAR unit). For example, the LiDAR unit is configured to detect the surrounding environments of the vehicle 1. In particular, the LiDAR unit is configured to acquire 3D mapping data (point group data) indicative of the surrounding environments of the vehicle 1 and to transmit the 3D mapping data to the vehicle control unit 3. The vehicle control unit 3 is configured to specify the surrounding environment information, based on the transmitted 3D mapping data.

The HMI 8 includes an input unit configured to receive an input operation from a driver and an output unit configured to output the traveling information and the like toward the driver. The input unit includes a steering wheel, an accelerator pedal, a brake pedal, a driving mode changeover switch for switching the driving mode of the vehicle 1, and the like. The output unit is a display (except the HUD) configured to display the diverse traveling information. The GPS 9 is configured to acquire current position information of the vehicle 1 and to output the acquired current position information to the vehicle control unit 3

The wireless communication unit 10 is configured to receive information (for example, traveling information, and the like) relating to other vehicles around the vehicle 1 from the other vehicles and to transmit information (for example, traveling information, and the like) relating to the vehicle 1 to the other vehicles (inter-vehicle communication). The wireless communication unit 10 is also configured to receive infrastructure information from the infrastructure equipment such as a traffic light, a marker lamp and the like and to transmit the traveling information of the vehicle 1 to the infrastructure equipment (road-to-vehicle communication). The wireless communication unit 10 is also configured to receive information relating to a pedestrian from a portable electronic device (a smartphone, a tablet, a wearable device, and the like) carried by the pedestrian and to transmit the host vehicle traveling information of the vehicle 1 to the portable electronic device (pedestrian-to-vehicle communication). The vehicle 1 may be configured to perform communication with the other vehicle, the infrastructure equipment or the portable electronic device by an ad hook mode directly or via an access point. The vehicle 1 may also be configured to perform communication with the other vehicle, the infrastructure equipment or the portable electronic device via a communication network (not shown). The communication network includes at least one of the Internet, a local area network (LAN), a wide area network (WAN) and a wireless access network (RAN). The wireless communication standards are, for example, Wi-Fi (registered trademark), Bluetooth (registered trademark), ZigBee (registered trademark), LPWA, DSRC (registered trademark) or Li-Fi. The vehicle 1 may also be configured to perform communication with the other vehicle, the infrastructure equipment or the portable electronic device via a fifth generation (5G) mobile communication system.

The storage device 11 is an external storage device such as a hard disc drive (HDD), an SSD (Solid State Drive) and the like. In the storage device 11, the 2D or 3D map information and/or the vehicle control program may be stored. For example, the 3D map information may be configured by the 3D mapping data (point group data). The storage device 11 is configured to output the map information and the vehicle control program to the vehicle control unit 3, in response to a request from the vehicle control unit 3. The map information and the vehicle control program may be updated via the wireless communication unit 10 and the communication network.

When the vehicle 1 travels in an automatic driving mode, the vehicle control unit 3 automatically generates at least one of a steering control signal, an accelerator control signal and a brake control signal, based on the traveling condition information, the surrounding environment information, the current position information, the map information and the like. The steering actuator 12 is configured to receive the steering control signal from the vehicle control unit 3 and to control the steering device 13 on the basis of the received steering control signal. The brake actuator 14 is configured to receive the brake control signal from the vehicle control unit 3 and to control the brake device 15 on the basis of the received brake control signal. The accelerator actuator 16 is configured to receive the accelerator control signal from the vehicle control unit 3 and to control the accelerator device 17 on the basis of the received accelerator control signal. In this way, the vehicle control unit 3 automatically controls the traveling of the vehicle 1, based on the traveling condition information, the surrounding environment information, the current position information, the map information and the like. That is, in the automatic driving mode, the traveling of the vehicle 1 is automatically controlled by the vehicle system 2.

On the other hand, when the vehicle 1 travels in a manual driving mode, the vehicle control unit 3 generates a steering control signal, an accelerator control signal and a brake control signal, in conformity with a driver's manual operation on the accelerator pedal, the brake pedal and the steering wheel. In this way, in the manual driving mode, the steering control signal, the accelerator control signal and the brake control signal are generated by the driver's manual operation, so that the traveling of the vehicle 1 is controlled by the driver.

Subsequently, the driving mode of the vehicle 1 is described. The driving mode includes an automatic driving mode and a manual driving mode. The automatic driving mode includes a full-automatic driving mode, an advanced driving support mode, and a driving support mode. In the full-automatic driving mode, the vehicle system 2 is configured to automatically perform all of the traveling controls of the steering control, the brake control and the accelerator control, and the driver is not in a state where the driver can drive the vehicle 1. In the advanced driving support mode, the vehicle system 2 is configured to automatically perform all of the traveling controls of the steering control, the brake control and the accelerator control, and the driver does not drive the vehicle 1 although the driver is in a state where the driver can drive the vehicle 1. In the driving support mode, the vehicle system 2 is configured to automatically perform a part of the traveling controls of the steering control, the brake control and the accelerator control, and the driver drives the vehicle 1 under the driving support of the vehicle system 2. On the other hand, in the manual driving mode, the vehicle system 2 is configured not to automatically perform the traveling controls, and the driver drives the vehicle 1 without the driving support of the vehicle system 2.

The driving mode of the vehicle 1 may also be switched by operating a driving mode changeover switch. In this case, the vehicle control unit 3 is configured to switch the driving mode of the vehicle 1 among the four driving modes (the full-automatic driving mode, the advanced driving support mode, the driving support mode, and the manual driving mode), in response to a driver's operation on the driving mode changeover switch. The driving mode of the vehicle 1 may also be automatically switched on the basis of information relating to a travel-allowed section where traveling of an automatic driving vehicle is allowed or a travel-prohibited section where the traveling of the automatic driving vehicle is prohibited or information relating to the external weather condition. In this case, the vehicle control unit 3 is configured to switch the driving mode of the vehicle 1, based on such information. The driving mode of the vehicle 1 may also be automatically switched by using a seating sensor, a face direction sensor, or the like. In this case, the vehicle control unit 3 is configured to switch the driving mode of the vehicle 1, based on an output signal from the seating sensor or the face direction sensor.

Figure 4:
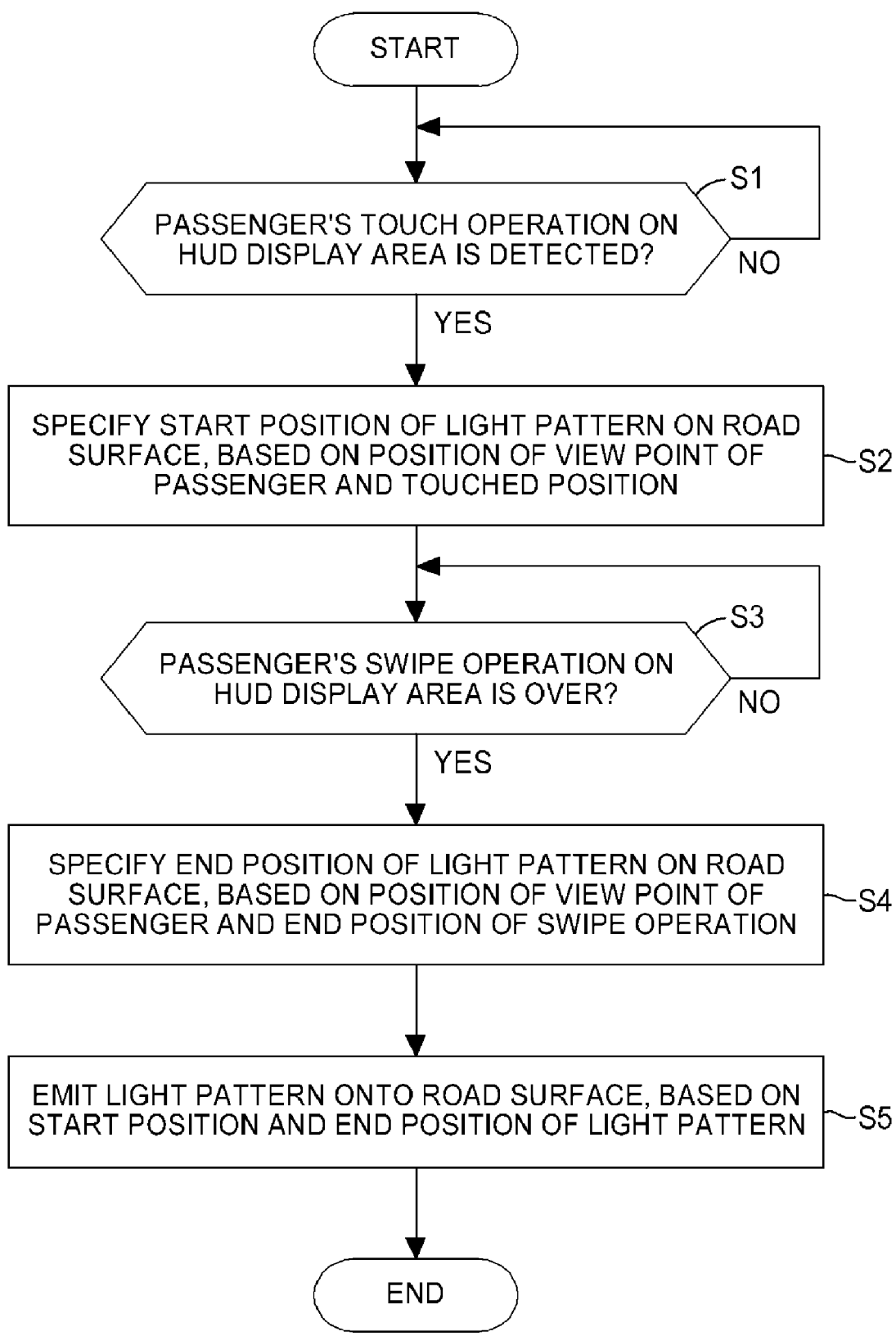
FIG. 4 is a flowchart for illustrating a first operation example of a display system of the first embodiment.
Figure 5:
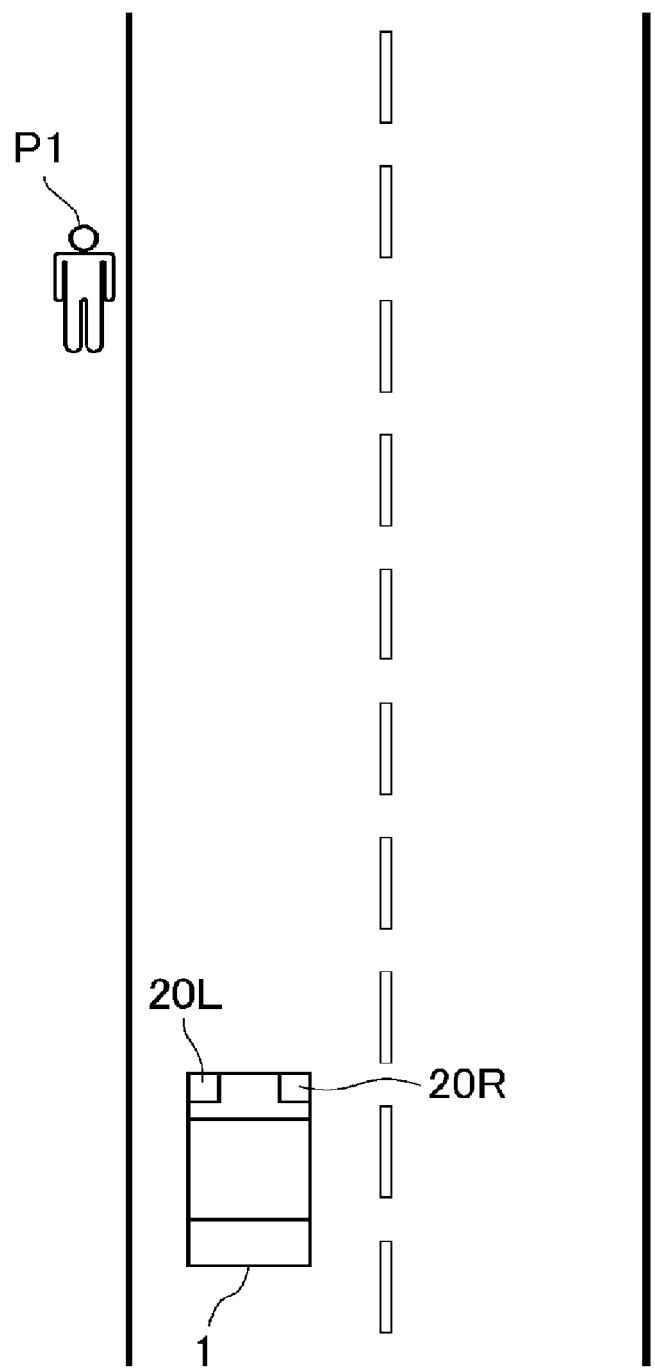
FIG. 5 depicts a vehicle and a pedestrian around the vehicle.
Figure 6:
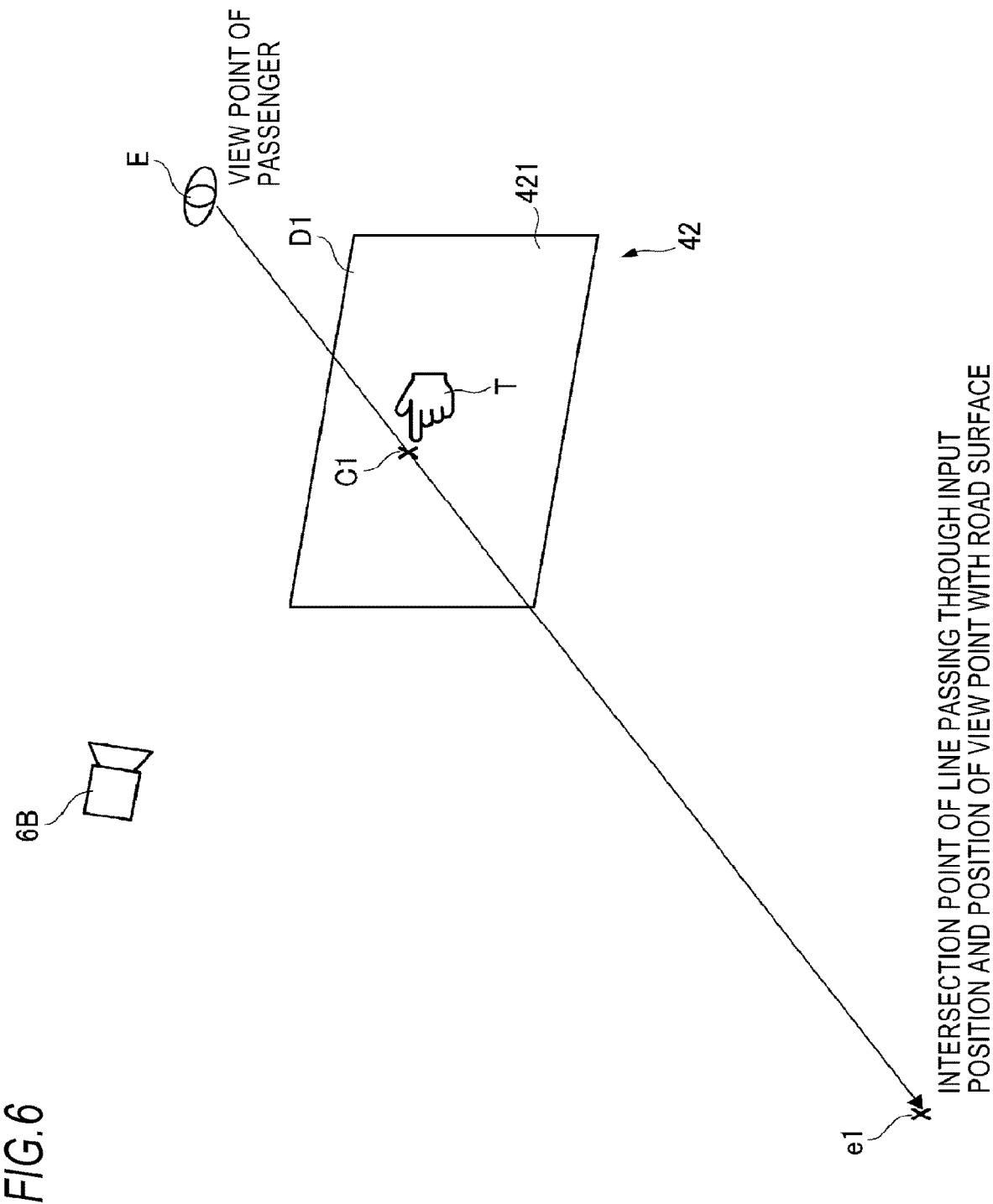
FIG. 6 illustrates a method of specifying a start position of a light pattern based on a position of a view point of the passenger and a touched position.
Figure 7:
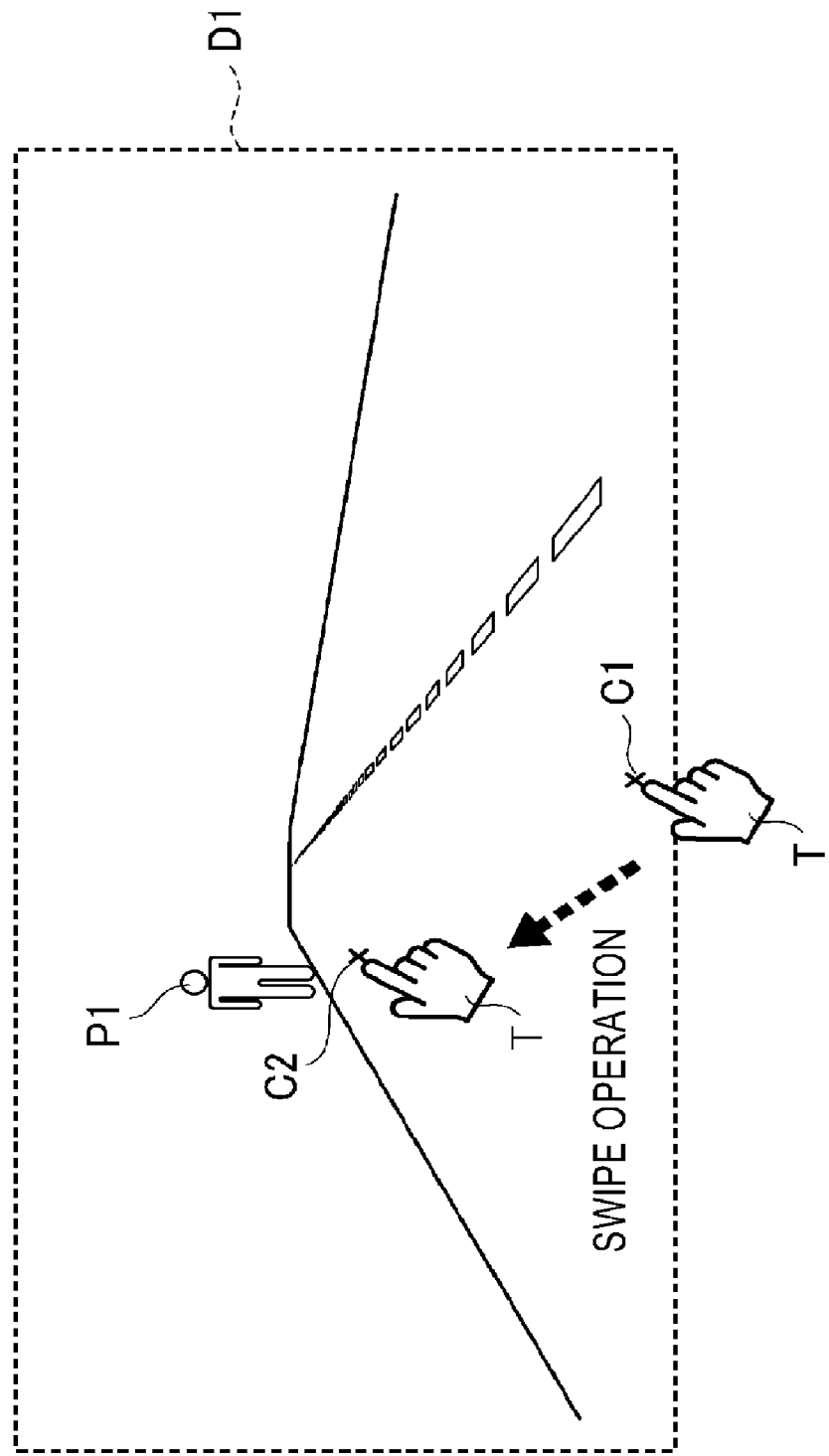
FIG. 7 depicts an aspect of designating two input positions on an HUD display area by a swipe operation.
Figure 8:
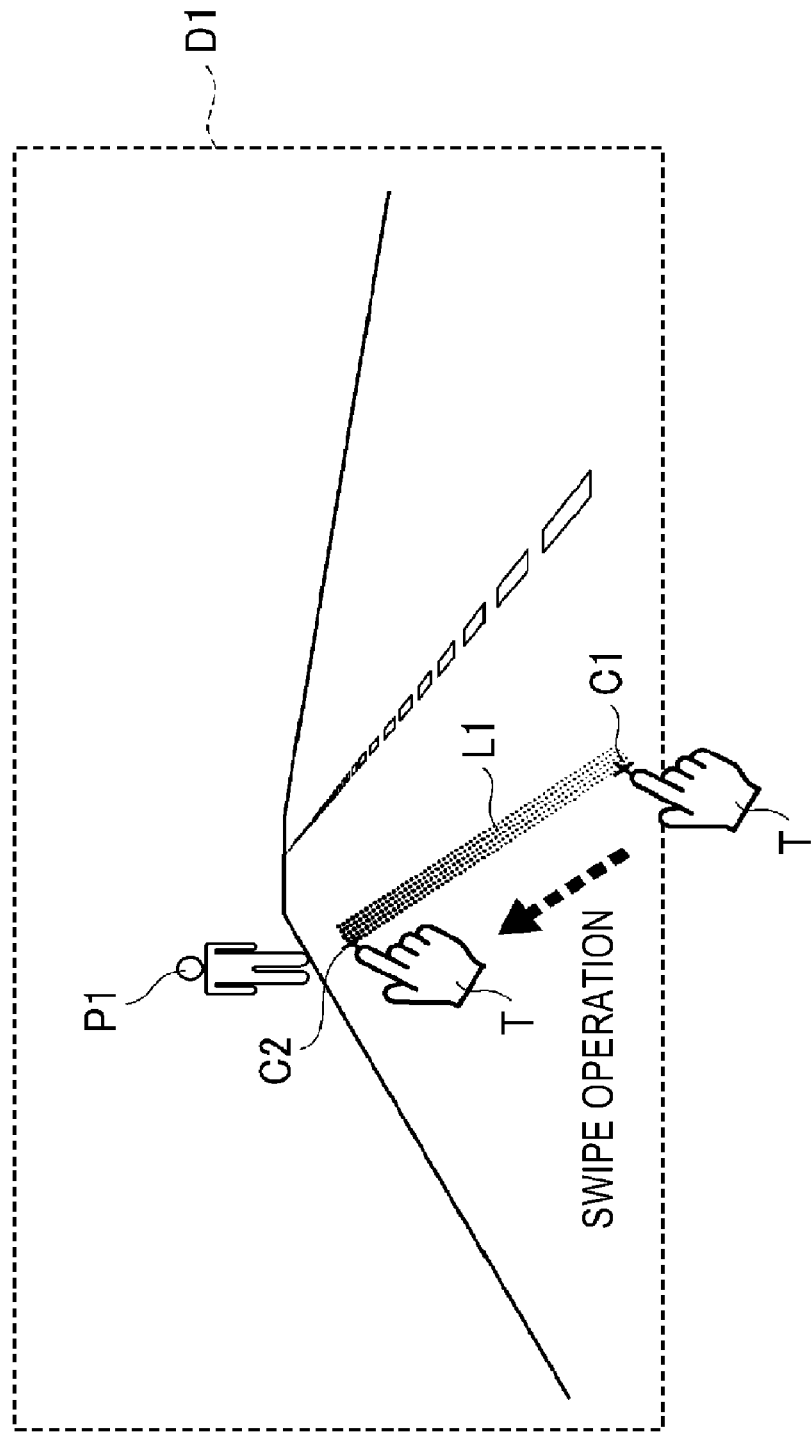
FIG. 8 depicts an aspect where the light pattern is emitted onto a road surface based on the two input positions designated by the swipe operation.
Figure 9:
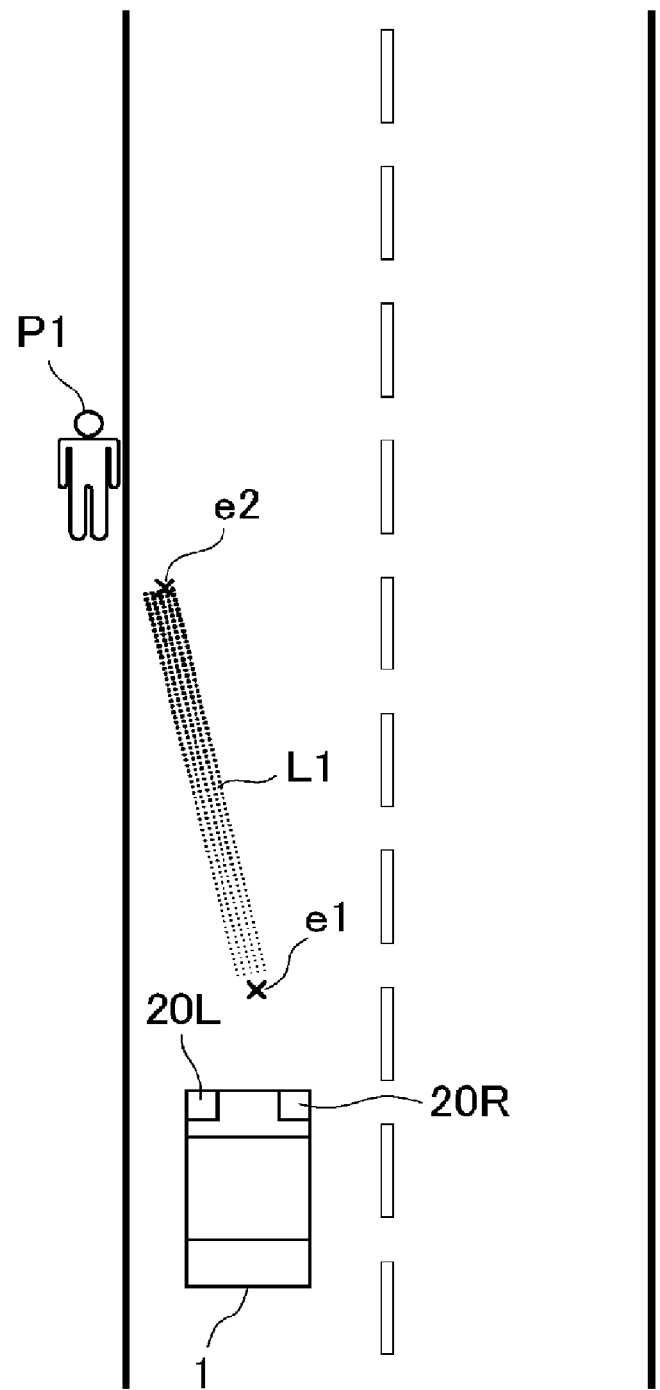
FIG. 9 depicts the light pattern emitted from the vehicle toward the pedestrian.

Subsequently, a first operation example of the display system 4 of the present embodiment is described with reference to FIGS. 4 to 9. FIG. 4 is a flowchart for illustrating a first operation example of the display system 4 of the present embodiment. FIG. 5 depicts the vehicle 1 and a pedestrian P1 around the vehicle 1. FIG. 6 illustrates a method of specifying a start position e1 of a light pattern L1 based on a position of the view point E of the passenger H and a touched position C1. FIG. 7 depicts an aspect of designating two input positions (a touched position C1 and an end position C2) on the HUD display area D1 by a swipe operation. FIG. 8 depicts an aspect where the light pattern L1 is emitted onto a road surface based on the two input positions designated by the swipe operation. FIG. 9 depicts the light pattern L1 emitted from the vehicle 1 toward the pedestrian P1. Note that, in FIGS. 7 and 8, the front surrounding environment that is visually recognized by the passenger E through the HUD display area D1 of the transparent screen 421 is shown.

As shown in FIG. 4, in step S1, the display control unit 43 determines whether a touch operation of the passenger H on the HUD display area D1 (touch panel) is detected. When a determination result of step S1 is YES, the processing proceeds to step S2. On the other hand, when a determination result of step S1 is NO, the determination processing of step S1 is repeatedly executed until the touch operation is detected.

Then, in step S2, the display control unit 43 specifies a start position e1 (refer to FIG. 9) of the light pattern L1 on the road surface, based on the position of the view point E of the passenger H and the touched position C1 (an example of the first input position, refer to FIG. 7) of the hand T of the passenger H. Specifically, the display control unit 43 specifies the position of the view point E of the passenger H, based on the image data indicative of the passenger H acquired by the internal camera 6B. In addition, the transparent screen 421 (touch panel) generates an operation signal indicating the touched position C1 of the hand T, in response to the touch operation of the passenger H, and transmits the operation signal to the display control unit 43. Then, the display control unit 43 specifies the start position e1 of the light pattern L1, based on the position of the view point E and the touched position C1. In this respect, as shown in FIG. 6, an intersection point of a line passing through the position of the view point E and the touched position C1 with the road surface is specified as the start position e1.

Then, in step S3, the display control unit 43 determines whether the swipe operation of the passenger H on the HUD display area D1 is over. When a determination result of step S3 is YES, the processing proceeds to step S4. On the other hand, when a determination result of step S3 is NO, the display control unit 43 stands by until the swipe operation of the passenger H is over.

Then, in step S4, the display control unit 43 specifies an end position e2 of the light pattern L1 (refer to FIG. 9), based on the position of the view point E of the passenger H and an end position C2 of the swipe operation (an example of the second input position, refer to FIG. 7). Specifically, the display control unit 43 specifies the position of the view point E of the passenger H, based on the image data acquired by the internal camera 6B. The transparent screen 421 generates an operation signal indicative of the end position C2 of the swipe operation of the passenger H, and transmits the operation signal to the display control unit 43. Then, the display control unit 43 specifies the end position e2 of the light pattern L1, based on the position of the view point E and the end position C2.

Then, in step S5, the display control unit 43 causes the light pattern L1 to be emitted onto the road surface, based on the start position e1 and the end position e2. In particular, as shown in FIG. 9, the display control unit 43 controls the emission of the light pattern L1 so that one end of the light pattern L1 corresponds to the start position e1 and the other end of the light pattern L1 corresponds to the end position e2. Also, as shown in FIG. 8, in the field of view of the passenger H, the touched position C1 overlaps one end of the light pattern L1, and the end position C2 of the swipe operation overlaps the other end of the light pattern L1.

According to the first operation example of the display system 4, the emission of the light pattern is controlled according to the input operation of the passenger H on the HUD display area D1. In this way, the passenger H can control the emission of the light pattern by the intuitive input operation (for example, the swipe operation). Therefore, it is possible to provide the display system 4 capable of improving usability when the passenger H manually controls the light pattern.

Particularly, in the present operation example, the emission of the light pattern L1 is started, in response to the input operation on the HUD display area D1. More specifically, the start position e1 of the light pattern L1 is specified based on the position of the view point E of the passenger H and the touched position C1, and the end position e2 of the light pattern L1 is specified based on the position of the view point E and the end position C2 of the swipe operation. In addition, the light pattern L1 is emitted onto the road surface, based on the start position e1 and the end position e2. In this way, the light pattern L1 can be emitted toward the target object such as the pedestrian P1 existing outside the vehicle 1 by the intuitive input operation of the passenger H. The pedestrian P1 can be relieved because the pedestrian can clearly perceive that the vehicle 1 recognizes the pedestrian P1 by seeing the light pattern L1 emitted on the road surface. In this way, it is possible to implement rich visual communication between the vehicle 1 and the target object such as the pedestrian P1 by the light pattern L1.

Note that, in the present embodiment, the emission of the light pattern is controlled by the swipe operation of the passenger H. However, the input operation of the passenger H is not limited to the swipe operation. For example, the emission of the light pattern can also be controlled by an input operation (two touch operations) other than the swipe operation. In this case, the start position e1 of the light pattern L1 may be specified by a first touch operation, and the end position e2 of the light pattern L1 may be specified by a second touch operation.

In the descriptions of the present embodiment, the light pattern L1 is a linear light pattern. However, the shape of the light pattern L1 is not limited to the linear shape and may be any shape such as a triangular shape and an arrow shape. In the present embodiment, the position of the view point E is updated with a predetermined cycle, based on the image data acquired by the internal camera 6B. However, the present embodiment is not limited thereto. For example, the position of the view point E may be decided only once at the time of start of the vehicle 1.

Figure 10:
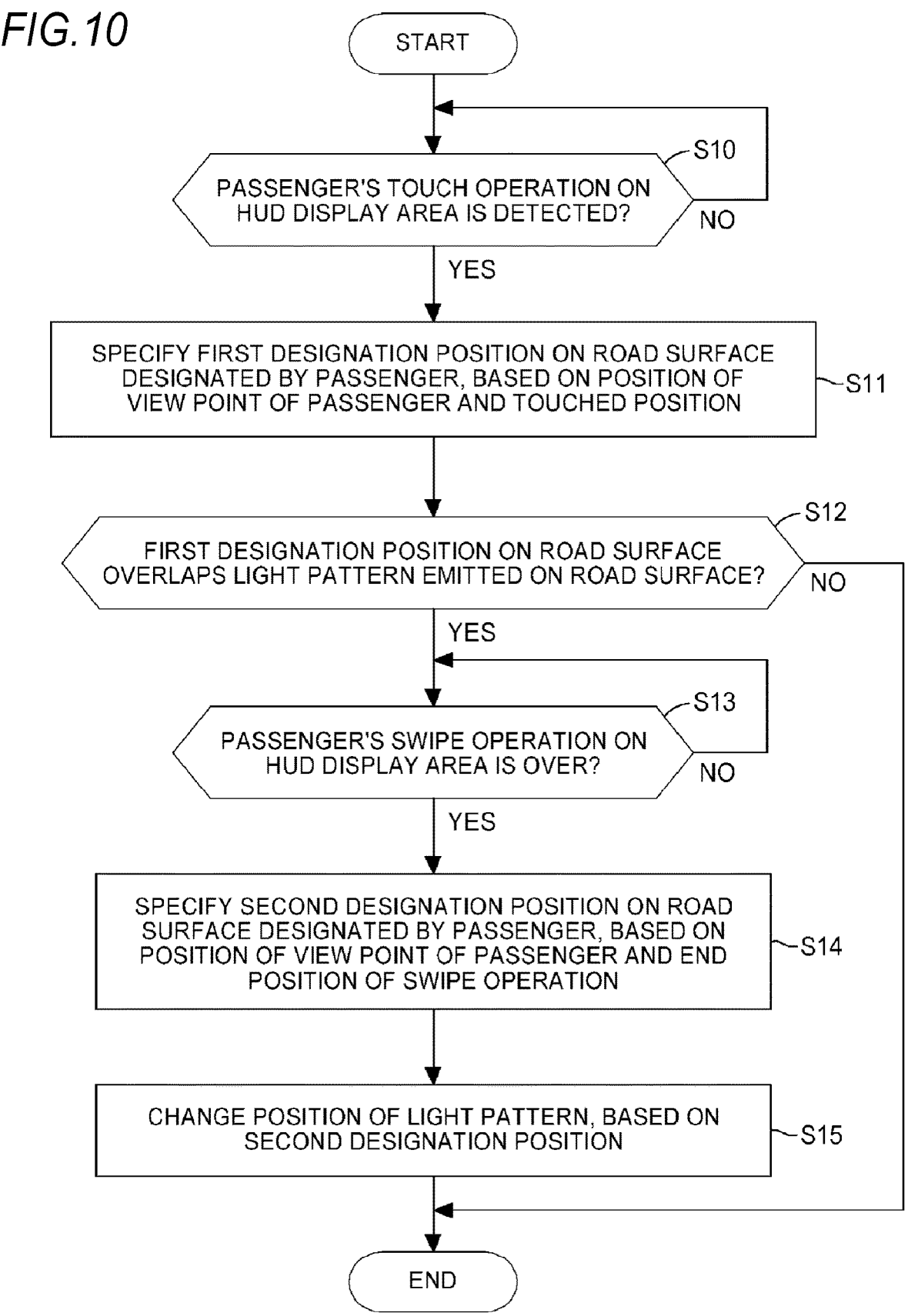
FIG. 10 is a flowchart for illustrating a second operation example of the display system of the first embodiment.
Figure 11:
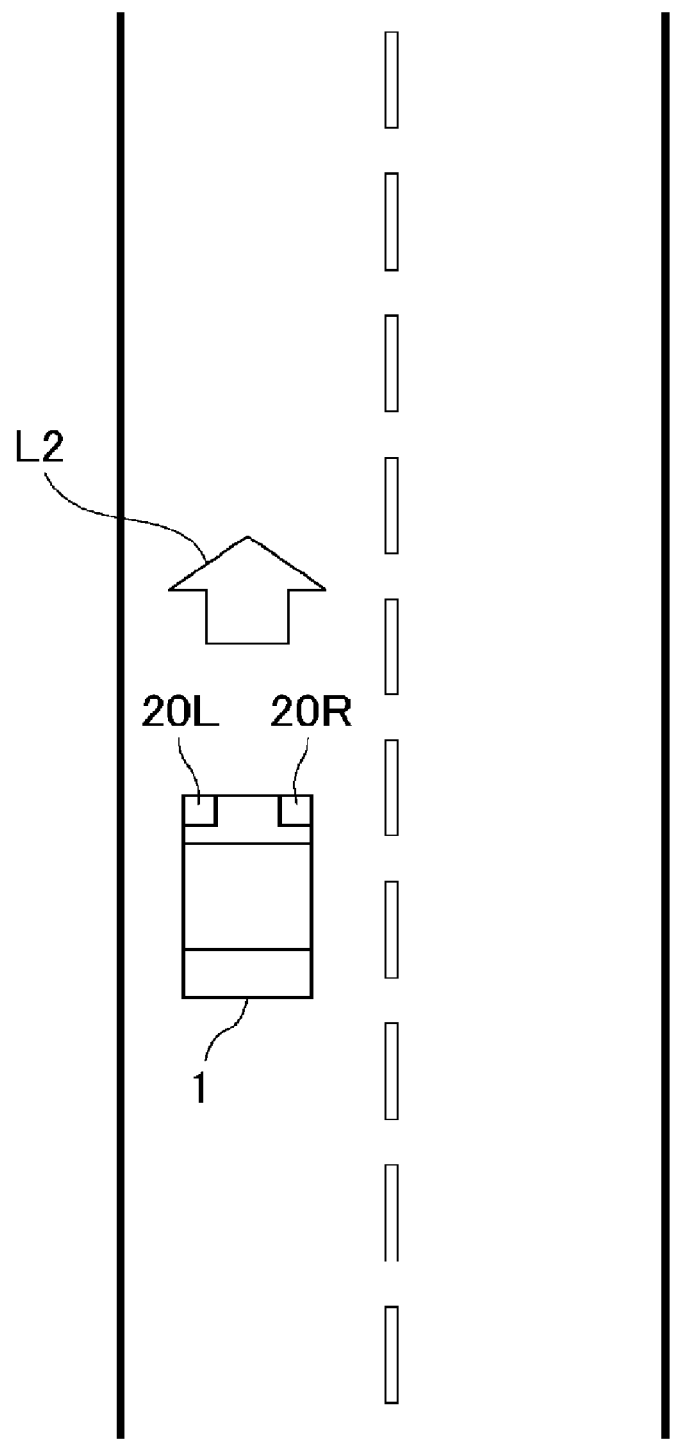
FIG. 11 depicts a light pattern emitted from the vehicle.
Figure 12:
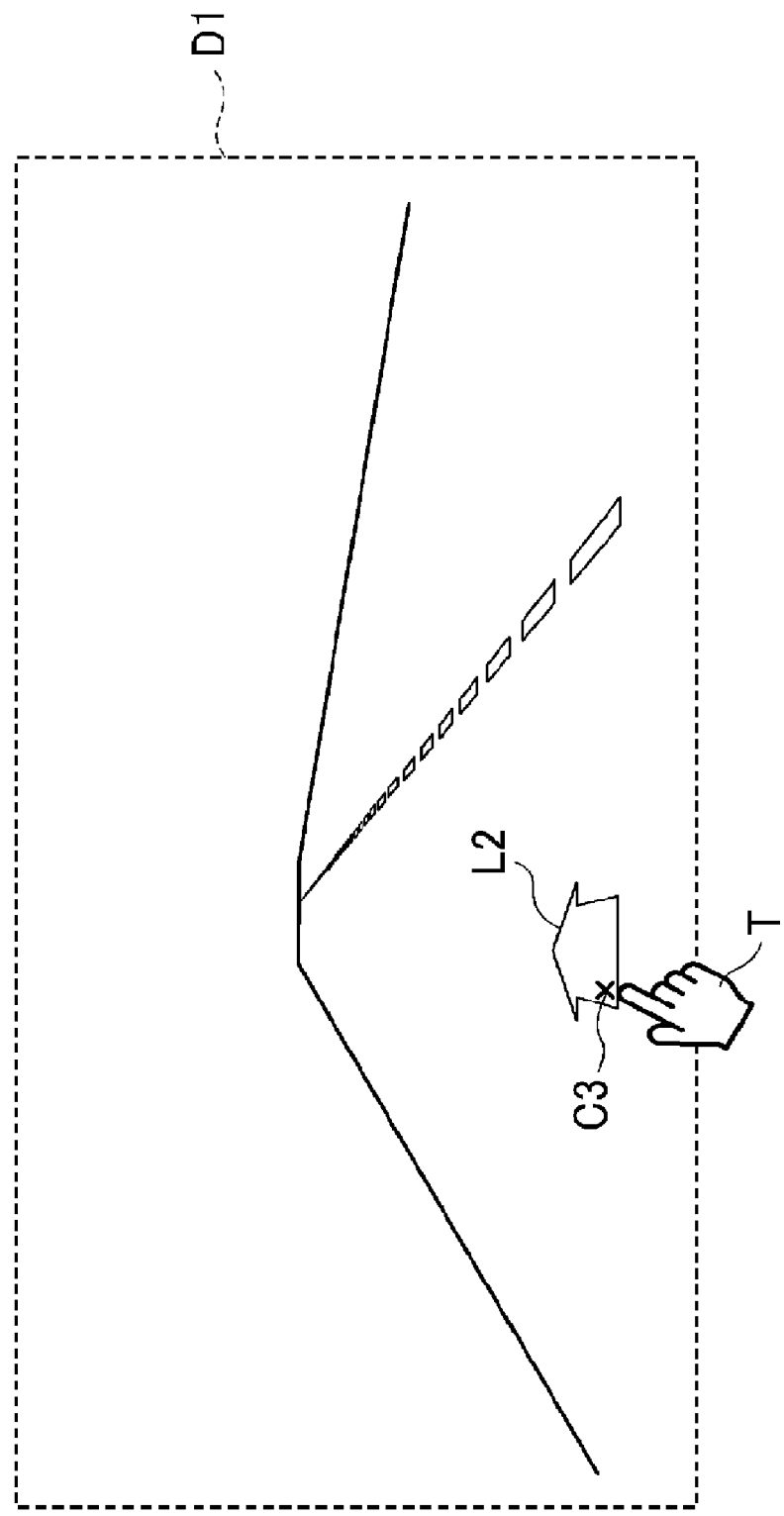
FIG. 12 depicts an aspect where a first designation position designated by a passenger's input operation and the light pattern are superimposed in a field of view of the passenger.
Figure 13:
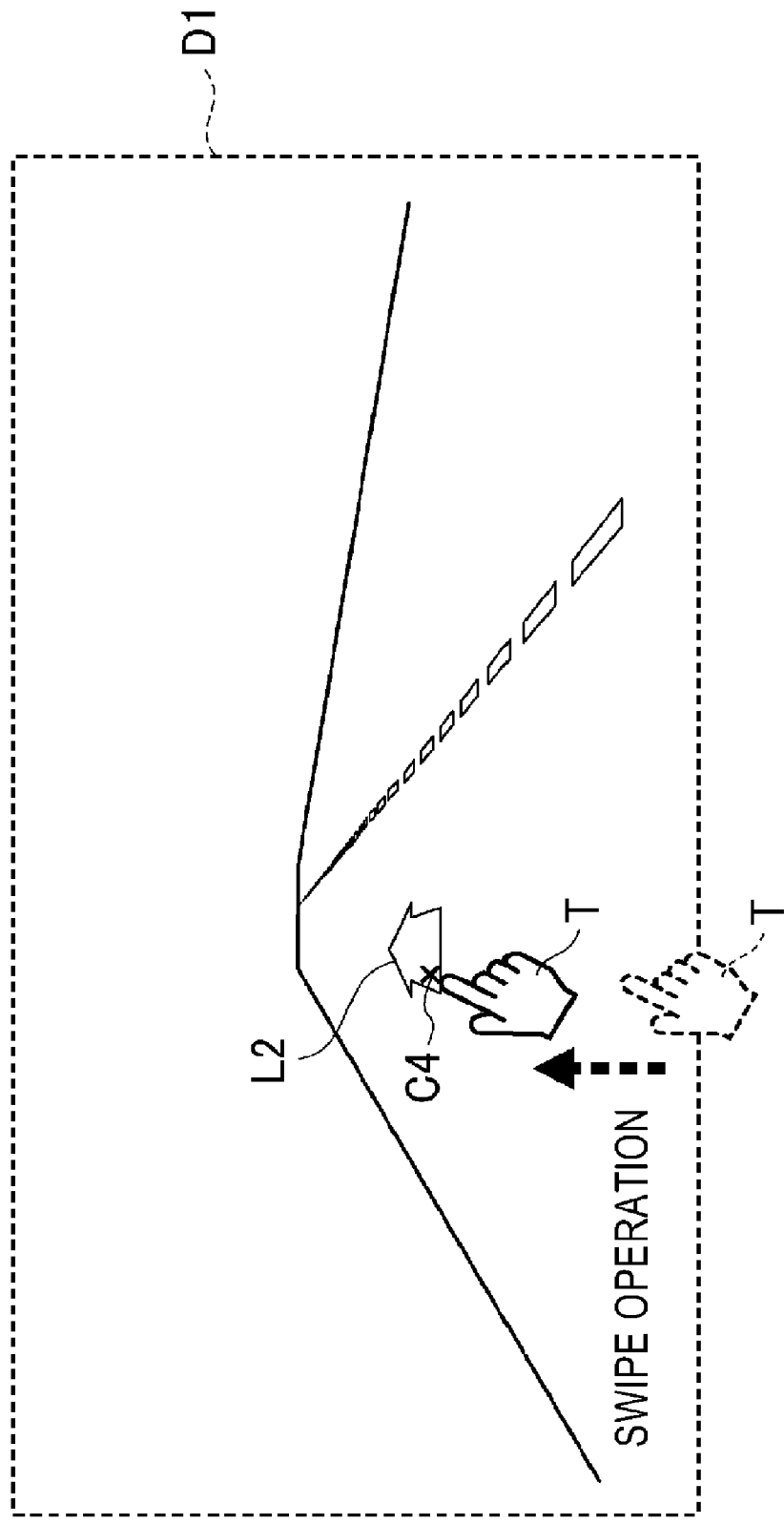
FIG. 13 depicts an aspect where an emission position of the light pattern is changed by a passenger's swipe operation on the HUD display area.
Figure 14:
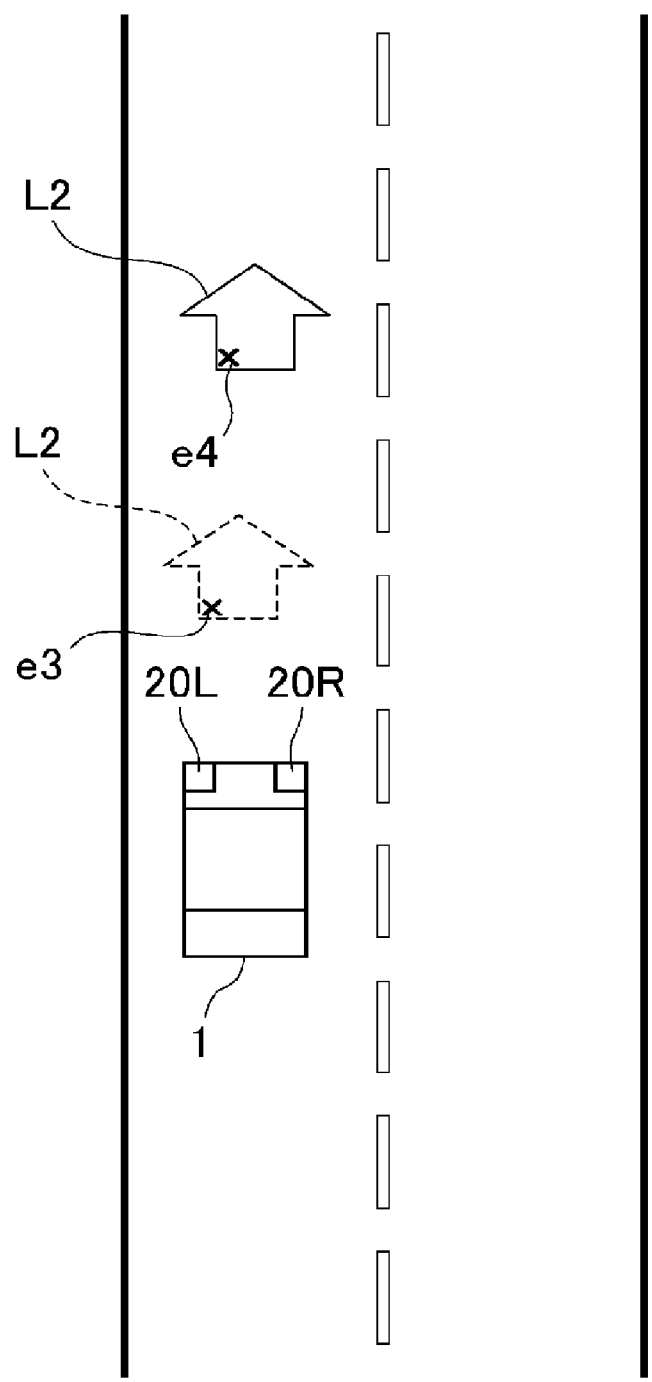
FIG. 14 depicts an aspect where an emission position of the light pattern emitted from the vehicle is changed.

Subsequently, a second operation example of the display system 4 of the present embodiment is described with reference to FIGS. 10 to 15. FIG. 10 is a flowchart for illustrating a second operation example of the display system 4 of the present embodiment. FIG. 11 depicts a light pattern L2 emitted from the vehicle 1. FIG. 12 depicts an aspect where a first designation position C3 designated by an input operation of the passenger H and the light pattern L2 are superimposed in a field of view of the passenger H. FIG. 13 depicts an aspect where an emission position of the light pattern L2 is changed by a swipe operation of the passenger H on the HUD display area D1. FIG. 14 depicts an aspect where an emission position of the light pattern L2 emitted from the vehicle 1 is changed. Note that, in the present operation example, it is assumed that the vehicle 1 has already emitted the light pattern L2 on the road surface.

As shown in FIG. 10, in step S10, the display control unit 43 determines whether a touch operation of the passenger H on the HUD display area D1 is detected. When a determination result of step S10 is YES, the processing proceeds to step S11. On the other hand, when a determination result of step S10 is NO, the determination processing of step S10 is repeatedly executed until the touch operation is detected.

Then, in step S11, the display control unit 43 specifies a first designation position e3 (refer to FIG. 14) on the road surface designated by the passenger H, based on the position of the view point E of the passenger H and a touched position C3 (an example of the third input position, refer to FIG. 12) of the hand T of the passenger H. Here, the first designation position e3 is specified as an intersection point of a line passing through the position of the view point E and the touched position C3 with the road surface.

Then, in step S12, the display control unit 43 determines whether the first designation position e3 on the road surface overlaps the light pattern L2 emitted onto the road surface. When a determination result of step S12 is YES, the processing proceeds to step S13. On the other hand, when a determination result of step S12 is NO, the processing is over. Then, the display control unit 43 determines whether the swipe operation of the passenger H on the HUD display area D1 is over (step S13). When a determination result of step S13 is YES, the processing proceeds to step S14. On the other hand, when a determination result of step S13 is NO, the display control unit 43 stands by until the swipe operation of the passenger H is over.

Then, in step S14, the display control unit 43 specifies a second designation position e4 on the road surface (refer to FIG. 14), based on the position of the view point E of the passenger H and an end position C4 (an example of the fourth input position, refer to FIG. 13) of the swipe operation. Specifically, the display control unit 43 specifies the position of the view point E of the passenger H, based on the image data acquired by the internal camera 6B. In addition, the transparent screen 421 generates an operation signal indicative of the end position C4 of the swipe operation of the passenger H, and transmits the operation signal to the display control unit 43. Then, the display control unit 43 specifies the second designation position e4, based on the position of the view point E and the end position C4.

Then, in step S15, the display control unit 43 changes an emission position of the light pattern L2, based on the second designation position e4. In this respect, as shown in FIG. 14, the display control unit 43 changes the emission position of the light pattern L2 so that a predetermined position of the light pattern L2 overlaps the second designation position e4. For example, the emission position of the light pattern L2 may be changed so that the predetermined position of the light pattern L2 overlapping the first designation position e3 overlaps the second designation position e4. Also, as shown in FIG. 13, in the field of view of the passenger H, the end position C4 of the swipe operation overlaps the predetermined position of the light pattern L2.

According to the second operation example of the display system 4, the emission position of the light pattern L2 is changed according to the input operation on the HUD display area D1. In this way, it is possible to change the emission position of the light pattern L2 by the intuitive input operation of the passenger H (for example, the swipe operation). Therefore, it is possible to provide the display system 4 capable of improving usability when the passenger H manually controls the light pattern.

Particularly, in the present operation example, when the first designation position e3 overlaps the emission position of the light pattern L2, the second designation position e4 is specified based on the position of the view point E and the end position C4 of the swipe operation, and the emission position of the light pattern L2 is then changed based on the second designation position e4. In this way, it is possible to change the emission position of the light pattern L2 by the intuitive input operation of the passenger H.

Figure 15:
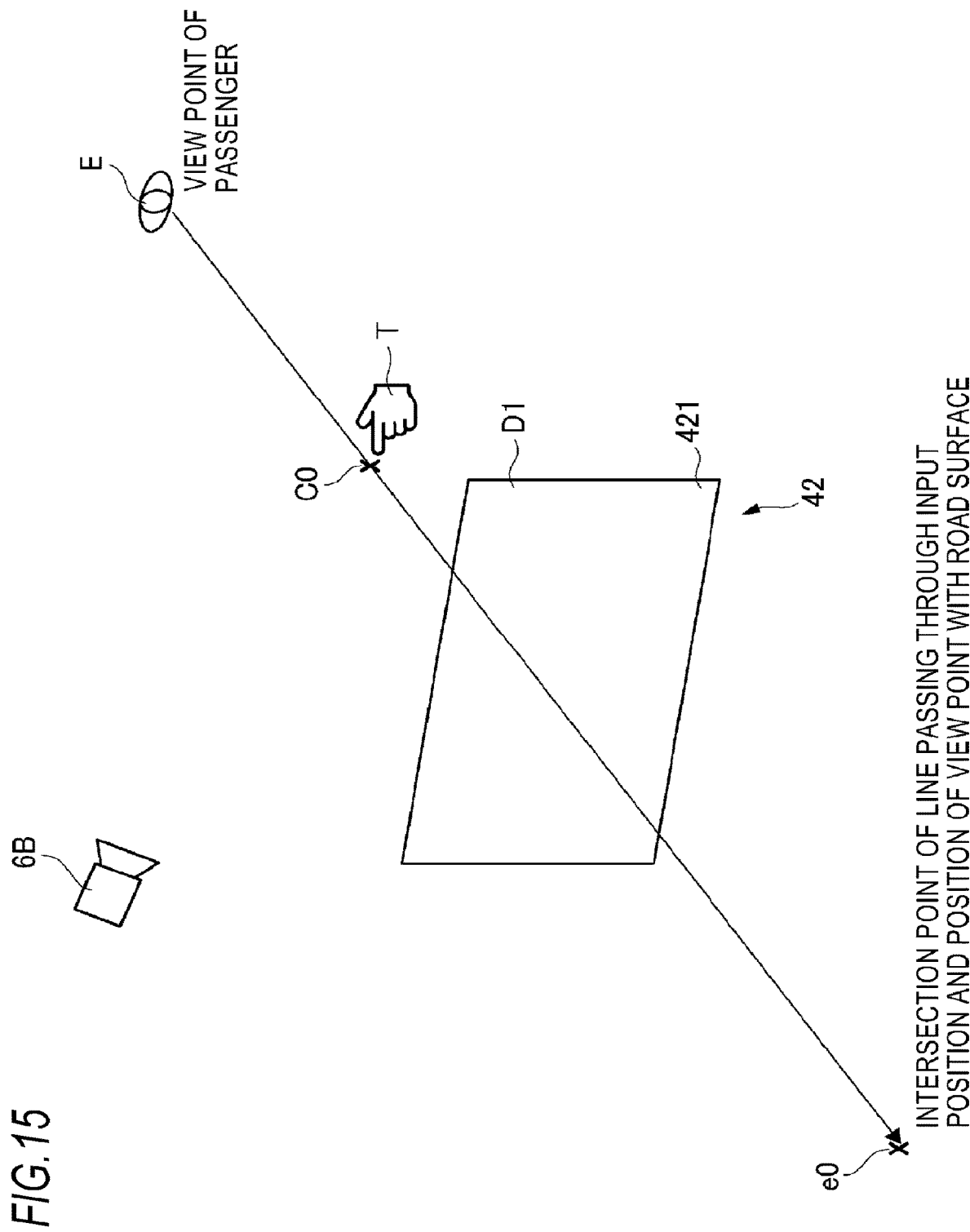
FIG. 15 illustrates a method of specifying an input position of the input operation, based on image data acquired by the internal camera.

Note that, in the descriptions of the first operation example and the second operation example of the display system 4, the display control unit 43 specifies the two input positions (the touched position and the end position of the swipe operation) of the input operation of the passenger H by the operation signals generated by the touch panel. However, the present embodiment is not limited thereto. For example, the transparent screen 421 may not have the touch panel. In this case, the input position of the input operation of the passenger H may be specified by the internal camera 6B. Specifically, as shown in FIG. 15, the display control unit 43 may specify the position of the hand T of the passenger H, based on the image data acquired by the internal camera 6B, and specify an input position C0 of the input operation, based on the position of the hand T. In addition, the display control unit 43 may specify the position of the view point E of the passenger H, based on the image data. In this way, the display control unit 43 can control the emission position of the light pattern, based on the position of the view point E and the input position C0. Here, an intersection point of a line passing through the view point E and the input position C0 with the road surface is specified as a position e0 relating to the emission of the light pattern. Further, the input position C0 may corresponds to a position of a tip end of an index finger of the hand T.

In this way, it is possible to control the emission position of the light pattern by the operation of the hand T in the space, not the input operation on the touch panel. In particular, in a case where a hologram-type HUD is adopted as the HUD 42, the input position may be decided by an operation of the hand T in the space. Therefore, it is possible to provide the display system 4 capable of improving usability when the passenger H manually controls the light pattern.

Second Embodiment

Subsequently, a second embodiment of the present invention (hereinbelow, referred to as the second embodiment) is described with reference to the drawings. For the sake of convenience of descriptions, dimensions of the respective members shown in the drawings may be different from actual dimensions of the respective members. In the below, the constitutional elements having the same reference signs as the constitutional elements already described in the first embodiment are not again particularly described.

Figure 16:
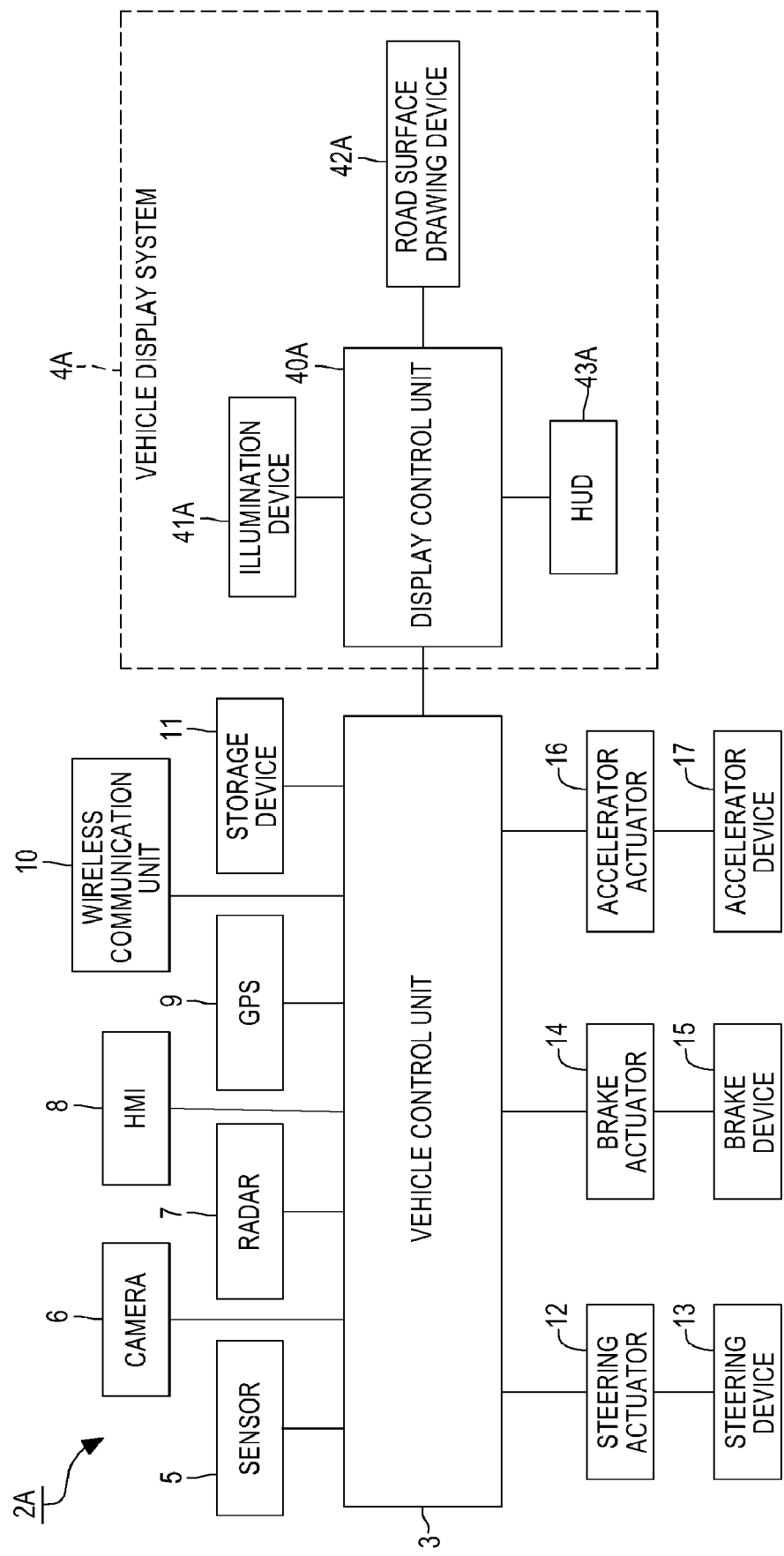
FIG. 16 is a block diagram of a vehicle system in accordance with a second embodiment of the present invention.

First, a vehicle system 2A of the present embodiment is described with reference to FIG. 16. The vehicle system 2A is mounted on a vehicle 1A (refer to FIG. 18A). FIG. 16 is a block diagram of the vehicle system 2A. The vehicle 1A is a vehicle (automobile) that can travel in the automatic driving mode.

As shown in FIG. 16, the vehicle system 2A includes the vehicle control unit 3, a vehicle display system 4A (hereinbelow, simply referred to as the display system 4A), the sensor 5, the camera 6, and the radar 7. The vehicle system 2A also includes the HMI 8, the GPS 9, the wireless communication unit 10, and the storage device 11. The vehicle system 2A also includes the steering actuator 12, the steering device 13, the brake actuator 14, the brake device 15, the accelerator actuator 16, and the accelerator device 17.

The display system 4A includes a display control unit 40A, an illumination device 41A, a road surface drawing device 42A, and a head up display (HUD) 43A. The road surface drawing device 42A is an example of the first display device. The HUD 43A is an example of the second display device.

The illumination device 41A is configured to emit light toward an outside of the vehicle. The illumination device 41A includes, for example, headlamps and position lamps provided at a front part of the vehicle, rear combination lamps provided at a rear part of the vehicle, turn signal lamps provided at the front part or side parts of the vehicle, a variety of lamps for notifying situations of the host vehicle to pedestrians and drivers of the other vehicles, and the like.

The road surface drawing device 42A is configured to emit a light pattern toward the road surface outside the vehicle. The road surface drawing device 42A includes, for example, a laser light source configured to emit laser light, a light deflection device configured to deflect the laser light emitted from the laser light source, an optic system member such as a lens. The laser light source is an RGB laser light source configured to emit red laser light, green laser light and blue laser light. The light deflection device is, for example, a MEMS mirror, a galvano mirror, a polygon mirror and the like. The road surface drawing device 42A is configured to draw light pattern M0 (refer to FIG. 18A) on the road surface by scanning laser light. In a case where the laser light source is the RGB laser light source, the road surface drawing device 42A can draw a light pattern of diverse colors on the road surface.

The road surface drawing device 42A is not particularly limited in terms of the number, arrangement place and shape of the road surface drawing device 42A as long as it can draw a light pattern on the road surface. For example, in a case where the number of the road surface drawing device 42A is one, it may be arranged at a center on a front or rear side of the vehicle body roof in the right and left direction. In a case where the number of the road surface drawing device 42A is two, the road surface drawing devices 42A may be each arranged on the left headlamp (not shown) and the right headlamp (not shown) or in the vicinities thereof, or on the left rear combination lamp (not shown) and the right rear combination lamp (not shown) or in the vicinities thereof. In addition, in a case where the number of the road surface drawing device 42A is four, the road surface drawing devices 42A may be each arranged on the left headlamp (not shown), the right headlamp (not shown), the left rear combination lamp (not shown) and the right rear combination lamp (not shown) or in the vicinities thereof.

The drawing method of the road surface drawing device 42A may be a DLP method or an LCOS method. In this case, an LED is used as the light source, instead of the laser.

The HUD 43A is installed at a predetermined place in an interior of the vehicle. For example, as shown in FIG. 18B, the HUD 43A is arranged on a dashboard of the vehicle. Note that, the mounting place of the HUD 43A is not particularly limited. The HUD 43A is configured to function as a visual interface between the vehicle and a passenger. In particular, the HUD 43A is configured to display vehicle traveling information relating to traveling of the vehicle 1 toward the passenger in the vehicle. The vehicle traveling information includes information (for example, information relating to automatic driving) relating to driving of the vehicle 1A, pedestrian information, and the like. For example, the HUD 43A is configured to display information obtained by inter-vehicle communication between the vehicle and the other vehicle and/or road-to-vehicle communication between the vehicle and the infrastructure equipment (a traffic light and the like). In this respect, the HUD 43A is configured to display a message transmitted from the other vehicle and/or the infrastructure equipment. The passenger in the vehicle can perceive an intention of the other vehicle by seeing the message displayed by the HUD 43A. In addition, for example, the HUD 43A is configured to display information obtained from the sensor 5 and/or the camera 6. The passenger in the vehicle can perceive traveling conditions of the vehicle and/or pedestrian information and the like by seeing the message displayed by the HUD 43A.

The information displayed by the HUD 43A is visually presented to the passenger in the vehicle with being superimposed on the real space ahead of the vehicle. In this way, the HUD 43A is configured to function as an AR display.

The HUD 43A includes an image generation unit, and a transparent screen on which an image generated by the image generation unit is displayed. In a case where a drawing method of the HUD 43A is a laser projector type, the image generation unit includes, for example, a laser light source configured to emit laser light, a light deflection device configured to deflect the laser light emitted from the laser light source, and an optic system member such as a lens. The laser light source is, for example, an RGB laser light source configured to emit red laser light, green laser light and blue laser light. The light deflection device is, for example, a MEMS mirror. Note that, the drawing method of the HUD 43A may also be a DLP method or and LCOS method. In this case, an LED is used as the light source, instead of the laser.

The HUD 43A may not have the transparent screen. In this case, an image generated by the image generation unit may be displayed on the front glass of the vehicle.

The HMI 8 further includes an abnormality switch for notifying an abnormality of the road surface drawing device 42A and/or the HUD 43A, and the like.

The display control unit 40A is configured to control drive of the illumination device 41A. For example, the display control unit 40A is configured to control the illumination device 41A to emit predetermined light, based on the information relating to the vehicle or the information relating to the surrounding environments of the vehicle. The display control unit 40A is also configured to control drive of the road surface drawing device 42A and the HUD 43A. For example, the display control unit 40A is configured to control the road surface drawing device 42A to present a predetermined light pattern toward the target object (pedestrians, other vehicles, and the like) or the passenger, based on the information relating to the vehicle or the information relating to the surrounding environments of the vehicle. The display control unit 40A is also configured to control the HUD 43A to present a predetermined message toward the passenger, based on the information relating to the vehicle or the information relating to the surrounding environments of the vehicle.

When it is determined that the road surface drawing device 42A has an abnormality, the display control unit 40A controls the HUD 43A to display the information corresponding to the light pattern. For example, when it is determined that the road surface drawing device 42A emitting the light pattern has an abnormality, the display control unit 40A controls the HUD 43A to display information corresponding to the light pattern emitted by the road surface drawing device 42A. When it is determined that the road surface drawing device 42A has an abnormality before the light pattern is emitted, the display control unit 40A controls the HUD 43A to display information corresponding to the light pattern that is to be emitted by the road surface drawing device 42A. When there is a plurality of light patterns, the display control unit 40A may control the HUD 43A to display information corresponding to each of the plurality of light patterns. The display control unit 40A may also control the HUD 43A to display information corresponding to some light patterns of the plurality of light pattern. Some light patterns include, for example, a light pattern (for example, a light pattern for navigation) for a passenger in a vehicle, information other than common information when the common information is displayed on both the road surface drawing device 42A and the HUD 43A, and the like. The display control unit 40A may also be configured to control the HUD 43A to display the abnormality information of the road surface drawing device 42A.

When it is determined that the HUD 43A has an abnormality, the display control unit 40A controls the road surface drawing device 42A to display a light pattern corresponding to the vehicle traveling information. For example, when it is determined that the HUD 43A displaying the vehicle traveling information has an abnormality, the display control unit 40A controls the road surface drawing device 42A to emit a light pattern corresponding to the vehicle traveling information displayed on the HUD 43A. When it is determined that the HUD 43A has an abnormality before the vehicle traveling information is displayed, the display control unit 40A controls the road surface drawing device 42A to emit a light pattern corresponding to the vehicle traveling information that is to be displayed on the HUD 43A. When there is a plurality of vehicle traveling information, the display control unit 40A may control the road surface drawing device 42A to emit a light pattern corresponding to at least one vehicle traveling information of the plurality of vehicle traveling information. For example, the display control unit 40A controls the road surface drawing device 42A to emit a light pattern corresponding to the vehicle traveling information, which consists of figure or simple character information that can be easily read out from the light pattern, of the plurality of vehicle traveling information. Each of the vehicle traveling information consists of figure information, character information or combined information thereof. For example, when the vehicle traveling information includes information (for example, character information) that is difficult to be read out from the light pattern, the display control unit 40A may correct the vehicle traveling information (delete or convert the vehicle traveling information into information (for example, figure information) that can be easily read out from the light pattern), and cause the road surface drawing device 42A to emit a light pattern corresponding to the corrected vehicle traveling information.

The display control unit 40A is configured by an electronic control unit (ECU) and is electrically connected to a power supply (not shown). The electronic control unit includes a computer system (for example, SoC and the like) having one or more processors and one or more memories, and an analog processing circuit having an active element such as a transistor and a passive element. The analog processing circuit includes a lamp drive circuit (for example, an LED driver, and the like) configured to control drive of lamps of the illumination device 41A. The analog processing circuit also includes a first laser light source control circuit configured to control drive of the laser light source of the road surface drawing device 42A, and a first light deflection device control circuit configured to control drive of the light deflection device of the road surface drawing device 42A. The analog processing circuit also includes a second laser light source control circuit configured to control drive of the laser light source of the HUD 43A, and a second light deflection device control circuit configured to control drive of the light deflection device of the HUD 43A. The processor is, for example, a CPU, an MPU, a GPU and/or a TPU. The memory includes a ROM and a RAM. The computer system may also be configured by a non-Neumann type computer such as an ASIC, an FPGA and the like.

For example, the computer system of the display control unit 40A is configured to specify a light pattern that is irradiated to an outside of the vehicle, based on an instruction signal transmitted from the vehicle control unit 3, and to transmit a signal indicative of the specified light pattern to the first laser light source control circuit and the first light deflection device control circuit. The first laser light source control circuit is configured to generate a control signal for controlling drive of the laser light source, based on the signal indicative of the light pattern, and to transmit the generated control signal to the laser light source of the road surface drawing device 42A. On the other hand, the first light deflection device control circuit is configured to generate a control signal for controlling drive of the light deflection device, based on the signal indicative of the light pattern, and to transmit the generated control signal to the light deflection device of the road surface drawing device 42A. In this way, the display control unit 40A can control drive of the road surface drawing device 42A.

The computer system of the display control unit 40A is also configured to specify image information (for example, character or figure information) that is displayed on the HUD 43A, based on an instruction signal transmitted from the vehicle control unit 3, and to transmit a signal indicative of the specified image information to the second laser light source control circuit and the second light deflection device control circuit. The second laser light source control circuit is configured to generate a control signal for controlling drive of the laser light source, based on the signal indicative of the image information, and to transmit the generated control signal to the laser light source of the HUD 43A. On the other hand, the second light deflection device control circuit is configured to generate a control signal for controlling drive of the light deflection device, based on the signal indicative of the image information, and to transmit the generated control signal to the light deflection device of the HUD 43A. In this way, the display control unit 40A can control drive of the HUD 43A.

When it is determined that the road surface drawing device 42A has an abnormality, the computer system of the display control unit 40A specifies image information (for example, character or figure information) that is displayed on the HUD 43A, based on the specified light pattern. Then, the computer system of the display control unit 40A is configured to transmit a signal indicative of the specified image information to the second laser light source control circuit and the second light deflection device control circuit.

When it is determined that the HUD 43A has an abnormality, the computer system of the display control unit 40A specifies a light pattern that is irradiated to an outside of the vehicle by the road surface drawing device 42A, based on the specified image information that is displayed on the HUD 43A. Then, the computer system of the display control unit 40A is configured to transmit a signal indicative of the specified light pattern to the first laser light source control circuit and the first light deflection device control circuit.

Note that, in the present embodiment, the illumination device 41A, the road surface drawing device 42A and the HUD 43A are provided with the common display control unit 40A but may also be each provided with a separate display control unit. In the present embodiment, the vehicle control unit 3 and the display control unit 40A are separately provided. However, the vehicle control unit 3 and the display control unit 40A may also be integrally configured. In this respect, the display control unit 40A and the vehicle control unit 3 may be configured by a single electronic control unit. In this case, the vehicle display system 4A includes even the vehicle control unit 3.

The display control unit 40A is configured to determine whether the road surface drawing device 42A and the HUD 43A have an abnormality, for example. The display control unit 40A is configured to determine whether the road surface drawing device 42A has an abnormality, based on a captured image of the light pattern drawn on the road surface, for example. The display control unit 40A is configured to acquire the captured image of the light pattern captured by the camera 6 from the vehicle control unit 3, and to determine whether the light pattern of the captured image coincides with the light pattern emitted by the road surface drawing device 42A. For example, in a case where the light pattern is not included in the captured image, the display control unit 40A determines that an abnormality has occurred in the laser light source of the road surface drawing device 42A or a signal path to the laser light source. In addition, in a case where a shape of the light pattern included in the captured image does not coincide with a shape of a light pattern for reference, the display control unit 40A determines that an abnormality has occurred in the light deflection device of the road surface drawing device 42A. The light pattern for reference is stored in advance in the memory of the display control unit 40A or the storage device 11, and is, for example, a light pattern extracted from an image captured by drawing and capturing each light pattern on the road surface.

The display control unit 40A is also configured to determine whether the road surface drawing device 42A has an abnormality, based on a signal from the road surface drawing device 42A, for example. The road surface drawing device 42A has a self-diagnosis function and may transmit an abnormality signal to the display control unit 40A when an abnormality has occurred. In a case where the road surface drawing device 42A has a configuration of transmitting a reception confirmation signal to the display control unit 40A when a signal (for example, a signal indicative of a light pattern) is received from the display control unit 40A, the display control unit 40A may determine that an abnormality has occurred in the road surface drawing device 42A when a reception confirmation signal is not received from the road surface drawing device 42A.

The display control unit 40A is also configured to determine whether the road surface drawing device 42A has an abnormality, based on an abnormality signal from the passenger in the vehicle, for example. The passenger in the vehicle checks the light pattern drawn on the road surface, and operates an abnormality switch or the like of the HMI 8 when the passenger determines that the light pattern has an abnormality. When the display control unit 40A receives an abnormality signal based on the operation on the abnormality switch from the vehicle control unit 3, the display control unit 40A may determine that an abnormality has occurred in the road surface drawing device 42A.

Similarly, the display control unit 40A is configured to determine whether the HUD 43A has an abnormality, based on a signal (for example, an abnormality signal or a reception confirmation signal) from the HUD 43A, an abnormality signal from the passenger in the vehicle or a captured image on a display screen of the HUD 43A captured by the camera 6 equipped in the interior of the vehicle, for example.

Note that, the vehicle control unit 3 other than the display control unit 40A may determine whether the road surface drawing device 42A and the HUD 43A have an abnormality. When it is determined that an abnormality has occurred in the road surface drawing device 42A or the HUD 43A, the vehicle control unit 3 transmits an abnormality signal to the display control unit 40A.

Figure 17:
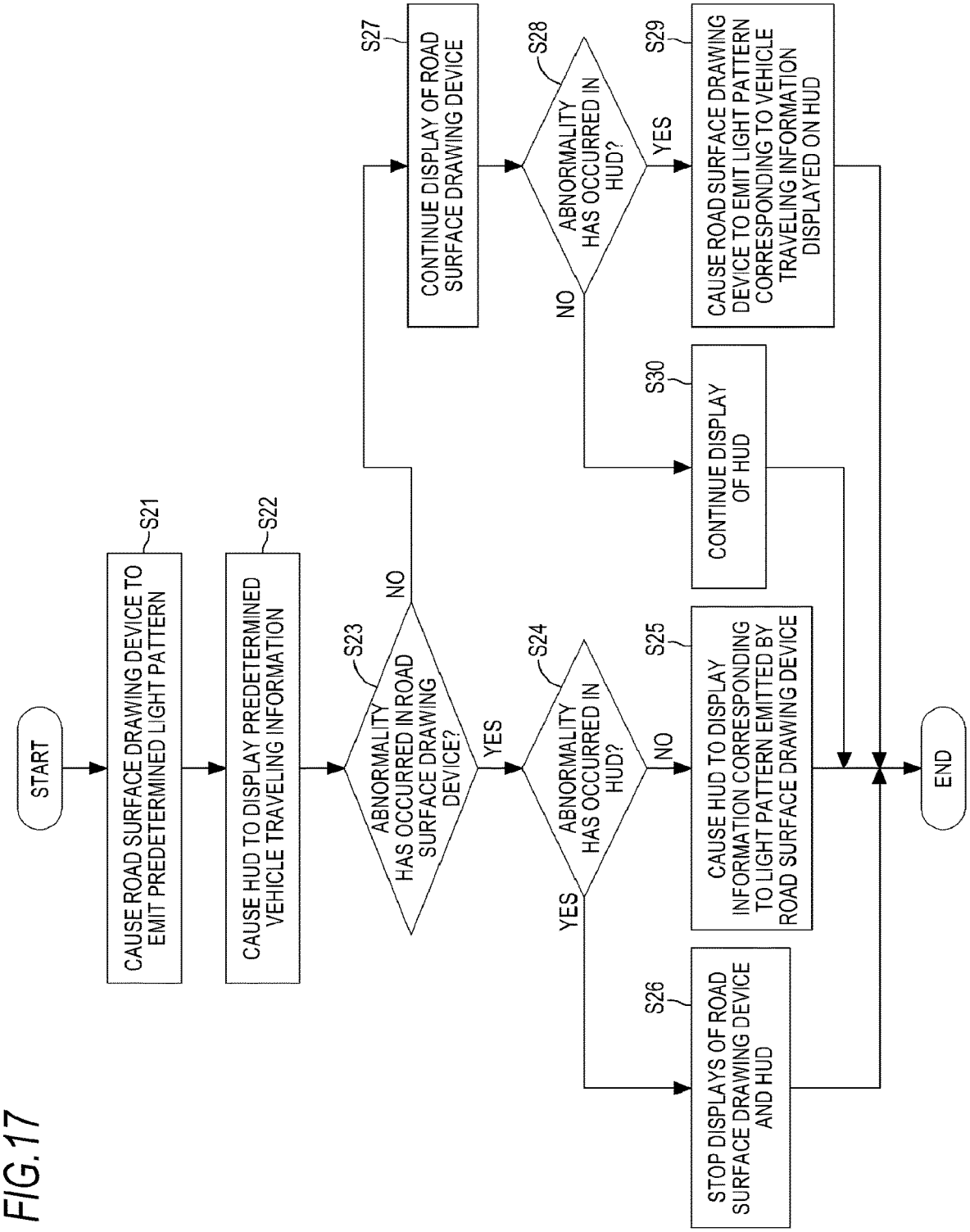
FIG. 17 is a flowchart for illustrating an example of display control by a display control unit in accordance with the second embodiment.
Figure 18A:
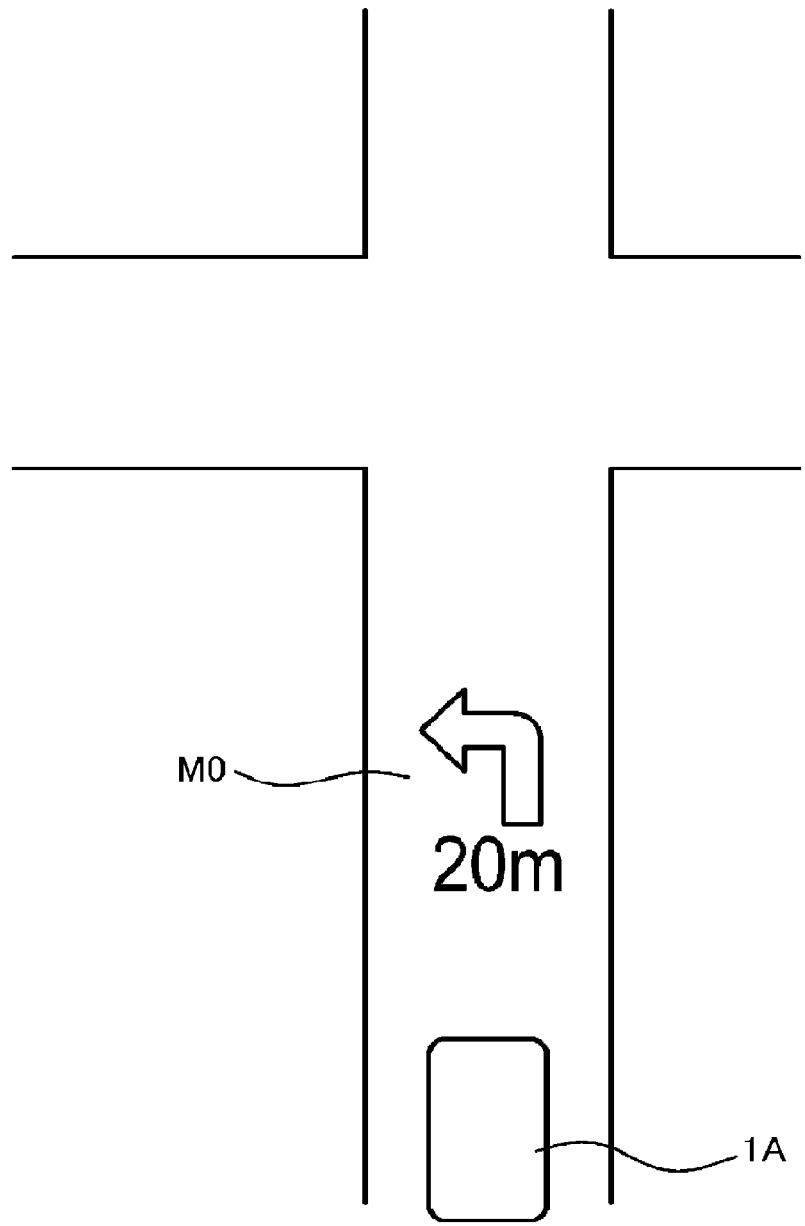
FIG. 18A illustrates an example of a road surface drawing display in accordance with the second embodiment.
Figure 19:
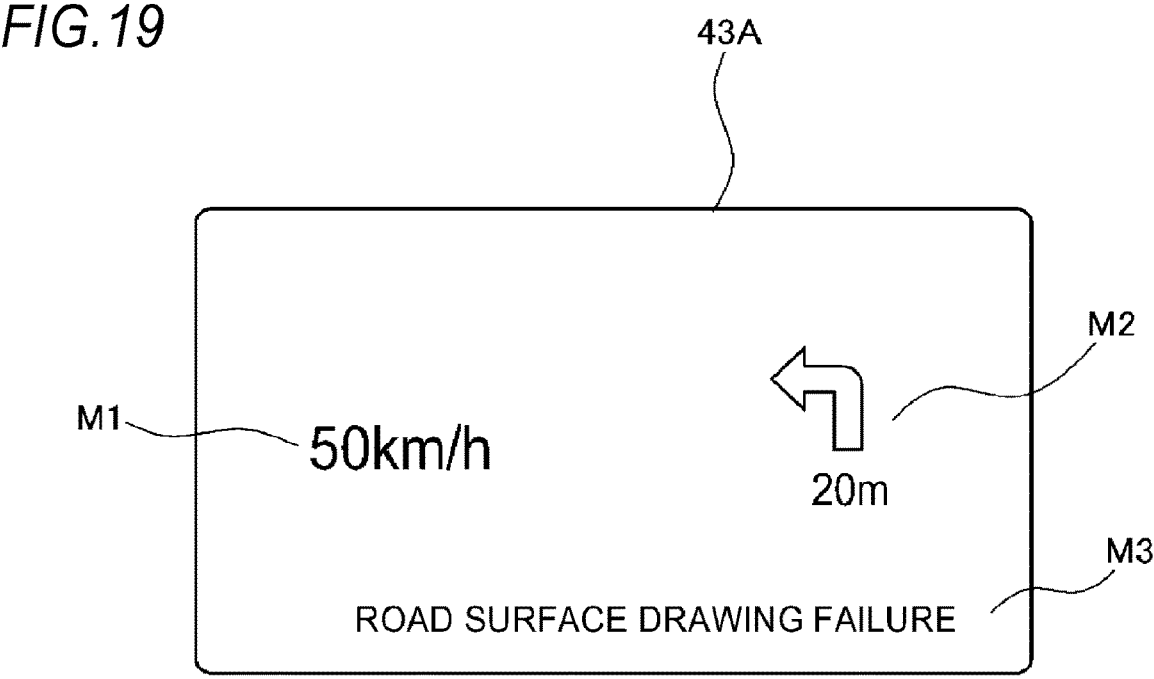
FIG. 19 illustrates an example of the HUD display when a road surface drawing display in accordance with the second embodiment has an abnormality.
Figure 20A:
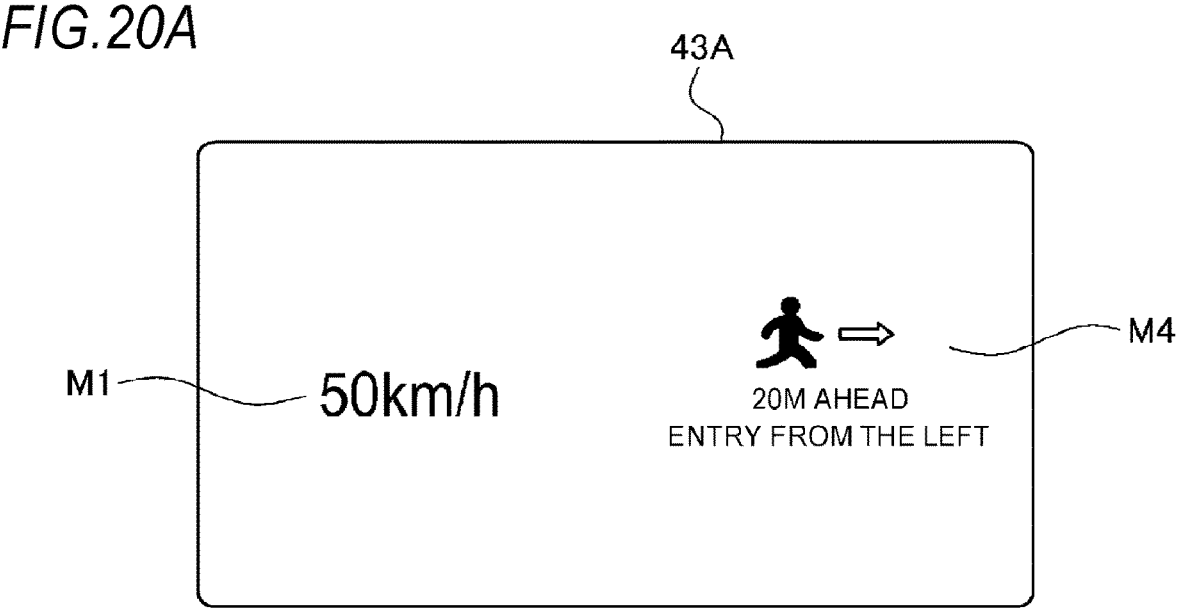
FIG. 20A illustrates an example of the HUD display in accordance with the second embodiment.
Figure 20B:
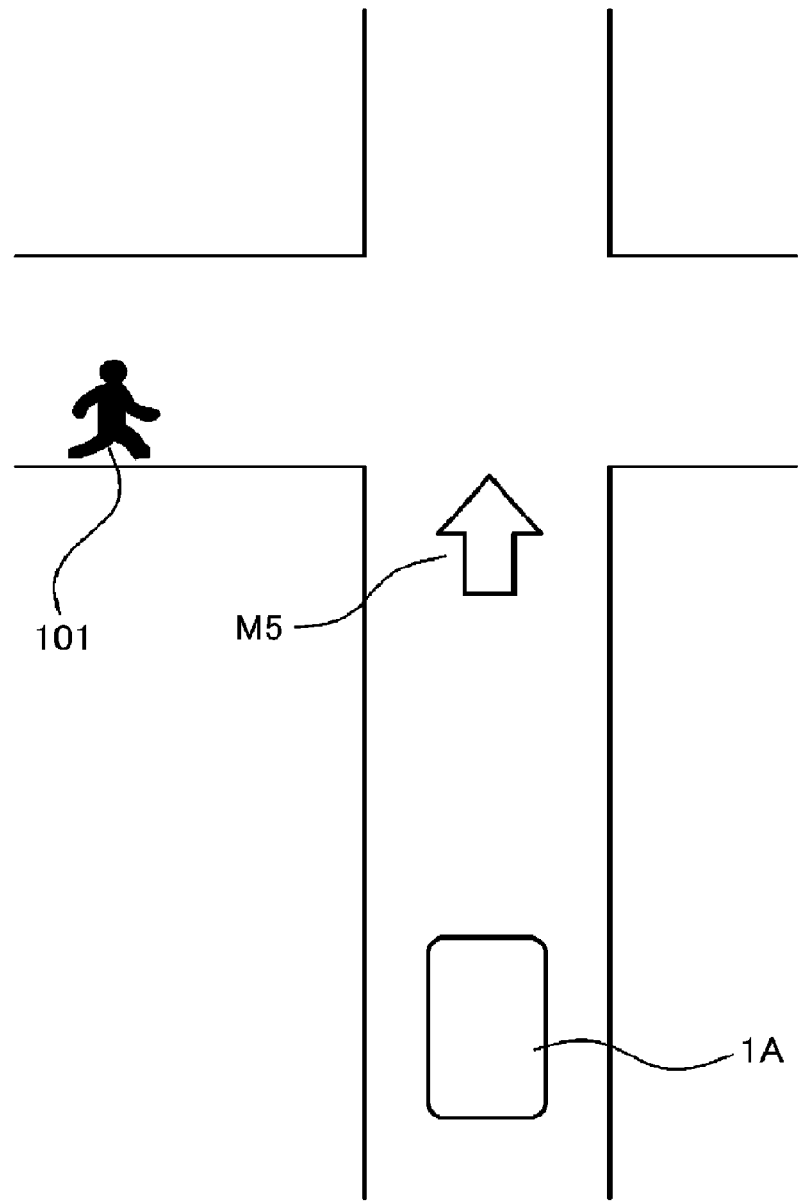
FIG. 20B illustrates an example of the road surface drawing display in accordance with the second embodiment.
Figure 21:
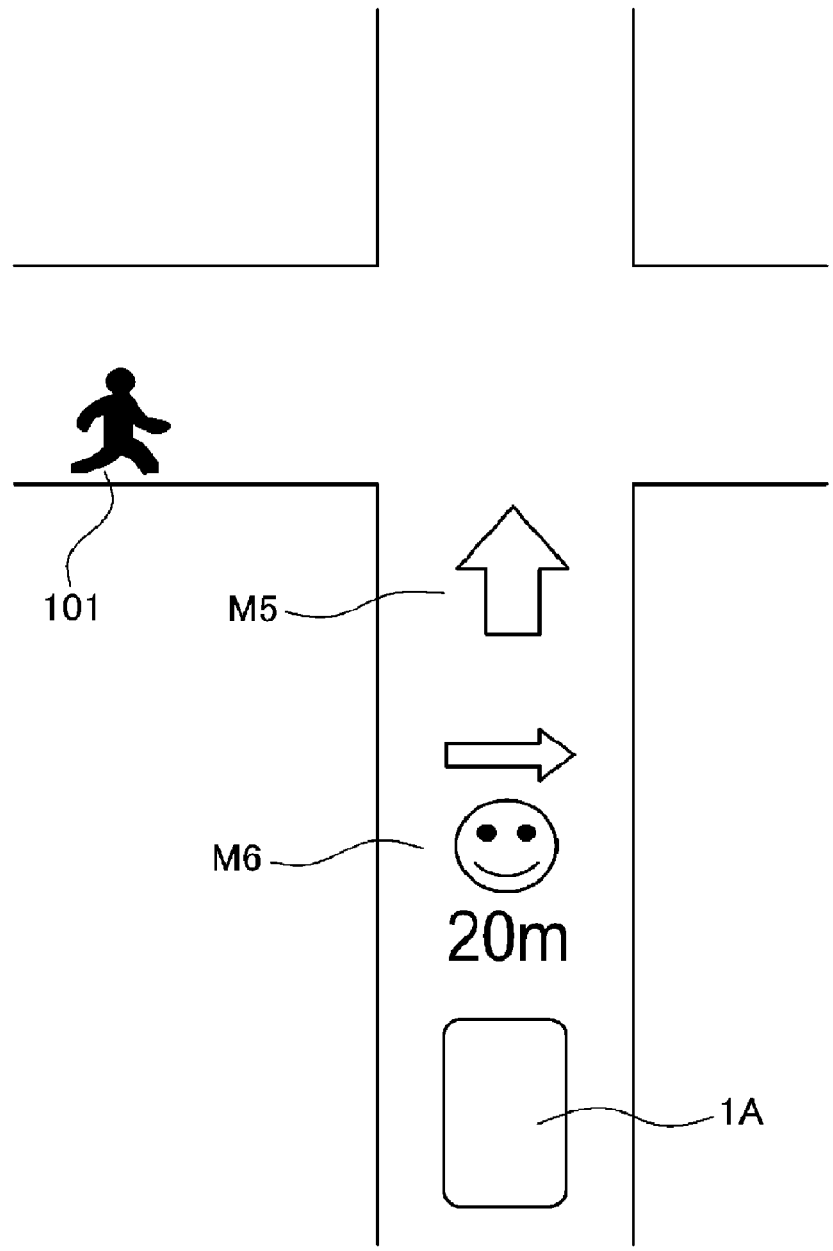
FIG. 21 illustrates an example of the road surface drawing display when the HUD display in accordance with the second embodiment has an abnormality.

Subsequently, an example of display control by the display control unit 40A in accordance with the second embodiment is described with reference to FIGS. 17 to 21. FIG. 17 is a flowchart for illustrating an example of display control by the display control unit in accordance with the second embodiment. FIG. 18A illustrates an example of a road surface drawing display in accordance with the second embodiment. FIG. 18B illustrates an example of an HUD display in accordance with the second embodiment. FIG. 19 illustrates an example of the HUD display when a road surface drawing display in accordance with the second embodiment has an abnormality. FIG. 20A illustrates an example of the HUD display in accordance with the second embodiment. FIG. 20B illustrates an example of the road surface drawing display in accordance with the second embodiment. FIG. 21 illustrates an example of the road surface drawing display when the HUD display in accordance with the second embodiment has an abnormality.

When it is determined that the road surface drawing device 42A emitting a predetermined light pattern or the HUD 43A displaying the vehicle traveling information has an abnormality, the display control unit 40A of the second embodiment causes a normal device to display information that should be displayed by the device for which it is determined that an abnormality has occurred.

As shown in FIG. 17, in step S21, the display control unit 40A controls the road surface drawing device 42A to emit a predetermined light pattern toward the road surface, based on the surrounding environment information and the like acquired from the vehicle control unit 3. In step S22, the display control unit 40A controls the HUD 43A to display the vehicle traveling information, based on the traveling condition information and the like acquired from the vehicle control unit 3. FIG. 18A depicts a light pattern M0 drawn on the road surface by the road surface drawing device 42A, and FIG. 18B depicts vehicle traveling information M1 displayed on the HUD 43A. The light pattern M0 is a light pattern for navigation that consists of character information "20 m" and figure information of an arrow indicative of a left turn and urges the passenger in the vehicle 1A to turn left 20 m ahead. The vehicle traveling information M1 is speed information of the vehicle indicating that the vehicle is currently traveling at speed of 50 km/h.

Then, in step S23, the display control unit 40A determines whether an abnormality has occurred in the road surface drawing device 42A. When it is determined that the road surface drawing device 42A has an abnormality (YES in step S23), the display control unit 40A determines whether an abnormality has occurred in the HUD 43A, in step S24. The display control unit 40A determines whether the road surface drawing device 42A has an abnormality, based on the captured image of the light pattern, the signal (for example, an abnormality signal) from the road surface drawing device 42A or the abnormality signal from the passenger in the vehicle, for example. In addition, the display control unit 40A determines whether the HUD 43A has an abnormality, based on the captured image on the display screen of the HUD 43A, the signal (for example, an abnormality signal) from the HUD 43A or the abnormality signal from the passenger in the vehicle.

When it is determined that the HUD 43A is normal (NO in step S24), the display control unit 40A causes the HUD 43A to display information corresponding to the light pattern emitted by the road surface drawing device 42A, in step S25. The display control unit 40A may also stop the display of the light pattern by the road surface drawing device 42A. For example, when the road surface drawing device 42A and the HUD 43A perform the displays of FIGS. 18A and 18B, the display control unit 40A causes the HUD 43A to display information M2 corresponding to the light pattern M0 drawn on the road surface, as shown in FIG. 19. The display control unit 40A also stops the display of the light pattern M0 by the road surface drawing device 42A. In addition to the information M2 corresponding to the light pattern M0, the display control unit 40A may also display a message M3, which indicates that an abnormality has occurred in the road surface drawing device 42A, on the HUD 43A. On the other hand, when it is determined in step S24 that the HUD 43A has an abnormality, the display control unit 40A stops the displays of the road surface drawing device 42A and the HUD 43A in step S26. Note that, in FIG. 19, for the information M2, the same character information and figure information as the light pattern M0 is used. However, the present invention is not limited thereto.

When it is determined in step S23 that the road surface drawing device 42A is normal (NO in step S23), the display control unit 40A continues the display by the road surface drawing device 42A, in step S27. Then, the display control unit 40A determines whether an abnormality has occurred in the HUD 43A, in step S28. When it is determined that the HUD 43A has an abnormality (YES in step S28), the display control unit 40A causes the road surface drawing device 42A to emit a light pattern corresponding to the vehicle traveling information displayed on the HUD 43A, in step S29.

For example, FIG. 20A depicts the vehicle traveling information M1 and vehicle traveling information (pedestrian information) M4 displayed on the HUD 43A, and FIG. 20B depicts a light pattern M5 drawn on the road surface by the road surface drawing device 42A. The vehicle traveling information M4 is pedestrian information indicating that a pedestrian 101 enters from the left 20 m ahead. The light pattern M5 is a light pattern for navigation for urging the passenger in the vehicle 1A to go straight by means of the arrow figure. In step S21 and step S22, in a case where the HUD 43A and the road surface drawing device 42A perform the displays as shown in FIGS. 20A and 20B, when it is determined that an abnormality has occurred in the HUD 43A, the display control unit 40A controls the road surface drawing device 42A to emit a light pattern M6 corresponding to the vehicle traveling information M4 displayed on the HUD 43A, as shown in FIG. 21. The light pattern M6 does not include some of the character information ("entry from the left") of the vehicle traveling information M4 and uses figure information different from the vehicle traveling information M4. On the other hand, when it is determined in step S28 that the HUD 43A is normal (step NO in S28), the display control unit 40A continues the display of the HUD 43A, in step S30. Note that, in FIG. 21, the light pattern M6 uses the character information and figure information different from the vehicle traveling information M4. However, the present invention is not limited thereto.

In this way, in the present embodiment, when it is determined that the road surface drawing device 42A has an abnormality, the display control unit 40A causes the HUD 43A to display the information corresponding to the light pattern emitted by the road surface drawing device 42A. In addition, when it is determined that the HUD 43A has an abnormality, the display control unit 40A causes the road surface drawing device 42A to emit the light pattern corresponding to the vehicle traveling information displayed on the HUD 43A. In this way, even when it is determined that the road surface drawing device 42A and/or the HUD 43A has an abnormality, it is possible to continuously perform visual communication between the vehicle and the passenger.

When it is determined that the HUD 43A has an abnormality, the display control unit 40A causes the road surface drawing device 42A to emit the light pattern M6 corresponding to the vehicle traveling information M4, which can be easily read out from the light pattern, of the plurality of vehicle traveling information M1 and M4 displayed on the HUD 43A. In addition, the display control unit 40A causes the road surface drawing device 42A to emit the light pattern M6 including only the information (for example, the figure information or the simple character information), which can be easily read out from the light pattern, of the vehicle traveling information M4. Thereby, the passenger in the vehicle can correctly perceive substantially the same information as before the abnormality occurs. In addition, the display control unit 40A converts some (for example, the figure information) of the vehicle traveling information M4 into information that can be easily read out from the light pattern (for example, converts the same into different figure information), and causes the road surface drawing device 42A to emit the light pattern M6 including the converted information. Thereby, the passenger in the vehicle can more correctly perceive substantially the same information as the vehicle traveling information.

Note that, in the present embodiment, in FIGS. 18A and 19, the road surface drawing device 42A emits one light pattern M0, and the HUD 43A displays the information M2 corresponding to the light pattern M0. However, the present invention is not limited thereto. In a case where the road surface drawing device 42A emits a plurality of light patterns, the display control unit 40A may cause the HUD 43A to display information corresponding to some or all of the light patterns.

In FIGS. 20A and 21, the light pattern M6, which corresponds to the vehicle traveling information M4 of the vehicle traveling information M1 and the vehicle traveling information M4 displayed by the HUD 43A, is emitted by the road surface drawing device 42A. However, the present invention is not limited thereto. The display control unit 40A may cause the road surface drawing device 42A to emit a light pattern corresponding to all of the vehicle traveling information.

Third Embodiment

Figure 22:
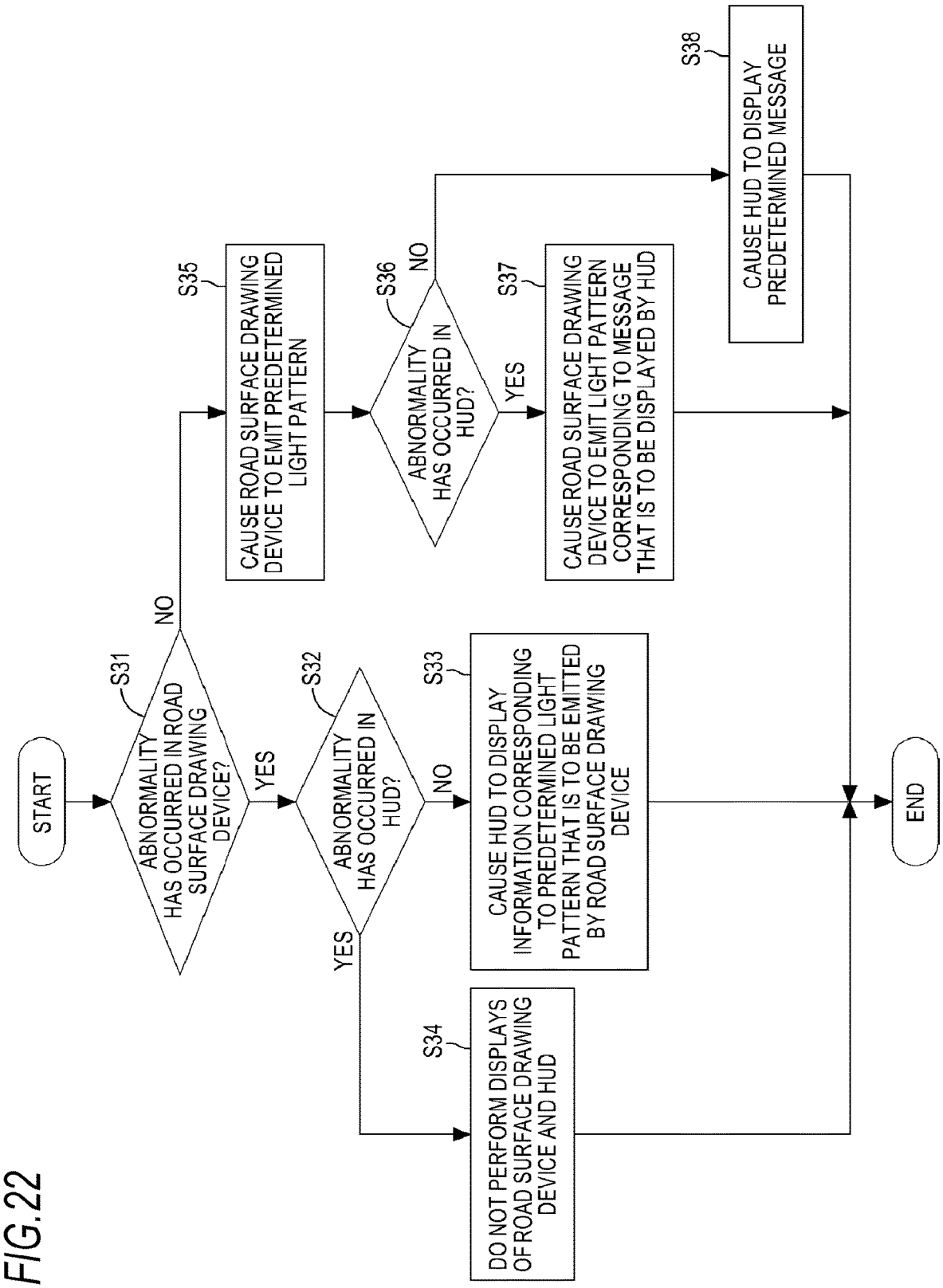
FIG. 22 is a flowchart for illustrating an example of display control by a display control unit in accordance with a third embodiment of the present invention.

Subsequently, an example of the display control by the display control unit 40A in accordance with a third embodiment of the present invention (hereinbelow, referred to as the third embodiment) is described with reference to FIG. 22. FIG. 22 is a flowchart for illustrating an example of display control by a display control unit in accordance with the third embodiment of the present invention. In descriptions of the third embodiment, for the sake of convenience of descriptions, the descriptions of the members having the same reference signs as the members already described in the second embodiment are omitted.

When it is determined that the road surface drawing device 42A or the HUD 43A has an abnormality before the road surface drawing device 42A and the HUD 43A are caused to display a predetermined light pattern and predetermined vehicle traveling information, based on an instruction signal transmitted from the vehicle control unit 3, the display control unit 40A of the third embodiment causes the normal device to display information, which should be displayed by the device for which it is determined that an abnormality has occurred.

As shown in FIG. 22, when an instruction signal for the road surface drawing display and the HUD display is received from the vehicle control unit 3, the display control unit 40A determines whether an abnormality has occurred in the road surface drawing device, in step S31. When it is determined that the road surface drawing device 42A has an abnormality (YES in step S31), the display control unit 40A determines whether an abnormality has occurred in the HUD 43A, in step S32. When the display control unit 40A transmits a signal indicative of the light pattern or the image information to the road surface drawing device 42A and the HUD 43A and does not receive a reception confirmation signal from the road surface drawing device 42A or the HUD 43A within a predetermined time period, for example, it is determined that an abnormality has occurred in the road surface drawing device 42A or the HUD 43A. In addition, the abnormality information of the road surface drawing device 42A and the HUD 43A may be stored in the memory or the storage device 11, and the display control unit 40A may determine whether the road surface drawing device 42A or the HUD 43A has an abnormality, based on the abnormality information. The abnormality information is stored in the memory or the storage device 11 by the display control unit 40A at a timing at which an abnormality signal is received from the road surface drawing device 42A, the HUD 43A or the passenger in the vehicle or at a timing at which it was determined in the past whether an abnormality has occurred in the road surface drawing display or the HUD display.

When it is determined that the HUD 43A is normal (NO in step S32), the display control unit 40A does not emit a light pattern specified based on the surrounding environment information and the like acquired from the vehicle control unit 3 from the road surface drawing device 42A and instead causes the HUD 43A to display the information corresponding to the light pattern, in step S33. For example, when it is determined that the road surface drawing device 42A has an abnormality, the display control unit 40A causes the HUD 43A to display the information M2 corresponding to the light pattern M0, as shown in FIG. 19, without drawing the light pattern M0 of FIG. 18A on the road surface by the road surface drawing device 42A. In addition to the information M2 corresponding to the light pattern M0, the display control unit 40A may also display a message M3, which indicates that an abnormality has occurred in the road surface drawing device 42A, on the HUD 43A. On the other hand, when it is determined in step S32 that the HUD 43A has an abnormality (YES in step S32), the display control unit 40A does not perform the display of the road surface drawing device 42A and the HUD 43A, in step S34.

When it is determined in step S31 that the road surface drawing device 42A is normal (NO in step S31), the display control unit 40A controls the road surface drawing device 42A to emit a predetermined light pattern toward the road surface, based on the surrounding environment information and the like acquired from the vehicle control unit 3, in step S35. For example, as shown in FIG. 18A, the display control unit 40A emits the light pattern M0 from the road surface drawing device 42A. Then, in step S36, the display control unit 40A determines whether an abnormality has occurred in the HUD 43A. When it is determined that the HUD 43A has an abnormality (YES in step S36), the display control unit 40A does not cause the HUD 43A to display the vehicle traveling information specified based on the traveling condition information and the like acquired from the vehicle control unit 3 and instead causes the road surface drawing device 42A to emit a light pattern corresponding to the vehicle traveling information, in step S37. For example, when it is determined that the HUD 43A has an abnormality, the display control unit 40A does not perform the display of the vehicle traveling information M1 and the vehicle traveling information M4 (FIG. 20A) by the HUD 43A, and causes the road surface drawing device 42A to emit the light pattern M6 corresponding to the vehicle traveling information M4. On the other hand, when it is determined in step S36 that the HUD 43A is normal (NO in step S36), the display control unit 40A controls the HUD 43A to display predetermined vehicle traveling information, in step S38. For example, as shown in FIG. 20A, the display control unit 40A causes the HUD 43A to display the vehicle traveling information M1 and the vehicle traveling information M4.

In this way, in the present embodiment, when it is determined that the road surface drawing device 42A has an abnormality, the display control unit 40A causes the HUD 43A to display the information corresponding to the light pattern that is to be emitted by the road surface drawing device 42A. In addition, when it is determined that the HUD 43A has an abnormality, the display control unit 40A causes the road surface drawing device 42A to emit a light pattern corresponding to the vehicle traveling information that is to be displayed on the HUD 43A. In this way, even when it is determined that the road surface drawing device 42A and/or the HUD 43A has an abnormality, it is possible to perform visual communication between the vehicle and the passenger.

When it is determined that the HUD 43A has an abnormality, the display control unit 40A causes the road surface drawing device 42A to emit the light pattern M6 corresponding to the vehicle traveling information M4, which can be easily read out from the light pattern, of a plurality of vehicle traveling information M1 and M4 that is to be displayed on the HUD 43A. In addition, the display control unit 40A causes the road surface drawing device 42A to emit the light pattern M6 including only information (for example, figure information or simple character information), which can be easily read out from the light pattern, of the vehicle traveling information M4. Furthermore, the display control unit 40A converts some (for example, the figure information) of the vehicle traveling information M4 into information that can be easily read out from the light pattern (for example, converts the same into different figure information), and causes the road surface drawing device 42A to emit the light pattern M6 including the converted information. Thereby, it is possible to correctly transfer the predetermined information to the passenger in the vehicle.

Note that, in the present embodiment, in step 33, when a plurality of light patterns is specified, the display control unit 40A may cause the HUD 43A to display information corresponding to all or some of the light patterns.

In step S37, when the plurality of vehicle traveling information is specified, the display control unit 40A may cause the road surface drawing device 42A to emit a light pattern corresponding to all of the vehicle traveling information.

In the embodiment, after determining whether the road surface drawing device 42A has an abnormality, the display control unit 40A determines whether the HUD 43A has an abnormality. However, the present invention is not limited thereto. The display control unit 40A may determine whether the road surface drawing device 42A has an abnormality after determining whether the HUD 43A has an abnormality.

Figure 23:
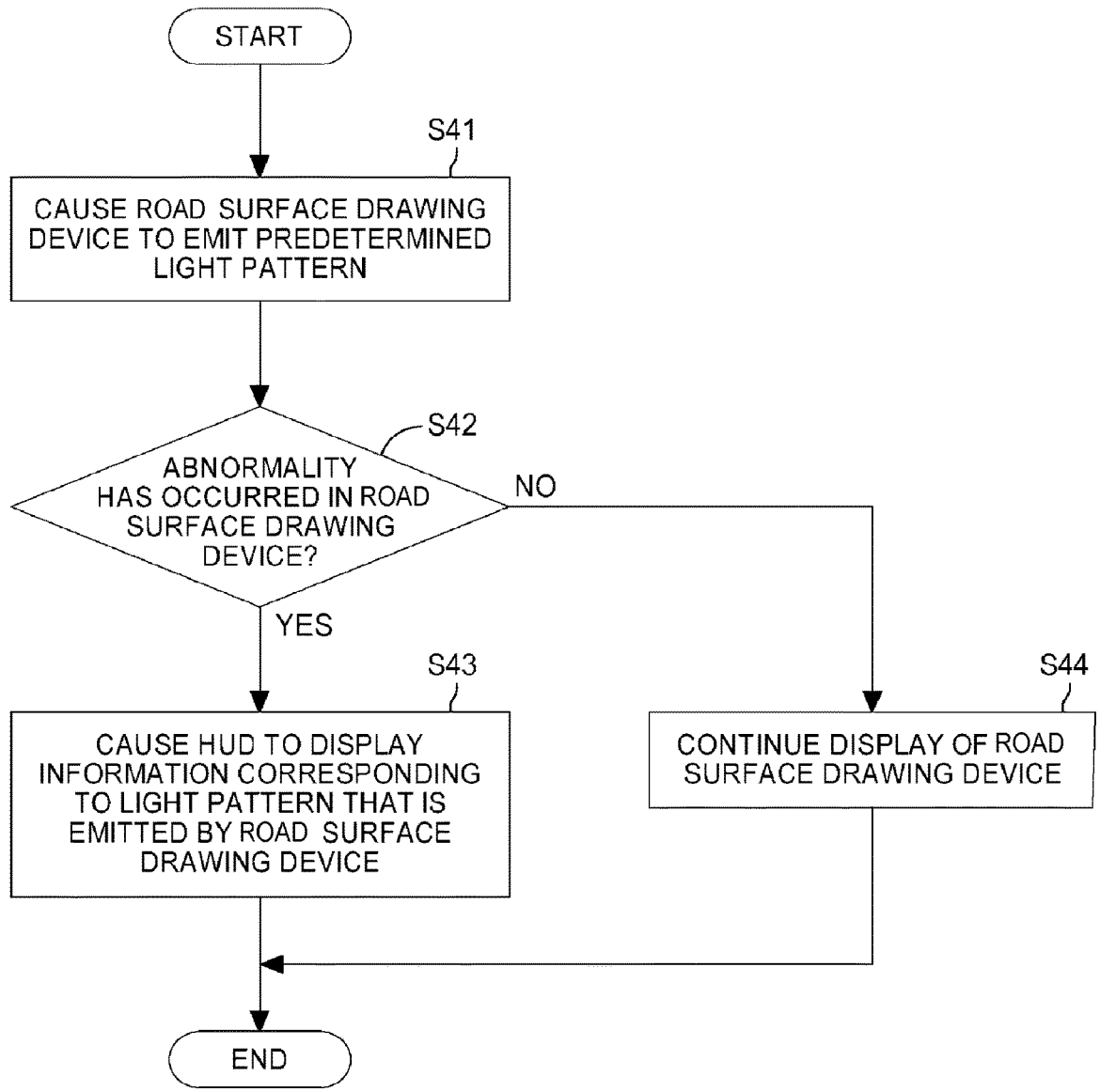
FIG. 23 is a flowchart for illustrating a modified embodiment of the display control by the display control unit in accordance with the second embodiment of the present invention.
Figure 24:
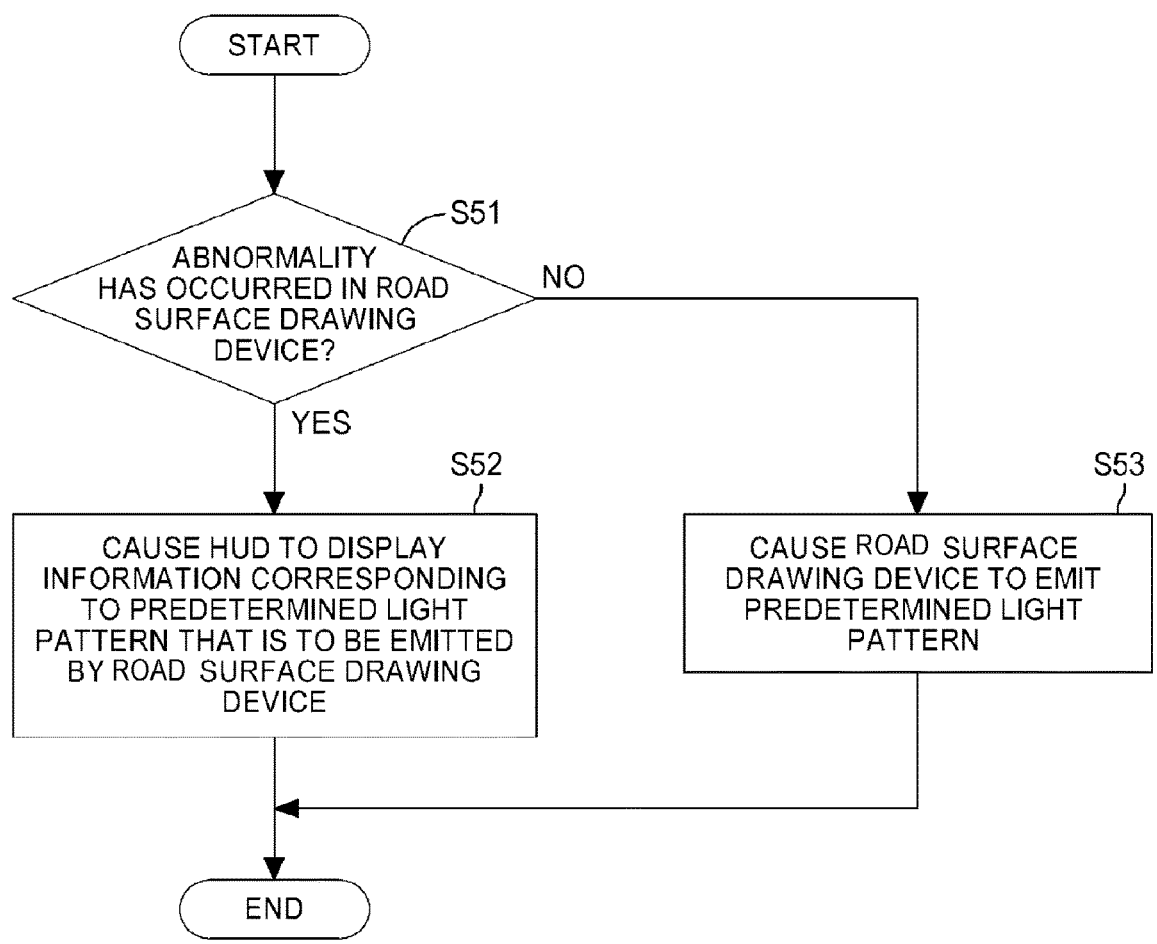
FIG. 24 is a flowchart for illustrating a modified embodiment of display control by a display control unit in accordance with the third embodiment.

In the embodiment, the display control unit 40A determines whether both the road surface drawing device 42A and the HUD 43A have an abnormality. However, the present invention is not limited thereto. The display control unit 40A may determine whether any one of the road surface drawing device 42A and the HUD 43A has an abnormality, and when it is determined that any one of the road surface drawing device 42A and the HUD 43A has an abnormality, the display control unit 40A may cause the other of the road surface drawing device 42A and the HUD 43A to display the information that should be displayed on one of the road surface drawing device 42A and the HUD 43A for which it is determined that an abnormality has occurred. For example, as shown in FIG. 23 or 24, the display control unit 40A may determine whether the road surface drawing device 42A has an abnormality, and when it is determined that the road surface drawing device 42A has an abnormality, the display control unit 40A may cause the HUD 43A to display the information corresponding to the light pattern. Since steps S41 to S44 of FIG. 23 correspond to steps S21, S23, S25 and S27 of FIG. 17 and steps S51 to S53 of FIG. 24 correspond to steps S31, S33 and S35 of FIG. 22, the detailed descriptions thereof are omitted. Note that, FIGS. 23 and 24 depict an example where it is determined whether the road surface drawing device has an abnormality. However, it may also be determined whether the HUD 43A has an abnormality.

Fourth Embodiment

Subsequently, a fourth embodiment of the present invention (hereinbelow, referred to as the present embodiment) is described with reference to the drawings. For the sake of convenience of description, dimensions of the respective members shown in the drawings may be different from actual dimensions of the respective members.

Figure 25:
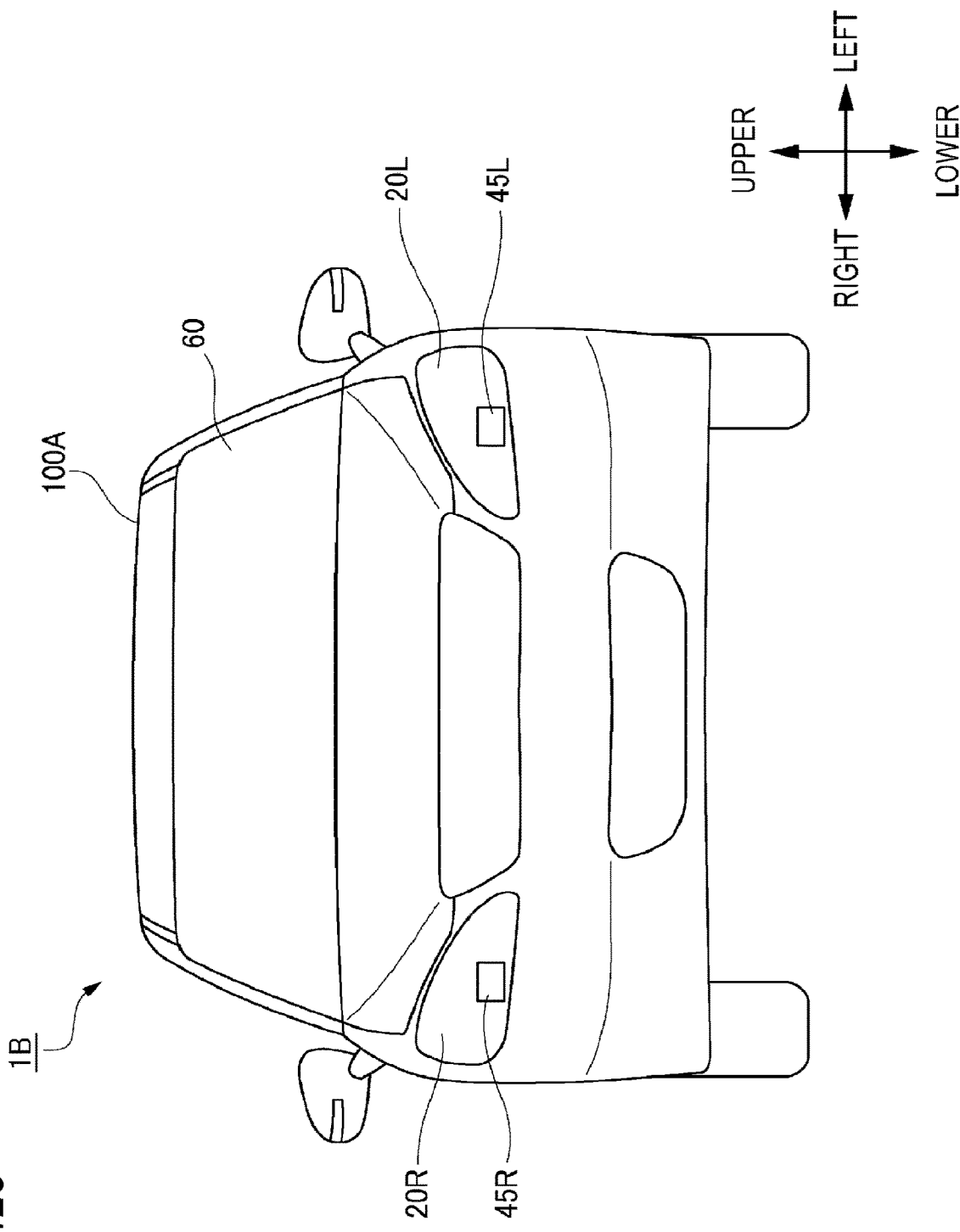
FIG. 25 is a front view of a vehicle on which a vehicle system in accordance with a fourth embodiment of the present invention is mounted.
Figure 26:
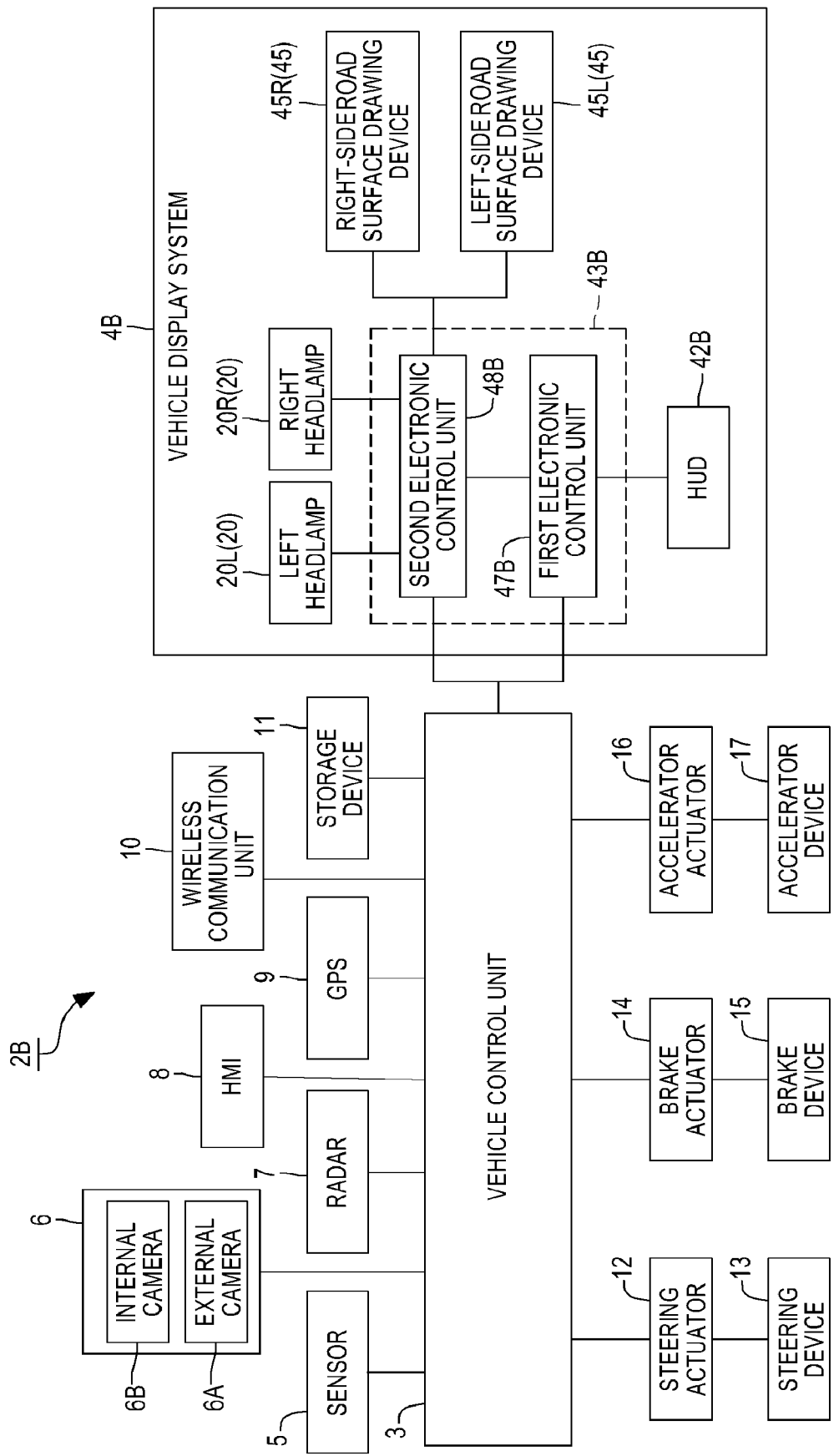
FIG. 26 is a block diagram of the vehicle system in accordance with the fourth embodiment.

First, a vehicle system 2B of the present embodiment is described with reference to FIGS. 25 and 26. FIG. 25 is a front view of a vehicle 1B on which a vehicle system 2B is mounted. FIG. 26 is a block diagram of the vehicle system 2B. The vehicle 1B is a vehicle (automobile) that can travel in the automatic driving mode.

As shown in FIG. 26, the vehicle system 2B includes the vehicle control unit 3, a vehicle display system 4B (hereinbelow, simply referred to as the display system 4B), the sensor 5, the camera 6, and the radar 7. The vehicle system 2B also includes the HMI 8, the GPS 9, the wireless communication unit 10, the storage device 11, the steering actuator 12, the steering device 13, the brake actuator 14, the brake device 15, the accelerator actuator 16, and the accelerator device 17.

The display system 4B includes the left-side headlamp 20L, the right-side headlamp 20R, the left-side road surface drawing device 45L, and the right-side road surface drawing device 45R. The display system 4B also includes an HUD 42B and a display control unit 43BB.

Figure 27:
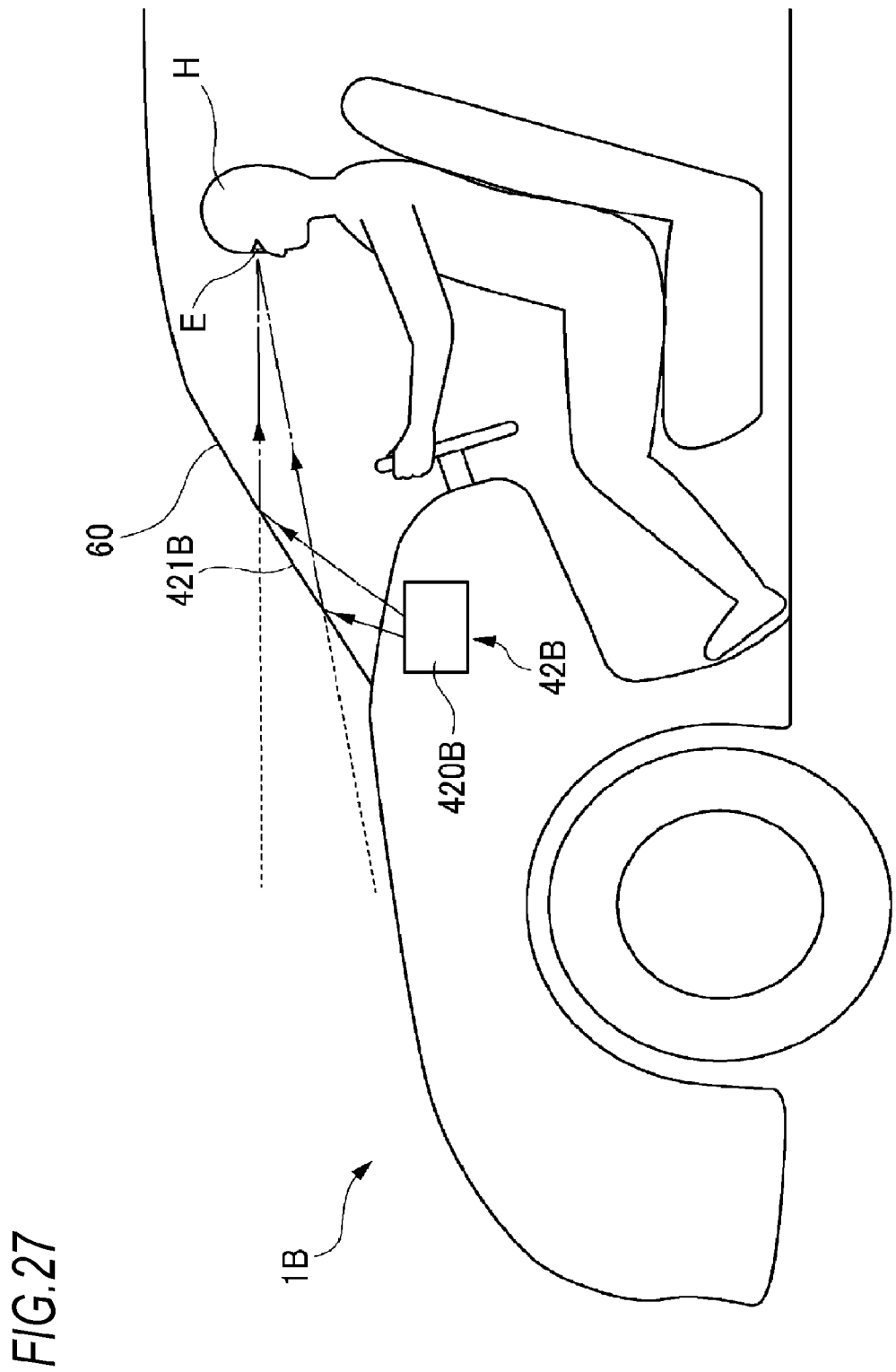
FIG. 27 depicts an aspect where light emitted from the HUD reaches passenger's eyes.

The HUD 42B is located inside the vehicle 1B. Specifically, the HUD 42B is installed at a predetermined place in an interior of the vehicle 1B. For example, as shown in FIG. 27, the HUD 42B may be arranged in a dashboard of the vehicle 1B. The HUD 42B is configured to function as a visual interface between the vehicle 1B and the passenger H. The HUD 42B is configured to display predetermined information (hereinbelow, referred to as HUD information) toward the passenger H so that the predetermined information is superimposed on a real space outside the vehicle 1B (particularly, the surrounding environment in front of the vehicle 1B). In this way, the HUD 42B is configured to function as an AR display. The HUD information that is displayed by the HUD 42B is, for example, vehicle traveling information relating to traveling of the vehicle 1B and/or surrounding environment information (particularly, information about a target object outside the vehicle 1) relating to the surrounding environments of the vehicle 1B.

As shown in FIG. 27, the HUD 42B includes an HUD body part 420B, and a transparent screen 421B. The HUD body part 420B includes a light source unit, a drive mirror, an optic system, a light source drive circuit, and a mirror drive circuit. The light source unit is, for example, a laser light source or an LED light source. The laser light source is an RGB laser light source configured to emit red laser light, green laser light and blue laser light. The drive mirror is, for example, a MEMS mirror, a DMD, a galvano mirror, a polygon mirror and the like. The optic system includes at least one of a prism, a lens, a diffusion plate and a magnifying lens. The light source drive circuit is configured to drive and control the light source unit. The light source drive circuit is configured to generate a control signal for controlling an operation of the light source unit, based on image data transmitted from the display control unit 43B, and to transmit the generated control signal to the light source unit. The mirror drive circuit is configured to drive and control the drive mirror. The mirror drive circuit is configured to generate a control signal for controlling an operation of the drive mirror, based on image data transmitted from the display control unit 43B, and to transmit the generated control signal to the drive mirror.

The transparent screen 421B is configured by a part of the front window 60. The transparent screen 421B has an HUD display area D10 where the HUD information can be displayed (refer to FIG. 30). The light (image) emitted from the HUD body part 420B is irradiated to the HUD display area D10 of the transparent screen 421B. Then, the HUD display area D10 reflects the light emitted from the HUD body part 420B toward the view point E of the passenger H. As a result, the passenger H recognizes the light (image) emitted from the HUD body part 420B, as a virtual image formed at a predetermined position ahead of the transparent screen 421B. In this way, the HUD information (image) displayed by the HUD 42B is superimposed on the real space in front of the vehicle 1B, so that the passenger E can recognize as if the HUD information floats on the road.

Note that, the transparent screen 421B may also be configured as a transparent combiner separated from the front window 60. Also in this case, the combiner has an HUD display area. The passenger H recognizes the light (image) emitted from the HUD body part 420B, as a virtual image formed at a predetermined position ahead of the combiner. The position (virtual image formation position) at which the virtual image is formed may be varied by adjusting a position of the optic system of the HUD 42B (particularly, a focal distance of a projection optic system). In this respect, the display control unit 43B (particularly, a first electronic control unit 47B) can control the HUD 42B so that a position of a target object substantially coincides with the virtual image formation position, based on position information of the target object in front of the vehicle 1B. The drawing method of the HUD 42B may be a raster scan method, a DLP method or an LCOS method. In a case where the DLP method or the LCOS method is adopted, the light source unit of the HUD 42B may be an LED light source.

The display control unit 43B is configured to control operations of the road surface drawing device 45 (specifically, the left-side road surface drawing device 45L and the right-side road surface drawing device 45R), the headlamp 20 (specifically, the left-side headlamp 20L and the right-side headlamp 20R) and the HUD 42B. In this respect, the display control unit 43B is configured to control operations of the road surface drawing device 45 (specifically, the left-side road surface drawing device 45L and the right-side road surface drawing device 45R) so that the light pattern is irradiated to a predetermined position on the road surface. The display control unit 43B is also configured to control the operation of the HUD 42B so that the HUD information is displayed in the HUD display area D10. The display control unit 43B is also configured to decide whether to operate the road surface drawing device 45 and the HUD 42B. That is, in the present embodiment, the display control unit 43B is not configured to control drive of the road surface drawing device 45 and the HUD 42B, in response to an instruction signal from the vehicle control unit 3. The display control unit 43B is instead configured to specify a target object around the vehicle 1B, based on detection data of the in-vehicle sensor (for example, image data and the like) transmitted from the vehicle control unit 3, and to decide whether to operate the road surface drawing device 45 and the HUD 42B.

The display control unit 43B includes a first electronic control unit 47B and a second electronic control unit 48B. The first electronic control unit 47B is configured to control the operation of the HUD 42B. When both the HUD 42B and the road surface drawing device 45 are operating, the first electronic control unit 47B controls the operations of both the HUD 42B and the road surface drawing device 45. The first electronic control unit 47B includes a computer system (for example, SoC and the like) having one or more processors and one or more memories, and an electronic circuit having an active element such as a transistor and a passive element. The processor includes at least one of a CPU, an MPU, a GPU and a TPU. The memory includes a ROM and a RAM. The computer system may also be configured by a non-Neumann type computer such as an ASIC, an FPGA and the like.

The second electronic control unit 48B is configured to control the operations of the headlamp 20 and the road surface drawing device 45. Particularly, in a case where the HUD 42B is not operating and the headlamp 20 and the road surface drawing device 45 are operating, the second electronic control unit 48B controls the operations of the headlamp 20 and the road surface drawing device 45. On the other hand, in a case where the HUD 42B, the headlamp 20 and the road surface drawing device 45 are operating, the first electronic control unit 47B controls the operations of both the HUD 42B and the road surface drawing device 45 and the second electronic control unit 48B controls the operation of the headlamp 20. The second electronic control unit 48B includes a computer system (for example, SoC and the like) having one or more processors and one or more memories, and an electronic circuit having an active element such as a transistor and a passive element. The processor includes at least one of a CPU, an MPU, a GPU and a TPU. The memory includes a ROM and a RAM. The computer system may also be configured by a non-Neumann type computer such as an ASIC, an FPGA and the like.

In the present embodiment, one or both of the first electronic control unit 47B and the second electronic control unit 48B configuring the display control unit 43B may decide whether to operate at least one of the HUD 42B, the road surface drawing device 45 and the headlamp 20. For example, the first electronic control unit 47B may decide whether to operate the HUD 42B, and the second electronic control unit 48B may decide whether to operate each of the road surface drawing device 45 and the headlamp 20. In addition, the first electronic control unit 47B (or the second electronic control unit 48B) may decide whether to operate each of the HUD 42B, the road surface drawing device 45 and the headlamp 20.

In the present embodiment, the first electronic control unit 47B and the second electronic control unit 48B are separately provided. However, the first electronic control unit 47B and the second electronic control unit 48B may also be integrally configured. In this respect, the first electronic control unit 47B and the second electronic control unit 48B may be configured by a single electronic control unit. Note that, in the present embodiment, the vehicle control unit 3 and the display control unit 43B are separately provided.

Figure 28:
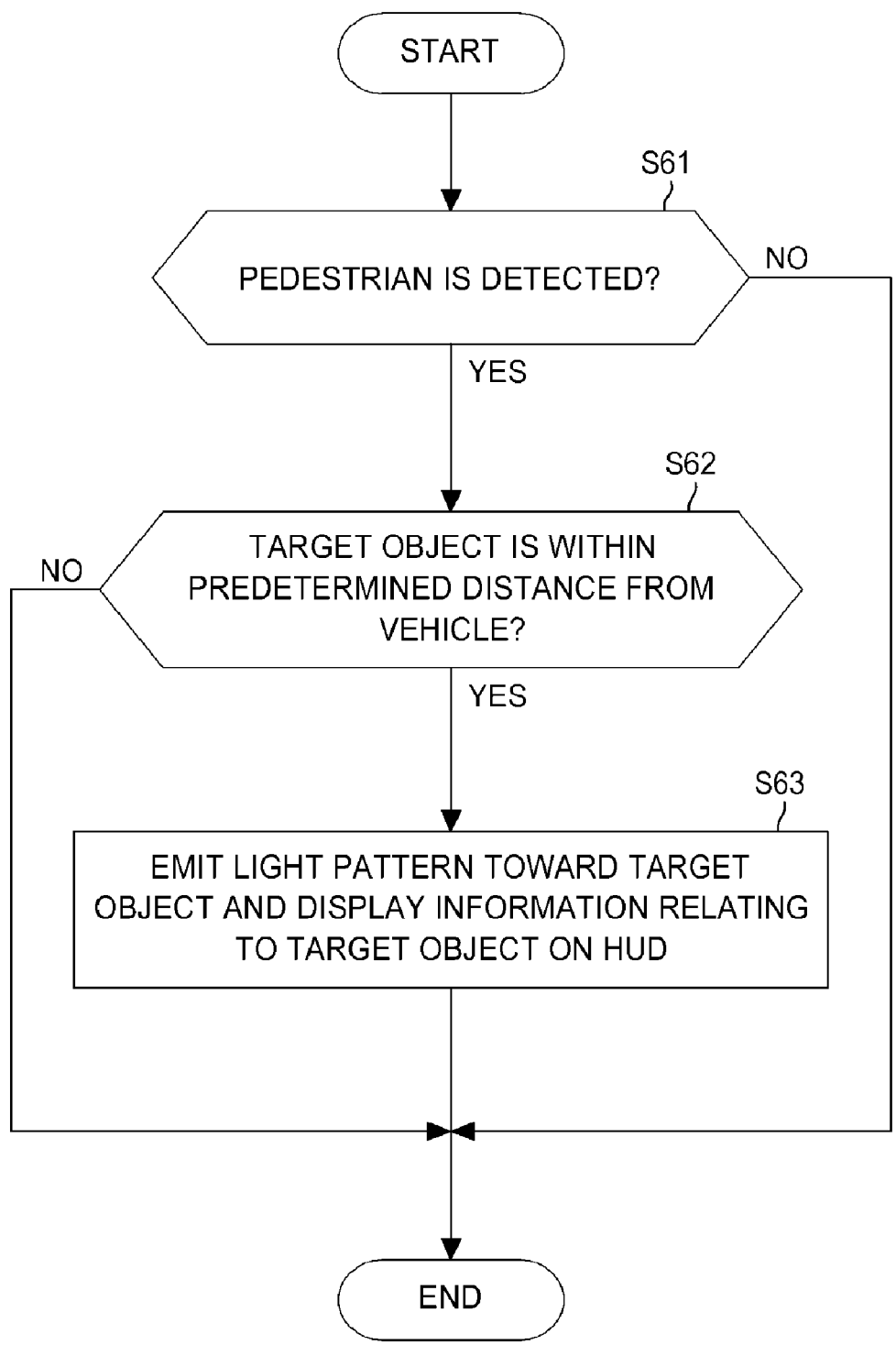
FIG. 28 is a flowchart for illustrating an operation example of a display system in accordance with the fourth embodiment.
Figure 29:
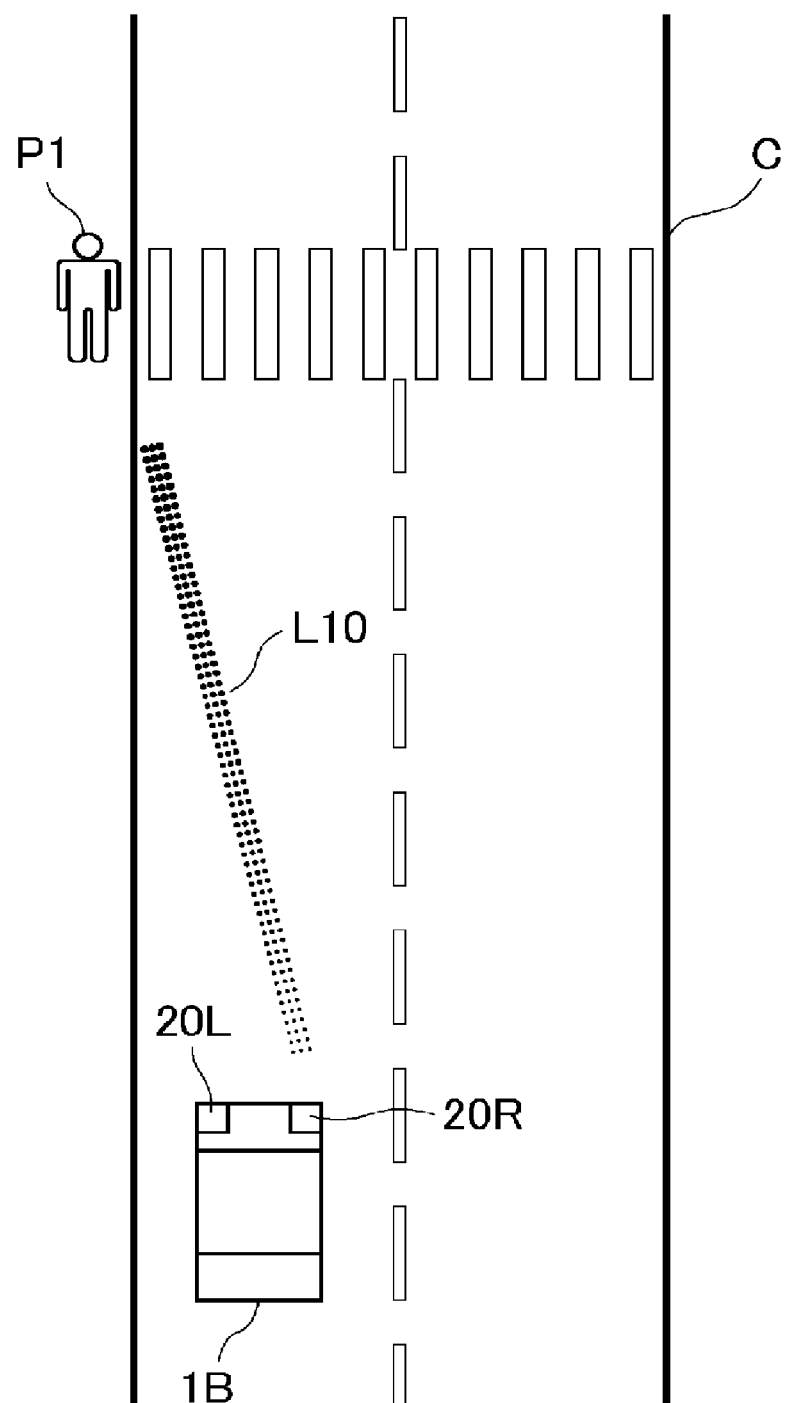
FIG. 29 depicts an aspect where the vehicle emits a light pattern toward a pedestrian around the vehicle.
Figure 30:
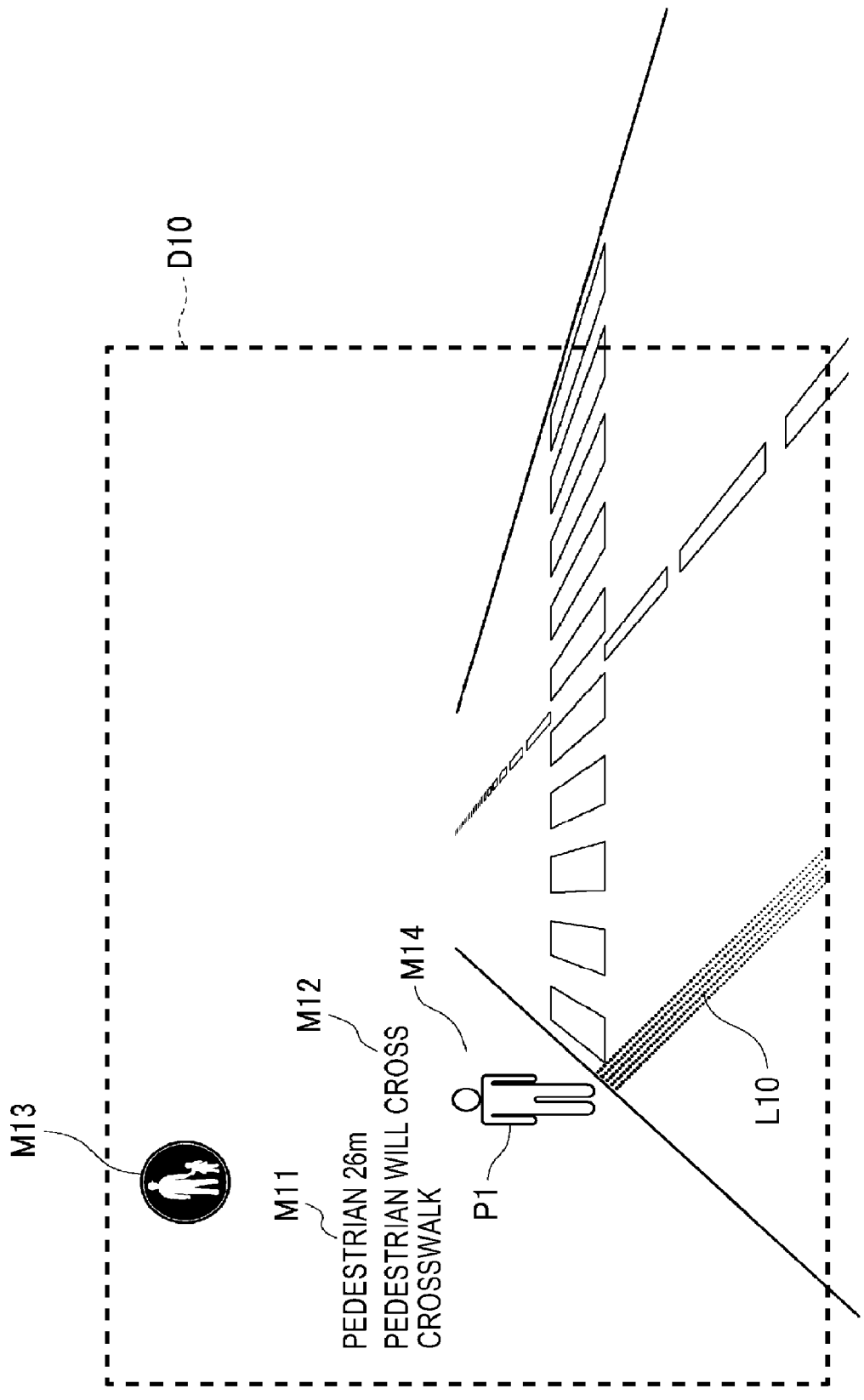
FIG. 30 depicts an example of HUD information that is displayed in the HUD display area.

Subsequently, an operation example of the display system 4B of the present embodiment is described with reference to FIGS. 28 to 30. FIG. 28 is a flowchart for illustrating an operation example of the display system 4B. FIG. 29 depicts an aspect where the vehicle 1B emits a light pattern L10 toward a pedestrian P1 (an example of the target object) around the vehicle 1B. FIG. 30 depicts an example of the HUD information that is displayed in the HUD display area D10. Particularly, in FIG. 30, in the field of view of the passenger H, the HUD information M11 to M14 and the light pattern L10 emitted on the road surface are shown.

Note that, in descriptions below, it is assumed that the first electronic control unit 47B decides whether to operate each of the HUD 42B, the road surface drawing device 45 and the headlamp 20.

As shown in FIG. 28, in step S61, the first electronic control unit 47B receives detection data (for example, image data, 3D mapping data, and the like) acquired by the external camera 6A and/or the radar 7, from the vehicle control unit 3. Then, when the pedestrian P1 is specified (YES in step S61), the first electronic control unit 47B determines, based on the detection data, whether the pedestrian P1 is within a predetermined distance from the vehicle 1B (step S62). When a determination result of step S61 is NO, the present processing is over.

When it is determined that the pedestrian P1 is within a predetermined distance from the vehicle 1B (YES in step S62), the first electronic control unit 47B decides to display the HUD information on the HUD 42B, and decides to emit the light pattern L10 toward the pedestrian P1 (step S63). In step S63, the first electronic control unit 47B also generates information (for example, attribute information of the target object, position information of the target object relative to the vehicle 1B and information relating to a future behavior of the target object) relating to the target object (in the present example, the pedestrian P1), based on the detection data such as image data and 3D mapping data.

Then, the first electronic control unit 47B controls the operation of the HUD 42B so that the HUD information M11 to M14 is displayed on the HUD 42B (particularly, the HUD display area D10), based on the information relating to the target object. In particular, the first electronic control unit 47B transmits a control signal for controlling the operation of the HUD 42B to the HUD 42B. Based on the control signal, the HUD information M11 to M14 is displayed on the HUD display area D10. Here, the HUD information M11 includes attribute information of the target object and position information of the target object relative to the vehicle 1B. As shown in FIG. 30, the HUD information M11 indicates the pedestrian as the attribute information of the target object, and indicates 26 m as the position information of the target object. The HUD information M12 includes information relating to behavior prediction of the target object. As shown in FIG. 30, the HUD information M12 indicates that the pedestrian P1 will cross a crosswalk C, as the behavior prediction information of the pedestrian P1.

The HUD information M13 also includes information indicating presence of the target object. As shown in FIG. 30, the HUD information M13 indicates a pedestrian mark, as the information indicating presence of the pedestrian P1. Note that, the HUD information M13 may also include text information such as "there is a pedestrian" or figure information such as an exclamation mark, as the information indicating presence of the target object. The HUD information M14 is a frame pattern surrounding the pedestrian P1.

Note that, in step S63, the first electronic control unit 47B controls the operation of the road surface drawing device 45 so that the road surface drawing device 45 emits the light pattern L10 onto the road surface toward the pedestrian P1, based on the information relating to the target object. In particular, the first electronic control unit 47B transmits a control signal for controlling the operation of the road surface drawing device 45 via the second electronic control unit 48B to the road surface drawing device 45. Based on the control signal, the road surface drawing device 45 emits the light pattern L10 onto the road surface. As shown in FIG. 29, the light pattern L10 is a linear light pattern extending from the vehicle 1B toward the pedestrian P1. In this way, the light pattern L10 can visually associate the vehicle 1B and the pedestrian P1 each other. The passenger H in the vehicle 1B can also clearly perceive presence of the pedestrian P1 by visually recognizing the light pattern L10. The shape of the light pattern L10 is not limited to the linear shape and may be any shape such as a triangular shape and an arrow shape.

Note that, in the present embodiment, it is presumed that the passenger H is in the vehicle 1B. For this reason, the HUD 42B operates so as to implement visual communication between the vehicle 1B and the passenger H. However, when the passenger H is not in the vehicle 1B, the HUD 42B may not operate. In other words, in a case where the vehicle 1B is traveling in the full-automatic driving mode without the passenger H, the light pattern L10 is emitted toward the pedestrian P1 and the HUD information relating to the pedestrian P1 is not displayed on the HUD 42B. In this case, the second electronic control unit 48B may execute the processing of steps S61 to S63. Particularly, in step S63, the second electronic control unit 48B controls the operation of the road surface drawing device 45 so that the light pattern L10 is emitted onto the road surface toward the pedestrian P1 after deciding to emit the light pattern L10 toward the pedestrian P1. In this way, in a case where the HUD 42B is operating, the first electronic control unit 47B controls the operations of the HUD 42B and the road surface drawing device 45. On the other hand, when the HUD 42B is not operating, the second electronic control unit 48B controls the operation of the road surface drawing device 45.

As for the operation control on the headlamp 20, the operation of the headlamp 20 may be always controlled by the second electronic control unit 48B. That is, in a case where the HUD 42B is not operating, the second electronic control unit 48B may control the operations of the road surface drawing device 45 and the headlamp 20. On the other hand, in a case where the HUD 42B is operating, the first electronic control unit 47B may control the operations of the HUD 42B and the road surface drawing device 45 and the second electronic control unit 48B may control the operation of the headlamp 20.

According to the present embodiment, the display control unit 43B (particularly, the first electronic control unit 47B) other than the vehicle control unit 3 configured to control traveling of the vehicle 1B decides whether to operate the road surface drawing device 45 and the HUD 42B, and controls the operations of the road surface drawing device 45 and the HUD 42B. In this way, it is possible to reduce a calculation load of the vehicle control unit 3 and to increase operating speeds of the road surface drawing device 45 and the HUD 42B.

In a case where the HUD 42B is not operating, the second electronic control unit 48B controls the operation of the road surface drawing device 45. On the other hand, in a case where the HUD 42B is operating, the first electronic control unit 47B controls the operations of the HUD 42B and the road surface drawing device 45. In this way, in a case where both the HUD 42B and the road surface drawing device 45 are operating, it is possible to operate at least one of the HUD 42B and the road surface drawing device 45 efficiently and at high speed. Particularly, in a case where the HUD 42B and the road surface drawing device 45 are operating in cooperation with each other (for example, in a case where the emission position of the light pattern L10 is decided according to the display position of the HUD information or the display position of the HUD information is decided according to the emission position of the light pattern L10), the first electronic control unit 47B generates the control signal for controlling the operation of the HUD 42B and the control signal for controlling the operation of the road surface drawing device 45. For this reason, it is possible to operate the road surface drawing device 45 efficiently and at high speed after considering the operating content of the HUD 42B. Alternatively, it is possible to operate the HUD 42B efficiently and at high speed after considering the operating content of the road surface drawing device 45.

Note that, in the present embodiment, the operation of the headlamp 20 is always controlled by the second electronic control unit 48B. However, the present embodiment is not limited thereto. For example, in a case where the HUD 42B is operating, the first electronic control unit 47B may control all the operations of the HUD 42B, the road surface drawing device 45 and the headlamp 20. In a case where the HUD 42B, the road surface drawing device 45 and the headlamp 20 are all operating, at least one can be operated efficiently and at high speed. In particular, it is possible to operate the road surface drawing device 45 and/or the headlamp 20 efficiently and at high speed after considering the operating content of the HUD 42B. Alternatively, it is possible to operate the HUD 42B efficiently and at high speed after considering the operating contents of the road surface drawing device 45 and/or the headlamp 20.

Although the embodiments of the present invention have been described, the technical scope of the present invention should not be construed as being limited by the description of the present embodiments. The present embodiments are only exemplary, and it can be understood by one skilled in the art that the embodiments can be diversely changed within the scope of the invention defined in the claims. The technical scope of the present invention should be decided based on the scope of the invention defined in the claims and the equivalent scope thereof.

In the present embodiments, the driving mode of the vehicle includes the full-automatic driving mode, the advanced driving support mode, the driving support mode, and the manual driving mode. However, the driving mode of the vehicle should not be limited to the four modes. The classification of the driving mode of the vehicle may be appropriately changed, in accordance with laws or rules relating to the automatic driving in each country. Likewise, the definitions of "the full-automatic driving mode", "the advanced driving support mode" and "the driving support mode" described in the present embodiments are just examples, and may be appropriately changed, in accordance with laws or rules relating to the automatic driving in each country.

The subject application is based on Japanese Patent Application No. 2018-166043 filed on Sep. 5, 2018, Japanese Patent Application No. 2018-166044 filed on Sep. 5, 2018, and Japanese Patent Application No. 2018-166045 filed on Sep. 5, 2018, the contents of which are appropriately incorporated herein.

The invention claimed is:

1. A display system for a vehicle, comprising:
at least one road surface drawing device, arranged in at least one headlamp of the vehicle, configured to emit at least one light pattern toward a road surface outside the vehicle;
a head up display (HUD) device, located inside the vehicle, configured to:
display traveling information of the vehicle,
display surrounding environment information of the vehicle, and
superimpose the traveling information of the vehicle and the surrounding environment information of the vehicle, on a real space, outside the vehicle; and
a display controller configured to control:
operations of the road surface drawing device and the HUD device,
emission of the light pattern, by the road surface drawing device, while the road surface drawing device is operating free of abnormality,
displaying, by the HUD device, the traveling information of the vehicle and the surrounding environment information of the vehicle while the HUD device is operating free of abnormality,
superimposing, by the HUD device, the traveling information of the vehicle and the surrounding environment information of the vehicle, on the real space outside the vehicle, while the HUD device is operating free of abnormality,
displaying, by the HUD device, the traveling information of the vehicle, the surrounding environment information of the vehicle, and information related to the light pattern while the road surface drawing device is operating with abnormality,
wherein the information related to the light pattern is different from the light pattern, and
wherein the information related to the light pattern includes character information or figure information which is not included in the light pattern.

2. The vehicle display system according to claim 1,
wherein while the road surface drawing device is operating with the abnormality, the road surface drawing device is further configured to emit a plurality of light patterns, and
wherein the display controller is further configured to control displaying, by the HUD device, information related to each one of the plurality of light patterns.

3. The vehicle display system according to claim 1, wherein the display controller is further configured to control displaying, by the HUD device, the abnormality of the road surface drawing device.

4. The vehicle display system according to claim 1, wherein while the HUD device is operating with the abnormality, the display controller is further configured to control emission, by the road surface drawing device, of the light pattern and information related to the traveling information of the vehicle and the surrounding environment information of the vehicle.

5. A display system for a vehicle, comprising:
at least one road surface drawing device, arranged in at least one headlamp of the vehicle, configured to emit at least one light pattern toward a road surface outside the vehicle;
a head up display (HUD) device, located inside the vehicle, configured to:
display at least one traveling information of the vehicle,
display surrounding environment information of the vehicle, and
superimpose the traveling information of the vehicle and the surrounding environment information of the vehicle, on a real space, outside the vehicle; and
a display controller configured to control:
operations of the road surface drawing device and the HUD device,
emission of the light pattern, by the road surface drawing device, while the HUD device is operating free of abnormality,
displaying, by the HUD device, the traveling information of the vehicle and the surrounding environment information of the vehicle while the HUD device is operating free of abnormality,
superimposing, by the HUD device, the traveling information of the vehicle and the surrounding environment information of the vehicle, on the real space outside the vehicle, while the HUD device is operating free of abnormality,
displaying, by the road surface drawing device, the light pattern and information related to the traveling information of the vehicle and the surrounding environment information of the vehicle while the HUD device is operating with abnormality,
wherein the information related to the traveling information of the vehicle and the surrounding environment information of the vehicle is different from the light pattern, and
wherein the information related to the traveling information of the vehicle and the surrounding environment information of the vehicle includes character information or figure information which is not included in the light pattern.

6. The vehicle display system according to claim 5,
wherein while the HUD device an is operating with the abnormality, the HUD device is further configured to display a plurality of traveling information of the vehicle and surrounding environment information of the vehicle,
wherein the display controller is further configured to control displaying, by the road surface drawing device, information related to the plurality of traveling information of the vehicle and the surrounding environment information of the vehicle.

* * * * *